US007064756B2

(12) United States Patent
Nakatsuka et al.

(10) Patent No.: US 7,064,756 B2
(45) Date of Patent: Jun. 20, 2006

(54) DATA PROCESSING APPARATUS AND SHADING APPARATUS

(75) Inventors: Yasuhiro Nakatsuka, Tohkai-mura (JP); Shigeru Matsuo, Hitachinaka (JP); Jun Satoh, Musashino (JP); Masanori Miyoshi, Hitachi (JP); Koyo Katsura, Hitachiohta (JP); Takashi Sone, Tokyo (JP)

(73) Assignee: Renesas Technology Corporation, Tokyo (JP)

( * ) Notice: Subject to any disclaimer, the term of this patent is extended or adjusted under 35 U.S.C. 154(b) by 68 days.

(21) Appl. No.: 10/947,275

(22) Filed: Sep. 23, 2004

(65) Prior Publication Data

US 2005/0041489 A1    Feb. 24, 2005

Related U.S. Application Data

(63) Continuation of application No. 10/175,805, filed on Jun. 21, 2002, now Pat. No. 6,806,875, which is a continuation of application No. 08/894,786, filed as application No. PCT/JP96/00449 on Feb. 27, 1996, now Pat. No. 6,433,782.

(30) Foreign Application Priority Data

| Feb. 28, 1995 | (JP) | ................................ 7-39691 |
| Apr. 26, 1995 | (JP) | ............................... 7-101885 |
| Nov. 16, 1995 | (JP) | ............................... 7-298408 |

(51) Int. Cl.
*G06T 11/00* (2006.01)

(52) U.S. Cl. ..................... 345/426; 345/501

(58) Field of Classification Search ............... 345/426, 345/501

See application file for complete search history.

(56) References Cited

U.S. PATENT DOCUMENTS

| 4,284,988 | A | 8/1981 | Seitz et al. |
| 4,709,231 | A | 11/1987 | Sakaibara et al. |
| 4,817,005 | A | 3/1989 | Kubota et al. |
| 5,251,296 | A | 10/1993 | Rhoden et al. |
| 5,263,136 | A | 11/1993 | DeAguiar et al. |
| 5,301,288 | A | 4/1994 | Newman et al. |

(Continued)

FOREIGN PATENT DOCUMENTS

JP       59-186057      10/1984

(Continued)

OTHER PUBLICATIONS

"PCI Express Graphics Memory Linearizer on Graphics Card for Fast and Contiguous Access to the System", IPCOM00021244DD (http://www.priorartdatabase.com/IPCOM/000021244/(1/4).

*Primary Examiner*—Almis R. Jankus
(74) *Attorney, Agent, or Firm*—Mattingly, Stanger, Malur & Brundidge, P.C.

(57) ABSTRACT

In a data processor and a shading apparatus used in the data processor, the data processor selects an address based on the information of a memory or a translation look-aside buffer. Therefore, even when the same data are accessed, a different address at high speed is adopted according to the hardware, object to be processed, processing, etc. A plurality of geometric vectors are given as the parameters for the vertexes of a picture, the vectors are interpolated in the picture, and the luminance of each small area in the figure is calculated using the vectors generated by the interpolation. Therefore, a spotlight or highlight can be expressed with high accuracy and at high speed even when the amount of the hardware and the extent of the picture are small.

2 Claims, 63 Drawing Sheets

U.S. PATENT DOCUMENTS

| | | |
|---|---|---|
| 5,311,211 A | 5/1994 | Simpson |
| 5,315,698 A | 5/1994 | Case et al. |
| 5,398,328 A | 3/1995 | Weber et al. |
| 5,448,310 A * | 9/1995 | Kopet et al. ............... 348/699 |
| 5,486,876 A * | 1/1996 | Lew et al. ................. 348/719 |
| 5,499,324 A | 3/1996 | Nakayama |
| 5,510,857 A * | 4/1996 | Kopet et al. ............... 348/699 |
| 5,539,899 A | 7/1996 | Huynh et al. |
| 5,561,750 A | 10/1996 | Lentz |
| 5,572,713 A | 11/1996 | Weber et al. |
| 5,794,037 A | 8/1998 | Young |
| 5,805,782 A | 9/1998 | Foran |
| 5,828,382 A | 10/1998 | Wilde |
| 6,009,190 A | 12/1999 | Szeliski et al. |

FOREIGN PATENT DOCUMENTS

| | | |
|---|---|---|
| JP | 60-221848 | 11/1985 |
| JP | 2-255930 | 10/1990 |
| JP | 6-124201 | 5/1994 |

* cited by examiner

FIG. 2A

SCREEN    PIXEL DATA

| X1 | X2 | X3 | X9 | X10 | X11 | |
|----|----|----|----|-----|-----|---|
| X4 | X0 | X5 | X12 | X13 | X14 | ⋯ |
| X6 | X7 | X8 | X15 | X16 | X17 | |
| | ⋮ | | | | | |
| | | | | | | |
| | | | | | | |

FIG. 2B

| PHYSICAL ADDRESS | PIXEL DATA |
|---|---|
| 0 | X1 |
| 1 | X2 |
| 2 | X3 |
| 3 | X9 |
| · | · |
| · | · |
| · | X4 |
| | X0 |
| | X5 |
| | · |
| | · |
| | X6 |
| | X7 |
| | X8 |
| | · |
| | · |

FIG. 2C

| PHYSICAL ADDRESS | PIXEL DATA |
|---|---|
| 0 | X1 |
| 1 | X2 |
| 2 | X3 |
| 3 | X4 |
| · | X0 |
| · | X5 |
| · | X6 |
| | X7 |
| | X8 |
| | X9 |
| | · |
| | · |
| | · |

FIG. 3A
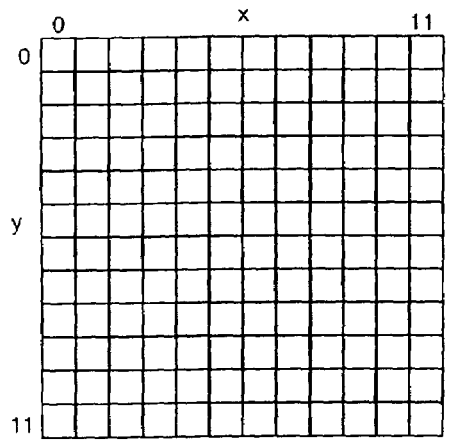
COORDINATE OF SCREEN :
TWO-DIMENSIONAL ADDRESS
(FOR PARAMETERS OF COMMANDS)
FIG. 3B
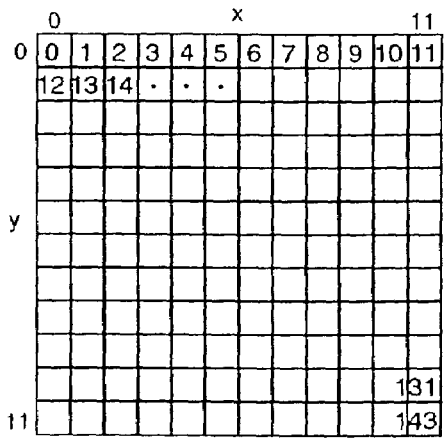
LOGICAL ADDRESS FOR
DATA PROCESSOR
FIG. 3C
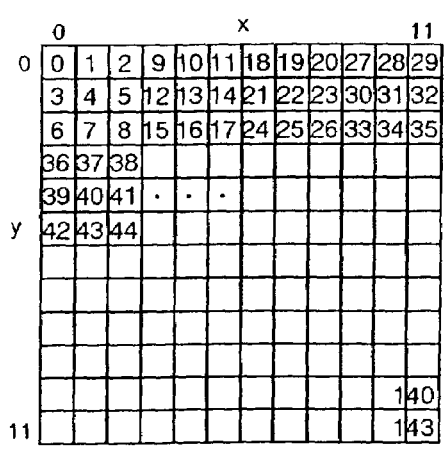
LOGICAL ADDRESS FOR
GRAPHICS PROCESSOR
FIG. 3D
| PHYSICAL ADDRESS OF MEMORY | GRAPHICS PROCESSOR ADDRESS | DATA PROCESSOR ADDRESS |
|---|---|---|
| 0 | 0 | 0 |
| 1 | 1 | 1 |
| 2 | 2 | 2 |
| 3 | 3 | 12 |
| . | . | . |
| . | . | . |
| . | . | . |
| 140 | 140 | 131 |
| 141 | 141 | 141 |
| 142 | 142 | 142 |
| 143 | 143 | 143 |

LOGICAL ADDRESS

MEMORY ADDRESS

LOGICAL ADDRESS

CACHE ADDRESS

MEMORY ADDRESS

FIG. 19

| | n | 0 | 1 | 2 | 3 | 4 |
|---|---|---|---|---|---|---|
| | TILE SIZE | 256 | 128 | 64 | 32 | 16 |
| m | SIZE | 1 | 2 | 4 | 8 | 16 |
| 0 | 1 1 | 1.00 | 1.00 | 1.00 | 1.00 | 1.00 |
| 1 | 2 2 | 2.01 | 1.51 | 1.27 | 1.16 | 1.13 |
| 2 | 4 4 | 4.05 | 2.56 | 1.83 | 1.50 | 1.41 |
| 3 | 8 8 | 8.22 | 4.75 | 3.05 | 2.29 | 2.07 |
| 4 | 16 16 | 16.94 | 9.50 | 5.86 | 4.22 | 3.75 |
| 5 | 32 32 | 35.88 | 20.50 | 12.99 | 9.60 | 8.63 |
| 6 | 64 64 | 79.75 | 48.50 | 33.24 | 26.35 | 24.38 |
| 7 | 128 128 | 191.50 | 128.50 | 97.74 | 83.85 | 79.88 |
| 8 | 256 256 | 511.00 | 384.50 | 322.74 | 294.85 | 286.88 |

4000

64 + 16.94 x 6 = 165.6
64 + 3.75 x 6 = 86.5
1.9 TIMES SPEED-UP

FIG. 23

| L0(h-1) | L0(h) | L0(h+1) | L0(h+2) | L0(h+3) | L0(h+4) |
|---|---|---|---|---|---|
| L0(i-1) | L0(i) 5160 | L0(i+1) | L0(i+2) | L0(i+3) | L0(i+4) |
| L0(j-1) | L0(j) 5100 | L0(j+1) | L0(j+2) | L0(j+3) | L0(j+4) |
| L0(k-1) | L0(k) | L0(k+1) | L0(k+2) | L0(k+3) | L0(k+4) |

FIG. 24

| L0(h-1) | L0(h) | L0(h+1) | L0(h+2) |
|---|---|---|---|
| L1(h-1) | L1(h) | L1(h+1) | |
| L0(i-1) | L0(i) 5160 | L0(i+1) | L0(i+2) |
| L1(i-1) | L1(i) 5170 | L1(i+1) | |
| L0(j-1) | L0(j) | L0(j+1) | L0(j+2) |
| L1(j-1) | L1(j) | L1(j+1) | |
| L0(k-1) | L0(k) | L0(k+1) | L0(k+2) |
| L1(k-1) | L1(k) | L1(k+1) | |

$I = \Sigma$ NUMBER OF LIGHT SOURCE $(Iai+Idi+Isi)$ $Ia = Ka \times Oc \times Lc$ $Id = Kd \times Oc \times (N \cdot L) \times (Ldir \cdot L)^{Lconc} Lc \times Latt$ $Is = Ks \times Sc \times (N \cdot H)^{Sconc} \times (Ldir \cdot L)^{Lconc} Lc \times Latt$ $Latt = 1/(La1 + La2 \times mag(dist) + La3 \times mag(dist)^2)$ $H = (V+L)/|V+L|$ $mag(dist) = dist$ Li · Ni = cos α
= cos(Liθ − Niθ) cos(Liφ − Niφ) + {1 − cos(Liθ − Niθ)} sin(Liφ) sin(Niφ)
∼ cos(Liθ − Niθ) cos(Liφ − Niφ)

(Li · Ni)^n = (cos α)^n
∼ {cos(Liθ − Niθ)}^n {cos(Liφ − Niφ)}^n

Li · Ni ~ Li-1 · Ni
cos α ~ cos α'

| INPUT | OUTPUT |
|---|---|
| 0.00 | 1.000 |
| 0.01 | 9.990 |
| 0.02 | 9.980 |
| 0.03 | 9.900 |
| . | . |
| . | . |
| . | . |

| INPUT | OUTPUT |
|---|---|
| 0.00 | 1.000 |
| 0.01 | 9.995 |
| 0.02 | 9.990 |
| 0.03 | 9.985 |
| . | . |
| . | . |
| . | . |

| INPUT | OUTPUT |
|---|---|
| 0.00 | 1.000 |
| 0.01 | 9.980 |
| 0.02 | 9.940 |
| 0.03 | 9.860 |
| . | . |
| . | . |
| . | . |

FIG. 44

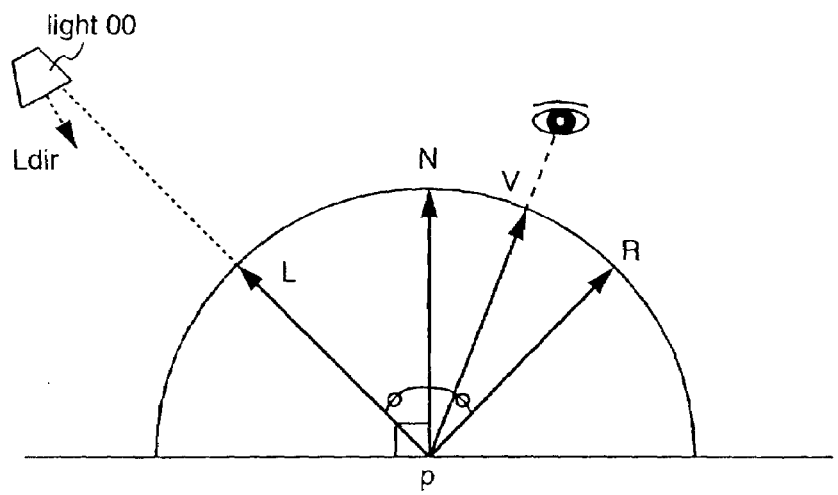

$$I = \sum_{i=1}^{i=N} (Ia_i + Id_i + Is_i) \quad (1)$$

a) PERIPHERAL LIGHT SOURCE $Ia = Ka \times Oc \times Lc$
$Id = 0$ (1a)
$Is = 0$ b) PARALLEL LIGHT SOURCE $Ia = 0$
$Id = Kd \times Oc \times (N \cdot L) \times Lc$ (1b)
$Is = Ks \times Sc \times (V \cdot R)^{Sconc} \times Lc$ c) POINT LIGHT SOURCE $Ia = 0$
$Id = Kd \times Oc \times (N \cdot L) \times Lc \times Latt$ (1c)
$Is = Ks \times Sc \times (V \cdot R)^{Sconc} \times Lc \times Latt$ d) SPOT LIGHT SOURCE $Ia = 0$
$Id = Kd \times Oc \times \{(N \cdot L) \times (Ldir \cdot -L)^{Lconc}\} \times Lc \times Latt$ (1d)
$Is = Ks \times Sc \times \{(V \cdot R)^{Sconc} \times (Ldir \cdot -L)^{Lconc}\} \times Lc \times Latt$ $$(a \ b \ c)\begin{bmatrix}x\\y\\z\end{bmatrix}+1=(a \ b \ c)p+1=0 \quad (2a)$$

$$(a \ b \ c)\begin{bmatrix}x1 & x2 & x3\\y1 & y2 & y3\\z1 & z2 & z3\end{bmatrix}=(a \ b \ c)[p1 \ p2 \ p3]=(-1 \ -1 \ -1) \quad (2b)$$

$$(a \ b \ c)=(-1 \ -1 \ -1)\begin{bmatrix}x1 & x2 & x3\\y1 & y2 & y3\\z1 & z2 & z3\end{bmatrix}^{-1} \quad (2c)$$

$$h=-\frac{ax_L+by_L+cz_L-1}{\sqrt{a^2+b^2+c^2}} \quad (2)$$

FIG. 47

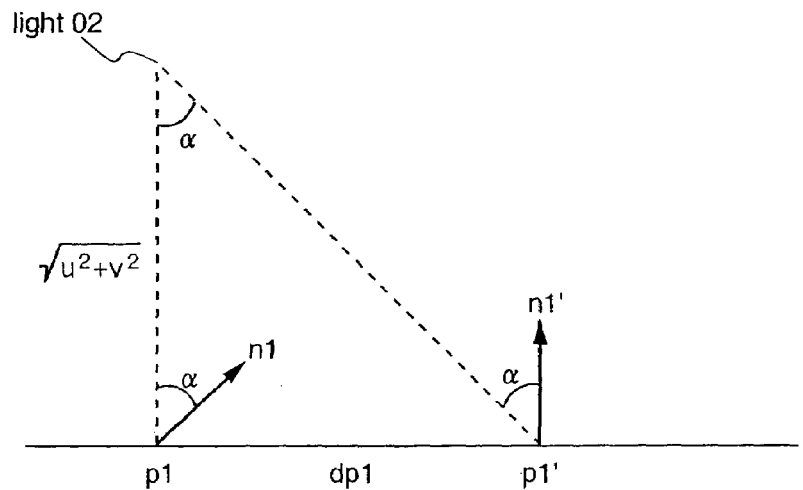

$$dp1 = \sqrt{u^2+v^2} \ (du, dv) \qquad (3a)$$

$$du = \tan \alpha \ \frac{n \cdot u}{\sqrt{(n \cdot u)^2+(n \cdot v)^2}} = \tan \alpha \ \frac{n \cdot u}{\sin \alpha} = \frac{n \cdot u}{\cos \alpha} = \frac{n \cdot u}{n \cdot w} \qquad (3b)$$

$$dv = \tan \alpha \ \frac{n \cdot v}{\sqrt{(n \cdot u)^2+(n \cdot v)^2}} = \tan \alpha \ \frac{n \cdot v}{\sin \alpha} = \frac{n \cdot v}{\cos \alpha} = \frac{n \cdot v}{n \cdot w} \qquad (3c)$$

$$L = \cos \theta = \frac{1}{\sqrt{1+u^2+v^2}} \qquad (4)$$

FIG. 49

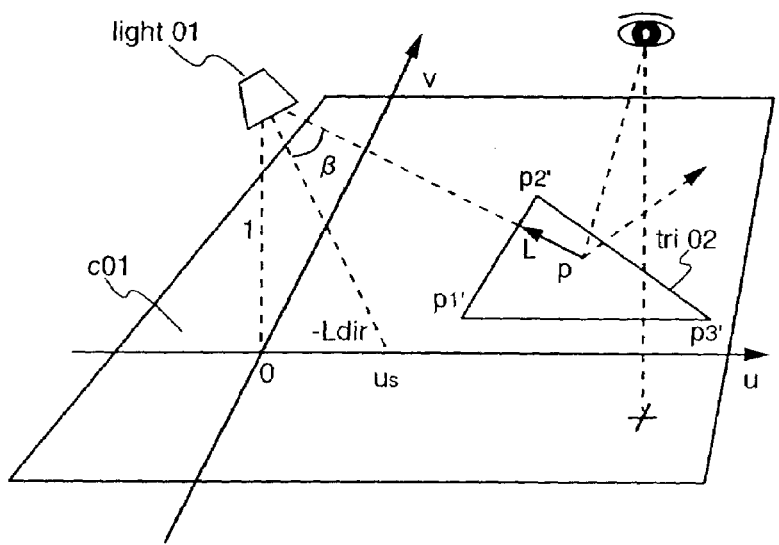

$$u_0 = \tan\beta = \pm\sqrt{\frac{1}{\cos^2\beta} - 1} = \pm\sqrt{\frac{1}{(u \cdot (-Ldir))^2} - 1} = \pm\sqrt{\frac{1}{(u \cdot -Ldir)^2} - 1} \quad (5)$$

$$F = \left(\text{range}\left(\frac{1+u_0 \cdot u}{\sqrt{1+u_0^2}\sqrt{1+u^2+v^2}}, 0, \cos(Lang)\right)\right)^{Lconc} \quad (0 \leq u_0) \quad (5a)$$

$$F = \left(\text{range}\left(-\frac{1+u_0 \cdot u}{\sqrt{1+u_0^2}\sqrt{1+u^2+v^2}}, 0, \cos(Lang)\right)\right)^{Lconc} \quad (u_0 < 0) \quad (5b)$$

$$F = \left(\text{range}\left(\frac{u}{\sqrt{1+u^2+v^2}}, 0, \cos(Lang)\right)\right)^{Lconc} \quad (1 \ll u_0) \quad (5c)$$

$$H = \left(\text{range}\left(\frac{(uv - u)u+(vv - v)v+wv}{\sqrt{(uv - u)^2 +(vv - v)^2+wv^2} \sqrt{1 + u^2+ v^2}}, 0, 1\right)\right)^{Sconc} \quad (6)$$

FIG. 53A

| 32 | 24 | 16 | 8 | 0 | |
|---|---|---|---|---|---|
| COMAND ID | | y1 | | | ⎫ |
| h1 | | h2 | | | |
| x1 | | NA(or x2) | | | DRAWING FIGURE INFORMATION |
| dx1 (orNA) | | | | | |
| dx2 | | | | | |
| dx3 | | | | | ⎭ |
| recZx | | recZy | | | ⎫ recZ(1/z) INTERPOLATION COEFFICENT |
| recZc | | recZe | | | ⎭ |
| Sx | | Sy | | | ⎫ TEXTURE COORDINATE INTERPOLATION COEFFICIENT |
| Sz | | Se | | | |
| Tx | | Ty | | | |
| Tz | | Te | | | ⎭ |
| L0ax | L0ay | L0az | L0ae | | ⎫ LIGHT SOURCE 0 NORMAL VECTOR FIELD INTERPOLATION COEFFICIENT |
| U0x | | U0v | | | |
| U0z | | U0e | | | |
| V0x | | U0y | | | |
| V0z | | U0e | | | ⎭ |
| a0 | b0 | Uv0 | | | ⎫ LIGHT SOURCE 0 CONSTANT |
| Vv0 | | Wv0 | | | ⎭ |

| 32 | 24 | 16 | 8 | 0 | |
|---|---|---|---|---|---|
| L1ax | L1ay | L1az | L1ae | | ⎫ LIGHT SOURCE 1 NORMAL VECTOR FIELD INTERPOLATION COEFFICIENT |
| U1x | | U1v | | | |
| U1z | | U1e | | | |
| U1x | | U1v | | | |
| U1z | | U1e | | | ⎭ |
| a1 | b1 | Uv1 | | | ⎫ LIGHT SOURCE 1 CONSTANT |
| Vv1 | | Wv1 | | | ⎭ |
| L2ax | L2ay | L2az | L2ae | | ⎫ LIGHT SOURCE 2 NORMAL VECTOR FIELD INTERPOLATION COEFFICIENT |
| U2x | | U2v | | | |
| U2z | | U2e | | | |
| U2x | | U2v | | | |
| U2z | | U2e | | | ⎭ |
| a2 | b2 | Uv2 | | | ⎫ LIGHT SOURCE 2 CONSTANT |
| Vv2 | | Wv2 | | | ⎭ |
| L3ax | L3ay | L3az | L3ae | | ⎫ LIGHT SOURCE 3 NORMAL VECTOR FIELD INTERPOLATION COEFFICIENT |
| U3x | | U3v | | | |
| U3z | | U3e | | | |
| U3x | | U3v | | | |
| U3z | | U3e | | | ⎭ |
| a3 | b3 | Uv3 | | | ⎫ LIGHT SOURCE 3 CONSTANT |
| Vv3 | | Wv3 | | | ⎭ |

FIG. 53B $u_{ix}, u_{iy}, u_{iz}, u_{ie}$
$v_{ix}, v_{iy}, v_{iz}, v_{ie}$ ) SAME FORMAT AS S,T $u_{vi}, v_{vi}, w_{vi}$ [ 8 | 8 ]

$a_i, b_i$ [ 1 | 7 ] WHERE, IF $a_i<0$, THEN $b_i=1$
AND IF $b_i=0$, THEN $a_i=1$

FIG. 53C

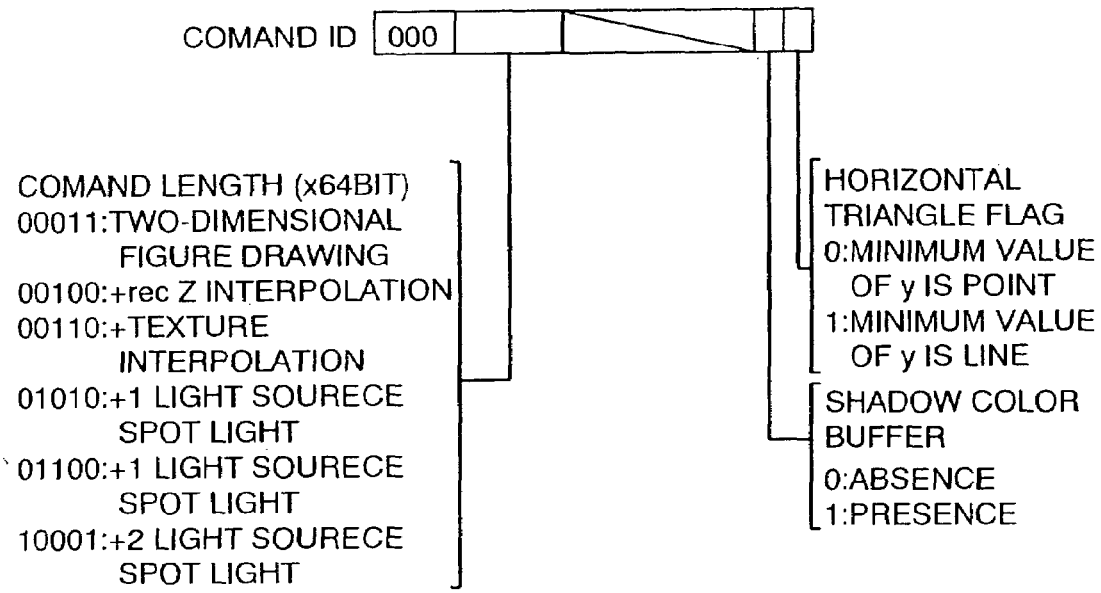

COMAND ID [000]

COMAND LENGTH (x64BIT)
00011:TWO-DIMENSIONAL
  FIGURE DRAWING
00100:+rec Z INTERPOLATION
00110:+TEXTURE
  INTERPOLATION
01010:+1 LIGHT SOURECE
  SPOT LIGHT
01100:+1 LIGHT SOURECE
  SPOT LIGHT
10001:+2 LIGHT SOURECE
  SPOT LIGHT HORIZONTAL
TRIANGLE FLAG
0:MINIMUM VALUE
  OF y IS POINT
1:MINIMUM VALUE
  OF y IS LINE

SHADOW COLOR
BUFFER
0:ABSENCE
1:PRESENCE

FIG. 62
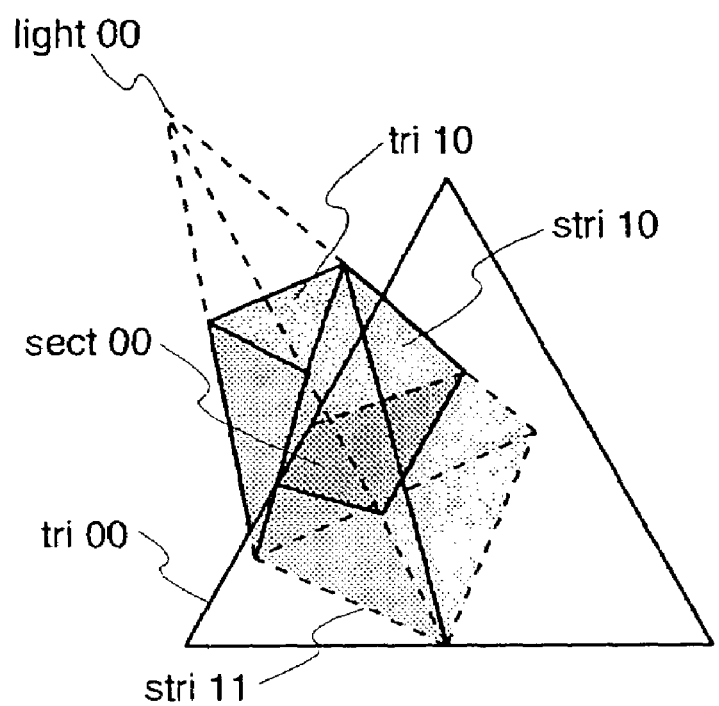
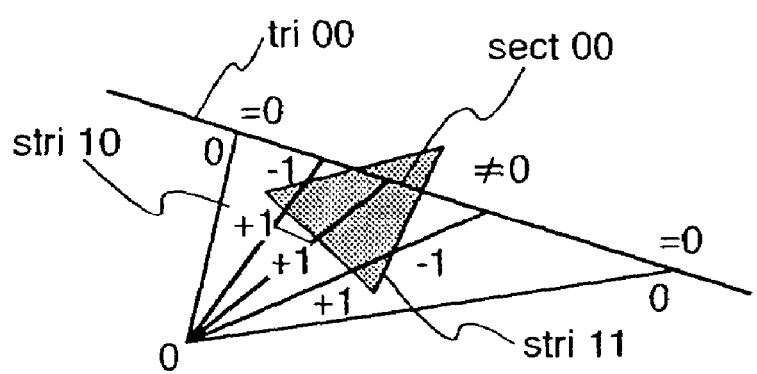

DATA PROCESSING APPARATUS AND SHADING APPARATUS

CROSS-REFERENCE TO RELATED APPLICATIONS

This is a continuation application of application Ser. No. 10/175,805 filed on Jun. 21, 2002 now U.S. Pat. No. 6,806,875, which is a continuation of application Ser. No. 08/894,786, filed on Aug. 28, 1997, now U.S. Pat. No. 6,433,782 which is a 371 of PCT/JD6/00449, filed Feb. 27, 1996. The contents of application Ser. Nos. 08/894,786 and 10/175,805 are hereby incorporated herein by reference in their entirety.

BACKGROUND OF THE INVENTION

The present invention relates to a data processing apparatus which can perform, at high speed, the processing of data arranged in two dimensions, such as figure-producing processing and image processing. The invention also relates to a shading apparatus for adding realistic shading, such as spot light or high light shading, to figure data, etc. handled in the data processing apparatus.

A point has been reached for processing data at high speed with two-dimensional extension in the address management of data. A method of managing addresses relative to data with two-dimensional extension is disclosed in "Gary Newmann, Memory Management Support for Tiled Array Organization, Computer Architecture News, Vol. 20, No. 4, September 1992, PP. 22–29", which relates to image management. Further, the same method is described in U.S. Pat. No. 5,247,632. In the disclosed method, the data with two-dimensional extension (referred to hereinafter as two-dimensionally arranged data) is referenced not only in a row direction, but also in a column direction. The data includes imaginary values in logic.

Generally, with reference to two-dimensionally arranged data, data which exists in the peripheral portion of one data value is also referred to at the same time. For example, when one data value is referred to, data in the neighborhood of the two-dimensional arrangement of the one data value is also referred to within a predetermined time.

Logical addresses include an array type address and a tile type address. The former is an address arranged in such a way that the physical address of row data in two-dimensional arrangement may continue. The latter is an address arranged in such a way that data in a square region, including the data in the neighborhood of a two-dimensional arrangement, may continue physically.

In the prior method, after an array type address generated in an access-source is first converted into a tile type address corresponding to the physical arrangement, a physical address is generated by normal address translation from a logical address to a physical address. The rule for the conversion is determined only by the physical arrangement of the data. Because the rule for address translation or the conversion rule is determined only by the physical arrangement in the prior method, there is a problem in that tile type data can not be referred to as array type data. This is because the array type reference is converted to a tile type reference in the course of the conversion. Further, there are some problems in that, because a two-step address translation is necessary, it takes much time to convert the address, so that the address translation is not performed at high speed, and the management is complicated because it is different at each step of the address translation.

Those problems become remarkable in a graphic processing system, such as a portable data processing apparatus (PDA), a personal computer, and a future type work station (WS), in which a main memory for storing general data and programs and an image memory for storing picture data for drawing and display (ex. a frame buffer) are combined with each other and thus are managed on a single memory device. Namely, this is a case wherein an access from a process or a plurality of hardware, such as access to draw, DMA transfer and direct access from software, arises.

Particularly in the case of direct access from software, in order to not affect the software interface of the prior system, namely to maintain compatibility, access processing and address translation processing must be performed. If this is not done, then it is necessary to convert the tile type arranged data into array type data by using dedicated hardware or software, and thus it takes more time and twice as many data regions are required.

In the above-mentioned WS, PC, PDA, and so on, an improved data processing apparatus which uses a portable processor for access is desired, in which a CPU and a picture processing unit for processing picture data to draw are installed as one processing unit, and a main memory and a frame buffer are combined as one memory. In such a system, in order to decrease the amount of memory, it is necessary to share the picture data region between the CPU and the picture processing unit. Further, it is necessary for the CPU to refer to the picture data as it is without making a copy. In particular, it is required to effect access in such a way as to not lose the compatibility of software, even if the data arrangement is changed.

As to a shading apparatus, Phong shading, the technique for expressing light in such a way that its direction and its strength are varied according to the expression of a curved surface or the position, is well-known, as described in, for example, "Computer Graphics: Principle and Practice". In Phong shading, the surface of a three-dimensional figure expressed by the combination of flat surfaces is smoothly shaded. The normal vector at a point on the flat surface corresponding to a display pixel is interpolated and obtained by using the value of a normal vector at each vertex defined in the step of modeling the three-dimensional figure. Secondly, on the basis of the obtained normal vector, the amount of light impinging at the point is calculated and shaded.

With regard to the normal-interpolation method, there is a known angle-interpolation method which uses a rotation matrix as described in Japanese Patent Laid-Open No. 2-202681 (1990), other than the above-mentioned method in which the normalization is performed after respective components of the vector are interpolated. This prior method states that the angle-interpolation should tee carried out by using the rotation matrix, in order to eliminate the normalization processing of a geometrical vector after interpolation.

However, the prior method as described in the above-mentioned manual aims principally at a method of obtaining a normal vector defined only by the modeling, by using interpolation. It is not, therefore, believed to simplify the calculation of luminance at a point on the flat surface. Accordingly, it is required to re-calculate more accurately the light beam essential to calculate the luminance each time.

Because in general the linearity of the vector of the light beam is not maintained on a flat surface, except in a special case, for example, in the use of a parallel light beam, the expected light vector can not be obtained by simple interpolation. Further, it is complicated to interpolate the normal.

In the method described in the above-mentioned manual, it becomes necessary to perform the normalization process after the interpolation.

It is necessary to obtain a rotation matrix and its varying portion from the value of the geometrical vector at both sides of each span, and thus the processing becomes complicated. Further, the calculation of interpolation parameters must be frequently carried out. Furthermore, because the rotation vector must be produced based on a predetermined normal vector, there is no effect if the normal vector is not constant in the figure, namely, if a curved surface is expressed by one figure.

Also in the prior method described in the above-mentioned patent application, it is necessary to obtain the rotation matrix and its varying portion from the value of the geometrical vector at both sides of each span. Further, because the rotation vector must be produced based on a predetermined normal vector, there is no effect if the normal vector is not constant in the figure, namely, if a curved surface is expressed by one figure. Accordingly, the processing of both prior methods is complicated, and the calculation of interpolation parameters must be frequently carried out.

DISCLOSURE OF INVENTION

An object of the present invention is to provide a data processing apparatus which can access, at high speed, a memory in which various kinds of data with different addresses are mixed and stored.

Another object of the present invention is to provide a shading apparatus for the above-mentioned data processing apparatus, which can express accurately and at high speed spot lights and high lights even if the amount of hardware and the number of figures are small.

Configuration of Data Processing Apparatus

The configuration of the data processing apparatus is typically as follows.

(1) A processing apparatus for processing data by accessing a memory having first data stored with a tile-type address and second data stored with an array-type address, wherein said processing apparatus accesses said memory with addressing using a tile-type address or an array-type address in response to a first process for processing said first data and a second process for processing said second data.

(2) A processing apparatus comprising a memory having first data stored with a tile-type address and second data stored with an array-type address; and a processing part for processing data by accessing said memory, wherein said processing part accesses said memory with addressing using a tile-type address or an array-type address in response to a first process for processing said first data and a second process for processing said second data.

Configuration of Shading Apparatus

The configuration of the shading apparatus is typically as follows.

(1) A shading method performed in an image display apparatus having at least one image display unit; at least one image data storing unit for storing an image displayed on said image display unit; and at least one graphic generator for generating a graphic pattern defining said image data, said shading method calculating parameters, each defining luminance at an individual pixel forming said graphic pattern, said parameters defined for an individual graphic pattern and at an individual vertex at said graphic pattern, wherein plural geometrical vectors are defined as said parameters at said individual vertex; said plural geometrical vectors are interpolated in a graphic pattern; and luminance is calculated for a small region in a graphic pattern by using plural geometrical vectors generated by interpolation.

(2) A shading apparatus included in an image display apparatus having at least one image display unit; at least one image data storing unit for storing an image displayed on said image display unit; and at least one graphic generator for generating a graphic pattern defining said image data, said shading apparatus calculating parameters, each defining luminance at an individual pixel forming said graphic pattern, said parameters defined for an individual graphic pattern and at an individual vertex at said graphic pattern, comprising: a defining means for defining plural geometrical vectors as said parameters at said individual vertex; an interpolation means for interpolating said plural geometrical vectors in a graphic pattern; and a calculation means for calculating luminance for a small region in a graphic pattern by using plural geometrical vectors generated by interpolation, said shading apparatus calculating luminance for a small region.

BRIEF DESCRIPTION OF DRAWINGS

FIGS. 2A to 2C are diagrams illustrating a data arrangement.

FIGS. 3A to 3D are diagrams illustrating address assignment.

FIG. 19 is a chart showing the average number of the tiles per a figure.

FIG. 23 is a diagram illustrating a procedure for pixel generation and the configuration of the small region in a luminance calculating method in which one light source is used.

FIG. 24 is a diagram illustrating a procedure for pixel generation and the configuration of the small region in a luminance calculating method in which two light sources are used.

FIGS. 38A to 38C are diagrams illustrating tables for the cosine approximation calculation according to the present invention.

FIG. 44 is a diagram illustrating a calculating formula and a summary of the luminance calculation according to the present invention.

FIG. 47 is a diagram illustrating a method of correcting the gradient of a normal vector.

FIG. 49 is a diagram showing a procedure for calculating the attenuation term corresponding to a spot direction in a normalized model coordinate system.

FIGS. 53A to 53C are diagrams which show examples of the format of drawing commands.

FIG. 62 is a diagram illustrating a specified algorithm of a shadow region.

DETAILED DESCRIPTION OF THE PREFERRED EMBODIMENTS

Embodiments of the present invention will be explained in detail hereinafter with reference to the drawings.

Figure 1:
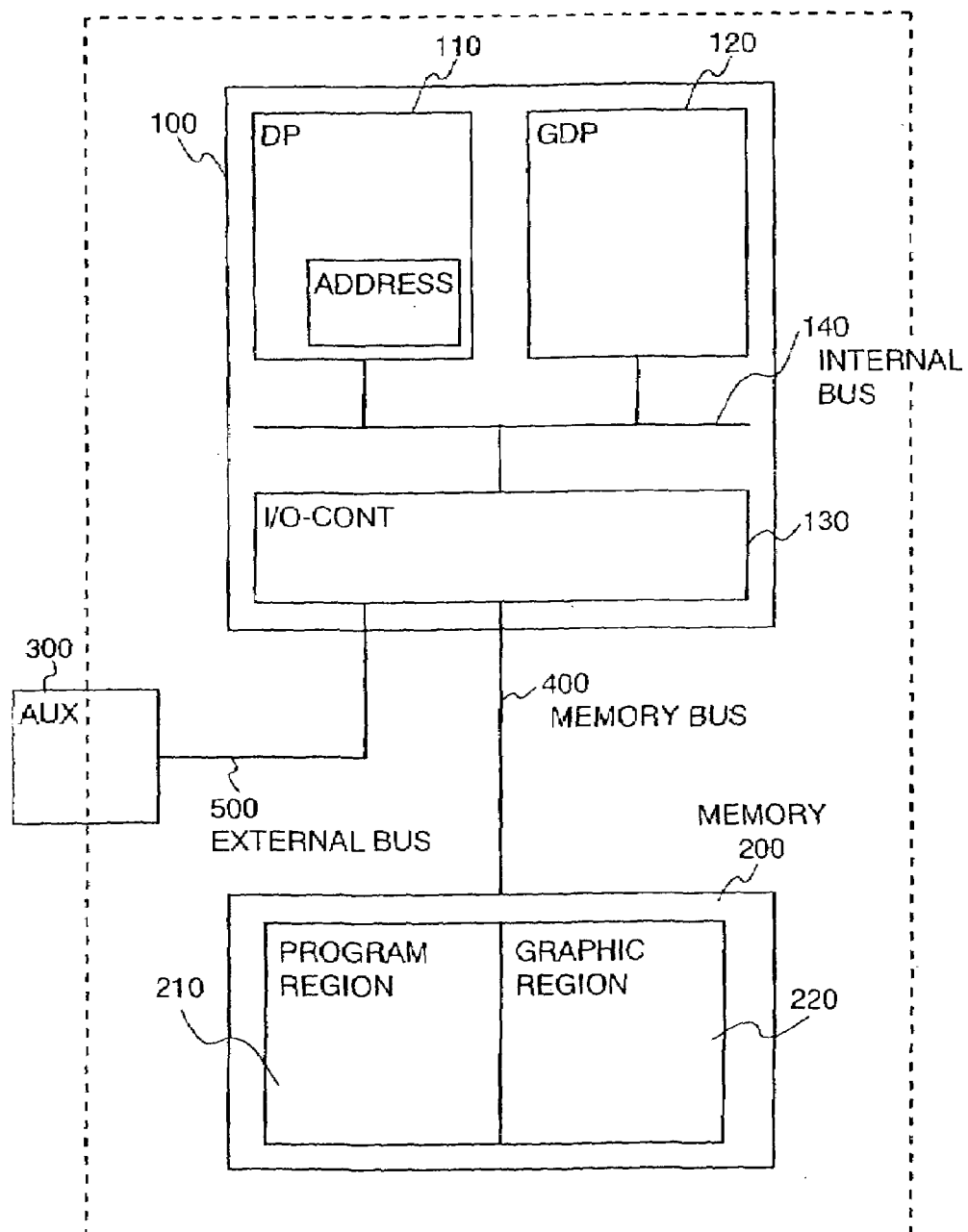
FIG. 1 is a block diagram of a data processing apparatus according to the present invention.

FIG. 1 is a schematic block diagram showing the basic configuration of a data processing apparatus of the present invention.

This data processing apparatus mainly has a processing unit 100 for processing data, including picture data, a memory unit 200 for storing programs, commands and data, including the picture data, and a memory bus 400 for connecting those units.

The processing unit 100 includes a data processor 110 for processing general data, which is not picture data, a graphic processor 120 for processing picture data according to an instruction from the data processor 110, an input/output controller 130 for controlling the access to the memory unit 200, and an internal bus 140 for connecting those units.

The memory unit 200 includes a program region 210 for storing general data and programs, and a graphic region 220 for storing graphic data relevant to a picture. Further, it is possible to connect the data processing apparatus to other memories, such as a hard disk, a floppy disk, a ROM and a CD-ROM, to display devices, such as a CRT and a liquid crystal display device, to input devices, such as a mouse and a key board, to output devices, such as a printer, and auxiliary device 300, for example, and to a communication device, such as a modem, for transferring data between the data processing apparatus and other processors, via an input/output bus 500 and an input/output controller 130. The auxiliary device can be installed inside or outside the data processing apparatus.

Next, the assignment of addressee of the data to be stored in the memory unit 200 will be explained hereinafter. Data and programs are stored in the program region 210 of the memory unit 200 as needed. The assignment of an address is the same as that of the prior art. This region is, generally, accessed in the order of the addresses, except in the case of branching processing, interrupt handling, and so on.

On the other hand, the graphic region 220 is often accessed corresponding to a screen. Namely, as shown in FIG. 2A, normally in certain picture processing, the pixel data to be processed after pixel data X0 is processed is pixel data X1 to X8 in the peripheral neighborhood of the pixel data X0. This is because the processing of the picture data handles the pixel data arranged in two dimensions and displayed. Further, in a case in which a three-dimensional figure is displayed, the neighbor pixel data as described above may be processed.

Furthermore, all the display regions and drawing regions of the subject to be picture-processed may not be processed at the same time, but may be processed for every body and figure to be displayed. In this figure, the screen is formed of 12×12 pixels. When such pixel data corresponding to the screen is assigned to a memory, the arrangement of the pixel data as shown in FIG. 2B is obtained if the addresses 0 to n are assigned according to the arrangement of the whole screen. If in such arrangement the neighbor pixel data is processed in order, it takes much time to calculate addresses because the addresses for these pixel data to be stored are discrete. Therefore, as the amount of the pixel data to be processed increases, the processing time increases correspondingly.

Accordingly, a plurality of pixel data are put together for every predetermined-sized rectangular region (block), and addresses are assigned to them. Namely, for the example shown in FIG. 2B, the addresses shown in FIG. 2C are assigned in order to assign the addresses as a group to a block of 3×3 pixel data. By putting together two-dimensionally arranged pixel data for every block and assigning the addresses to them, the calculation of addressee of the neighbor pixel data becomes easy and high speed access becomes possible.

It will be appreciated that the rectangular form of the block is not the only form that may be used, but also other forms are possible, and its size may be varied according to the content of the processing. Such parameters can be set by using software or hardware. Concretely, the block is oblong, that is, long from side to side or from top to bottom. Further, in order to simplify the hardware, its size is set to be 2 to the nth power. This form is stored as arrangement information in an address translation table which is assigned to every logical page, and for the purpose of high-speed processing, a copy thereof is stored in a transfer look-aside buffer (TLB). This is set by the operating system. It is also possible to realize, by using hardware, bundling logic for the specified use, by performing a specified operation for the cut-out of the higher-order bit of the logical address.

Figure 5:
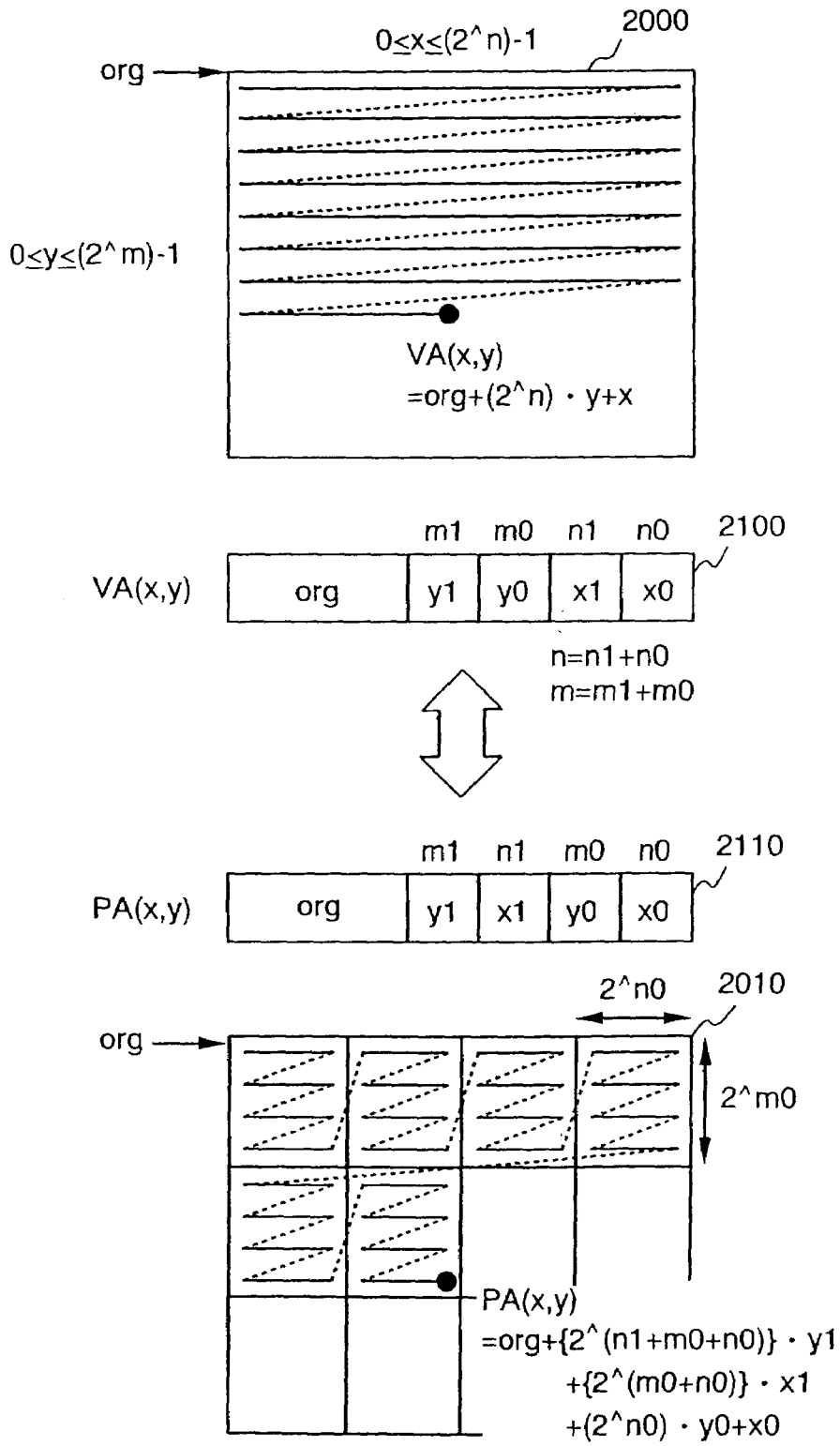
FIG. 5 is a diagram which illustrates a relationship between a tile type arrangement and an array type arrangement.

A specific method for address designation using software will be explained with reference to FIG. 8. Information is encoded and stored in a flag region 2217 of the entry of the translation look-aside buffer. This information is retrieved by the logical address of the corresponding page when data is referred and read out. If it is designated that the width of the oblong region is 2 to the power of n0 and its length is 2 to the power of m0, then a logical address 2100 of an array type arrangement is converted into a physical address 2110 of a tile type arrangement, as shown in FIG. 5. This conversion can be realized by replacing y0 with x1, as shown in FIG. 5. This replacement indicates that the physical address does not increase continuously when referring to it continuously, namely, when the increment of the logical address is constant. That is, the next address can be obtained by adding [the increment of (2 to the power of n0)−1] to [2 to the power of (m0+1)−1] multiplied by 2 to the power of (n0−1).

The operation of the data processing apparatus which is carried out, when the memory unit 200 in which addresses have been assigned is accessed, will be explained next. FIG. 3A shows a two-dimensional address (X, Y) based on the two-dimensional axes of coordinates of a screen. This two-dimensional address is used as a parameter which is given to a command of the data processor 110. In this example, it has the magnitude of 12 by 12. The data processor 110 performs the processing by converting the two-dimensional address into the above-mentioned array type address or logical address.

FIG. 3B shows the logical address corresponding to the arrangement of the two-dimensional address. The graphic processor unit 120 accesses the memory unit 200 in accordance with an instruction from the data processor 110. The logical address of the graphic processor unit 120 or picture logical address has the tile type arrangement shown in FIG. 3C. The arrangement of the pixel data assigned to each physical address of the memory unit is the same as that assigned by the picture logical address, as explained above. Namely, because the access to the pixel data is performed by the graphic processor 120 more frequently than the data processor 110, the pixel data at the picture region of the memory unit 200 is arranged in accordance with the tile type.

FIG. 3D shows the relationship among the physical address of the memory unit 200, the logical address of the data processor and picture logical address of the graphic processor unit 120.

By allowing the physical address and the picture physical address directly to correspond to the pixel data to speed up the picture processing, it becomes possible to effect access between the pixel region of the memory unit 200 and the graphic processor unit 120 without address translation, and it becomes easy and speedy to access the pixel data in the neighborhood of the objective pixel data. Further, the access from the data processor 110 to the pixel data is performed by converting the logical address of the data processor into the picture logical address or physical address. The access to the normal data is performed by the same address translation as the prior art, that is, the conversion from the logical address to a physical address, because the access is to the program region.

In order to perform such an operation, the data processing apparatus has a region determining unit for determining to which regions of the memory unit 200 the data accessed by the data processor 110 belongs, and an address converter for converting a logical address into the physical address of the graphic region (tile type address) if it is determined by the region determining unit that the data belongs to the graphic region, and for converting the logical address into the normal physical address if it is determined that the data belongs to the program region.

In the data processing apparatus according to the present invention, the content of the processing of the address translation is changed according to which data regions are accessed. The change in the processing content of the address translation refers to a conversion of the logical address into either an array type address or a tile type address. Further, in the data processing apparatus according to the present invention, it is possible to use the above-mentioned address translation also in a case where the instruction of the access to the pixel data is performed against the graphic processor 120. In such a case, the function of determining whether or not the access is to the graphic processor 120 is assigned to the region determining unit. If the access is to the graphic processor 120, then the logic address is converted into a physical address (tile type address) corresponding to the graphic address by the address converter.

While in the foregoing description, access to picture data has been explained, in a case where the calculation of a matrix is carried out by the data processor 120, it is possible to directly effect access in a way similar to the operation of the above graphic processor unit 120 by storing the matrix data in the memory unit 200 as a physical address in the form of a tile type address of a two-dimensional arrangement like the pixel data. In this case, it is sometimes necessary to provide an address converter for converting a picture logical address into a physical address in order to effect access to the matrix data by the graphic processor 120. However, if the assignment of the tile type addresses, which are the physical addresses of the matrix data and the pixel data is the same as each other, it is possible to effecting the processing in the same way, except for the fact that some of their parameters are different from each other. It is also possible to employ a cache memory in the data processor 110 in a similar way. However, it is necessary to provide the function of accessing the date in the memory unit 200, when a cache miss occurs, to an input/output controller 130.

A characteristic feature of the present invention is that various kinds of address translation from a logical address to a physical address are performed.

Figure 4:
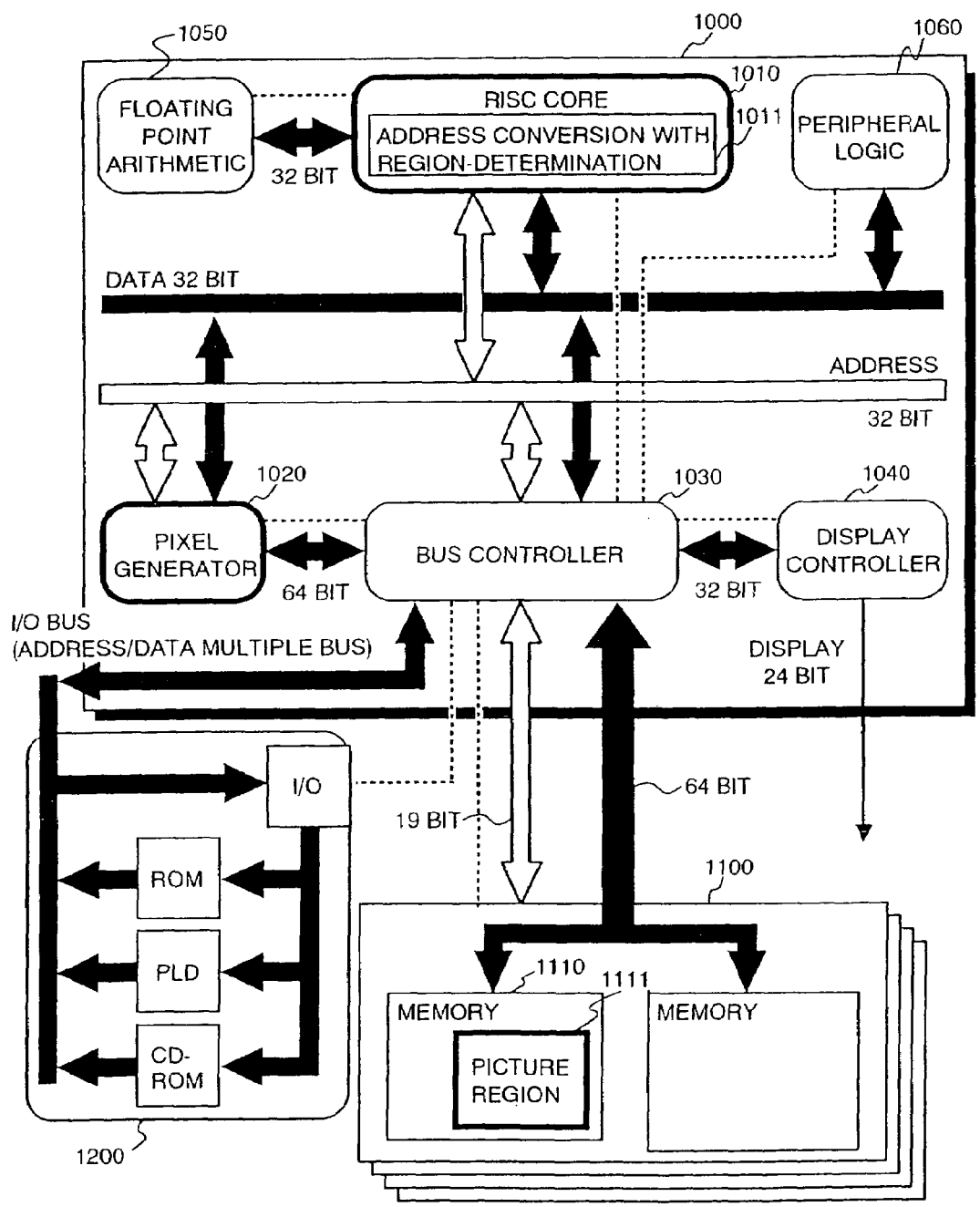
FIG. 4 is a functional block diagram of the system.

The data processing apparatus according to the present invention will be explained in more detail hereinafter. FIG. 4 shows an example of the configuration of the data processing apparatus according to the present invention. The data processing apparatus shown here includes a media processor 1000, in which an arithmetic processing unit and a pixel generator are formed in one chip, four sheets of memory modules 1100, and an external sub-system 1200. The media processor 1000 and the memory module 1100 are connected by a data bus of 64 bits, and the media processor 1000 and the external sub-system 1200 are connected by an address/data bus of 8 bits.

The media processor 1000 has a RISC core 1010, which serves as the arithmetic processing unit, a pixel generator 1020, a bus controller 1030, a display controller 1040, a floating point arithmetic unit 1050, and peripheral logic 1060. The RISC core 1010, the pixel generator 1020, the bus controller 1030 and the peripheral logic 1060 are connected to one another by an internal address bus of 32 bits and an internal date bus of 32 bits, the RISC core 1010 and the floating point arithmetic unit 1050 are connected by a data bus of 32 bits, the bus controller 1030 and the pixel generator 1020 are connected by a dedicated data bus of 64 bits, and the bus controller 1030 and the display controller 1040 are connected by a data bus of 32 bits.

Two synchronous type dynamic memories 1110 with a capacity 8M bits and an input/output width of 32 bits are installed in the memory module 1100. The memory has a picture region 1111 for storing pictures referred to by the pixel generator 1020 and other pictures referred for a purpose different from arithmetic processing, in addition to the region that the RISC core uses to perform arithmetic processing.

Before starting the graphic display processing, picture data such as patterns stuck to a figure, and a vertex calculation program, for performing coordinate conversion with respect to the vertex of the figure, are supplied from the external subsystem 1200 connected by the address bus of 8 bits and the data bus of 8 bits to the memory module 1100. The RISC core 1010 calculates the position of the figure to be displayed on the screen and the position of the patterns to be stuck by using the floating point arithmetic unit 1050, based on the vertex calculating program set previously, converts the command form which can be interpreted by the pixel generator 1020, and stores the commands into the memory module 1100. The pixel generator 1020 reads out the stored commands, interprets. As a result, the value of each pixel of the figure to be displayed is determined and stored in the position of appropriate an physical address. At this time, the positions of the pictures are in the tile type. Because the data is referred to frequently in a horizontal and a vertical direction, in drawing picture with many black portions, the above-mentioned process is used to speed up the reference. The pictures of the memory module 1100 are produced by accessing data which is readout by the display controller 1040 and output to a monitor as data to be displayed. The picture region 1111 is mainly used for the purpose of storing pixels generated by the pixel generator 1020.

With regard to the generation of a pixel, typically in the painting of a whole picture, there is a high probability that a memory access will occur in a two dimensional neighborhood. Therefore, it is desirable to make the configuration of the picture region 1111 a tile type address arrangement as described with reference to FIG. 5. However, this region is also accessed by the RISC core. This mainly occurs in the case where the picture generated by the pixel generator 1020 is referred to by a program to check, or the processing of the generation of a pixel, which is impossible for the pixel generator 1020 to perform, is performed by a program. The access from the program must not be a tile type access, but an array type access, owing to reasons to be explained later. The RISC core 1010 has an address converter 1011 with a region determining function.

Next, the address arrangement will be explained in detail with reference to FIG. 5. The access from the RISC core 1010 is provided in the form of the array type arrangement 2000 according to the logical access VA2100. The array is $2^n$ wide and $2^m$ long. An access occurs when an address, continuously generated by the RISC core, is formed like a pattern returning at $(2^n)-1$, as shown in FIG. 5. The relationship between a logical address and a two-dimensional address (x, y) indicates that the lower order n bits of VA 2100 has the value of x and the m bits which follow it has the value of y.

Assuming that the address of the origin is org, VA 2100 is expressed by the following equation:

$$VA(x, y)=org+(2^n)y+x$$

While, the continuous data on the memory is formed like a tile type arrangement 2010 according to the physical address PA 2100. The tile arrangement is $2^n$ wide and $2^n$ long. A continuous access is formed like a tile type pattern returning at $(2^{n0})-1$ in a horizontal direction and returning at $(2^{m0})-1$ in a vertical direction. A line in the horizontal direction of the tile is returned at $(2^{n1})-1$.

The relationship between the physical address and the two-dimensional address (x, y) indicates that the lower order n0 bits of PA2110 have the value of x0 and the m bits which follow it have the value of y0, while the n1 bits which follow further have the value of x1 and the m1 bits which follow furthermore have the value of y1. Here, x1 and x0 are the higher order n1 bits of x and its lower bits n0, respectively. Having assumed that the address of the origin is org, PA 2110 is expressed by the following equation:

$$PA(x, y)=org+\{2^{(n1+m0+n0)}\}y1+x1+(2^{n0})y0+x0$$

The address translation from an array type to a tile type represents a conversion from VA 2100 to PA 2110.

Figure 6:
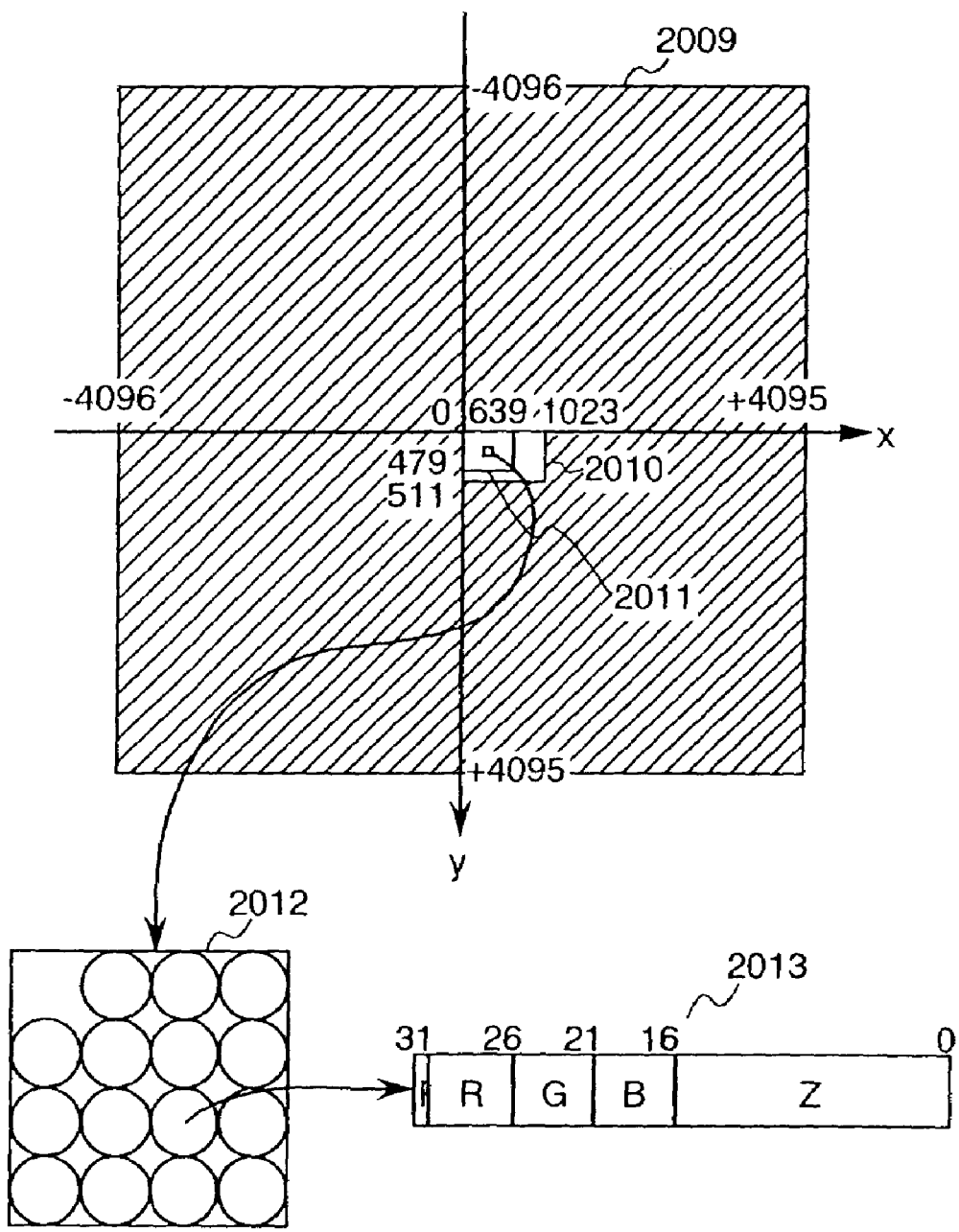
FIG. 6 is a diagram of a logical space of a picture region.

Next, the actual configuration of the tile type arrangement 2010 will be explained in detail with reference to FIG. 6. The logical address handled by the pixel generator 1020 is in a space 2009 in which it is possible to express plus and minus 4095 pixels. The space in which the memory addresses are actually assigned is only within the portion of the tile type arrangement 2010. Further, the portion used for display is a region 2011 formed by 640×480 pixels. One tile 2012 within the region 2011 is configured with 16 pixels, namely, 4 pixels in width and 4 pixels in length. Each pixel 2013 has 32 bits, namely, depth information of 16 bits, color information RGB each having 5 bits, and flag information F of 1 bit.

Figure 7:
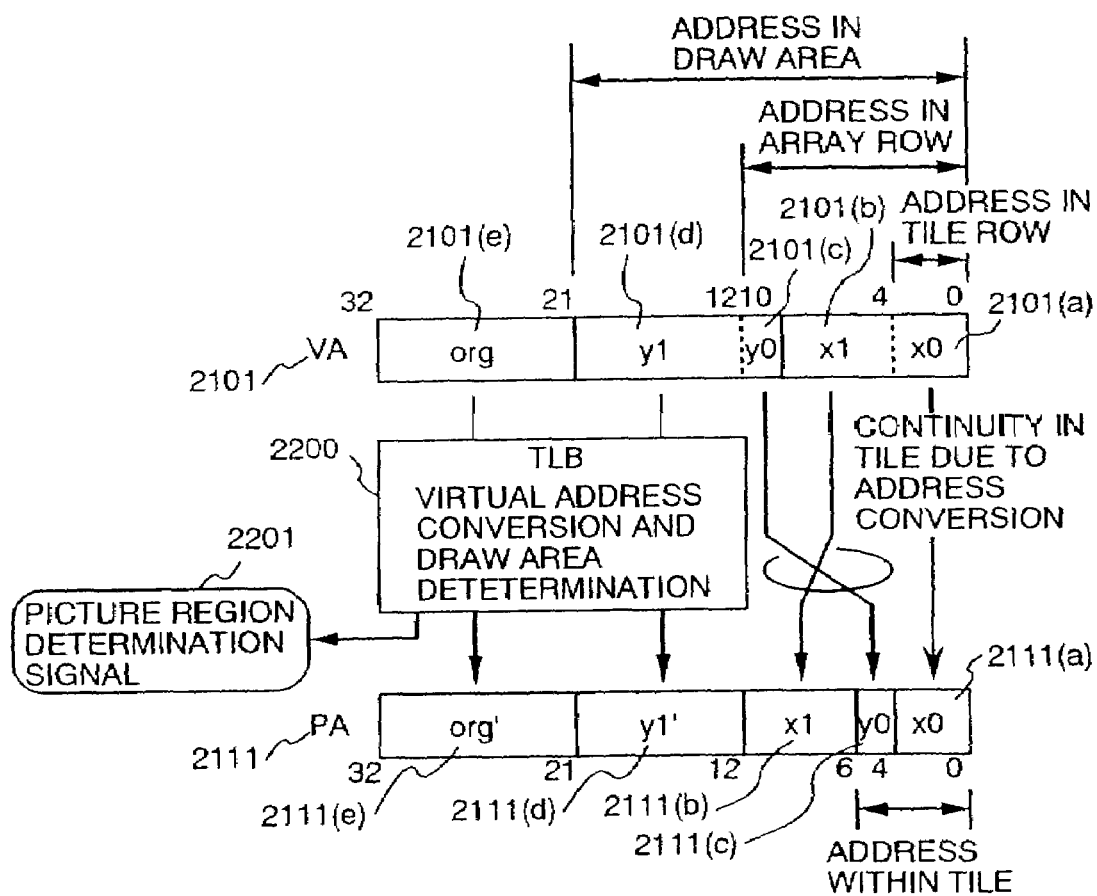
FIG. 7 is a diagram of two-dimensional address translation.

FIG. 7 illustrates the conversion from the logical address VA 2101 to the physical address PA 2111. The lower order 4 bits 2101(a) define an address x0 within the tile-row and are not converted as lower order 4 bits 2111(a). Tile-row addresses 2101(c) and 2101(b) within an array-row are sorted such that data within the tile becomes continuous. As a result, addresses 2111(b) and 2111(c) are obtained. The original address org 2101(e) and the vertical direction tile address 2101(d) are converted into org 2111(e) and vertical direction tile address 2111(d) by a normal address converter 2200. At this time, the result 2201 of the determination instructing the requirement for the sorting of 2101(c) and 2101(d) is output by the region determining unit at the same time.

Figure 8:
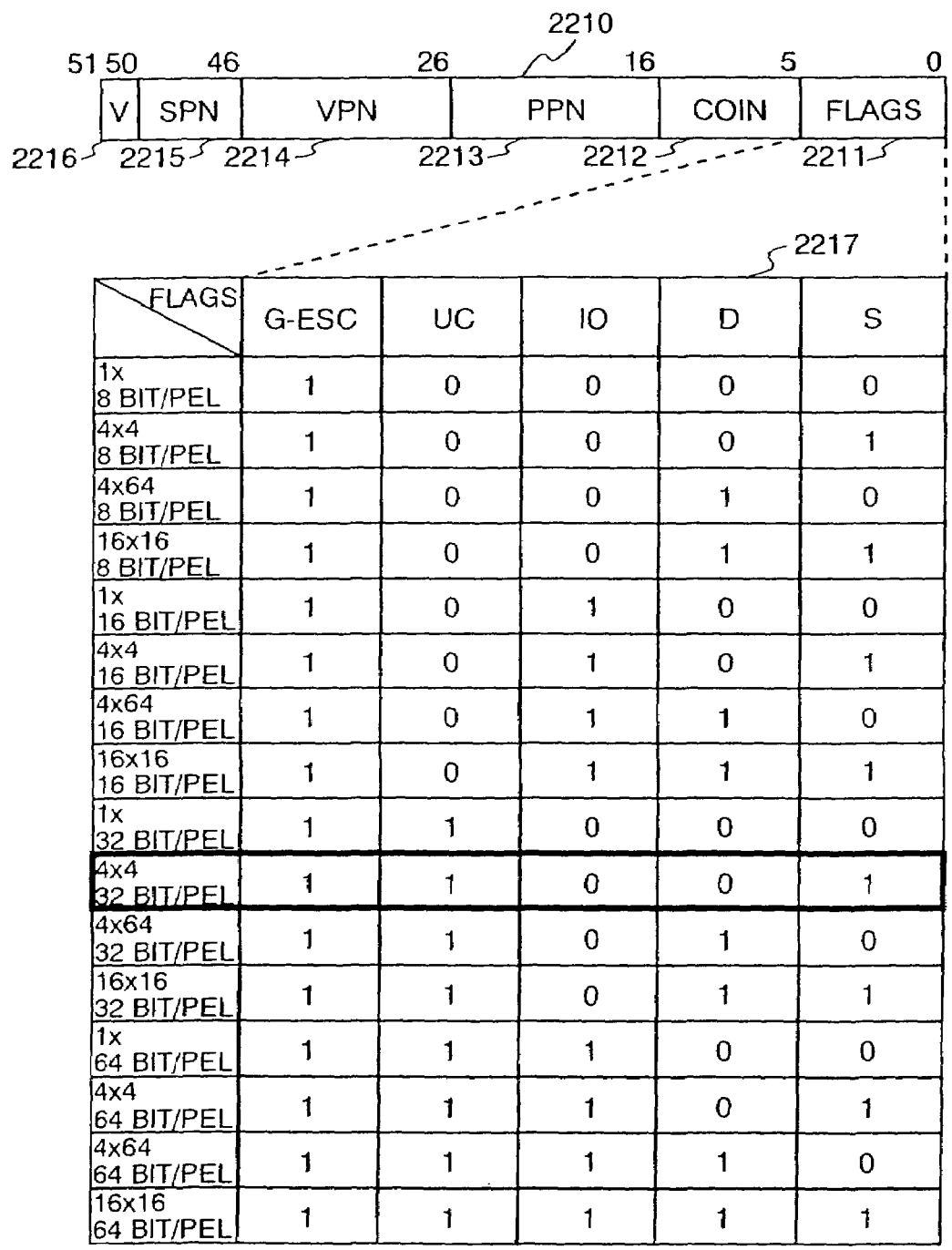
FIG. 8 is a diagram of a conversion table.

Referring to FIG. 8, the unit for producing a picture region determining signal 2201 will be explained by using the entry of the translation look-aside buffer (TLB). The entry format 2210 of the translation look-aside buffer (TLB) comprises flag information FLAGS 2211, permission process information COIN 2212, physical page number PPN 2213, logical page number VPN 2214, space number SPN 2215, and effective bits V2216.

Among this information, the information relevant to the provision of an address is included in the flag information FLAGS 2211, the details of which are shown in table 2217. Among 5 bits of the FLAGS 2211, G-ESC designates a graphic escape bit. If the G-ESC is at "1", then the four remaining bits indicate the tile information, and if "0", then the four remaining bits each are used for a different meaning.

The tile information indicates the tile size and the configuration of a pixel. The portion surrounded by a thick frame corresponds to the tile shown in FIG. 6. A flag indicating whether or not an address is the tile type is included in the RISC core 1010 as one portion of the process information. The picture region determining signal 2201 is effective only when the flag indicates that the address is not of the tile type.

Figure 9A:
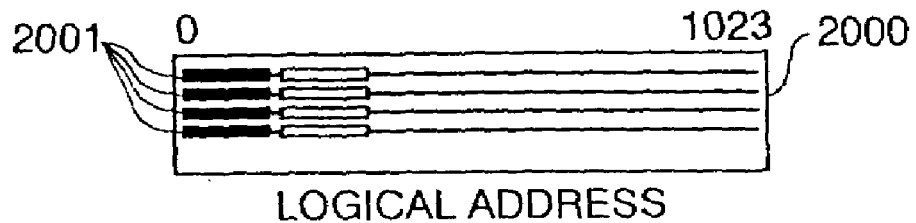
FIGS. 9A to 9E are diagrams showing the relationship between an access pattern and a physical address.
Figure 9B:
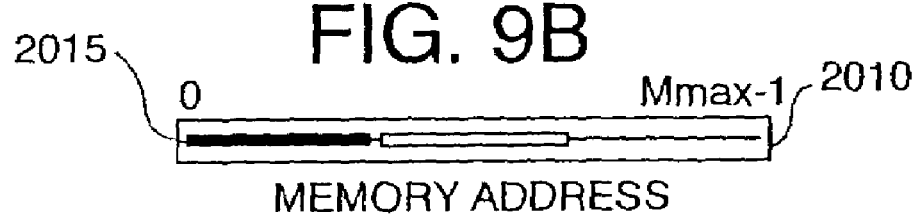
Figure 9C:
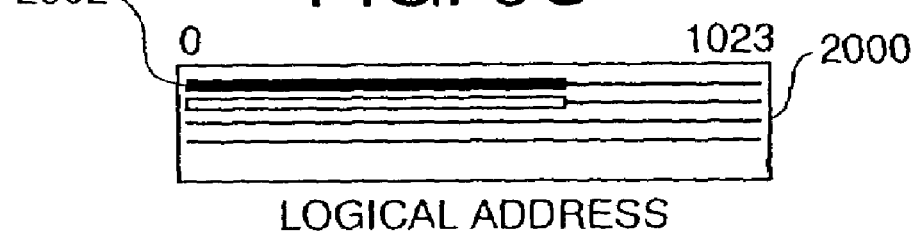
Figure 9D:
Figure 9E:
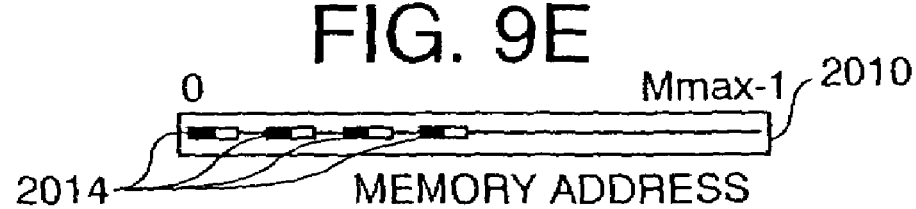

FIGS. 9A to 9E illustrate access patterns according to the address converting method. In FIGS. 9A and 9B, if the access 2001 along the tile from the pixel generator 1020 to the array type arrangement 2000 in the logical space has occurred, the access pattern 2015 on the tile type arrangement 2010 in the physical space becomes continuous. In FIGS. 9C to 9E, if the access 2002 of an array state from the RISC core 1010 to the array type arrangement 2000 in the logical space has occurred, the access pattern 2014 on the tile type arrangement 2010 in the physical space becomes discontinuous.

Figure 10:
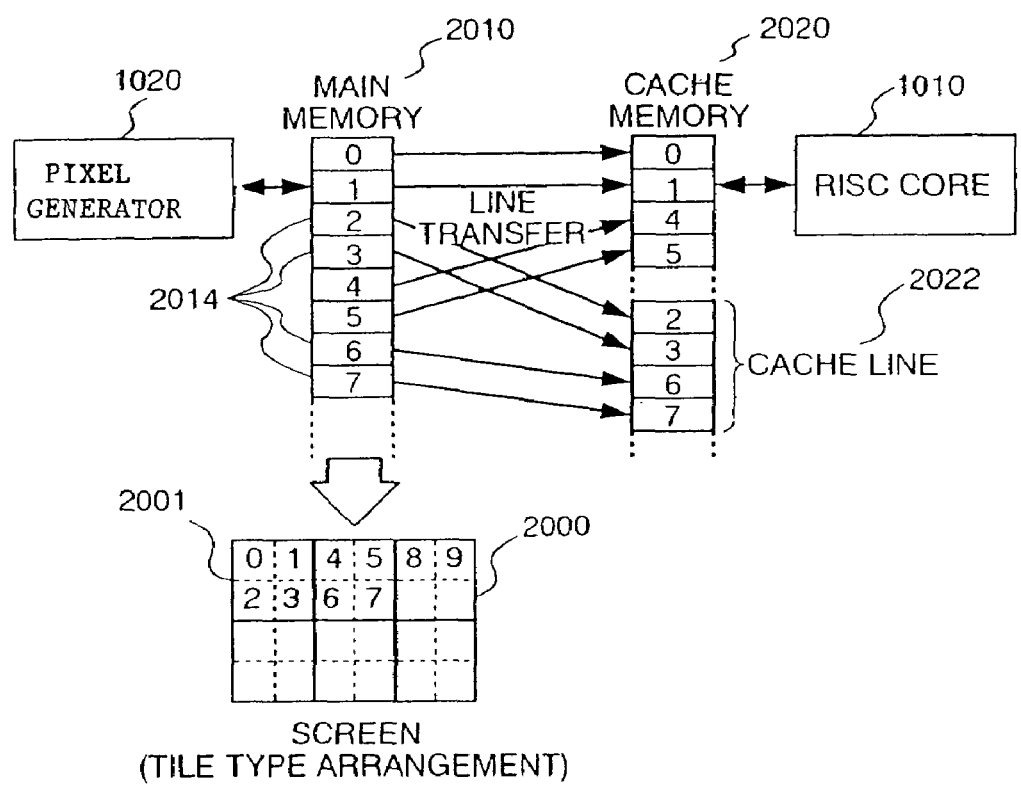
FIG. 10 is a diagram illustrating the relationship between an access pattern and a physical address.

Referring to FIG. 10, the transfer of data between the memory 2010 and the cache 2020 according to the access patterns shown in FIGS. 9C to 9E will be explained in more detail. The data arrangement within the memory 2010 is substantially a one-dimensional arrangement. The data number of 0 to 7 is taken as shown in FIG. 10. When this data is within the picture region, this data is recognized by the pixel generator 1020 as a tile-like address space 2000. To speed up the operation of the pixel generator 1020, the data within the tile 2001 is assigned so as to be positioned in the same neighborhood on the memory. Namely, in the example of this figure, the data within the tile is configured as (0, 1, 2, 3) (4, 5, 6, 7).

A main point of the present data transferring method is that a discontinuous access is referred to by the continuous virtual address, and thus a continuity is provided to the data itself. To realize such a method, the date arrangement in a cache line 2022 forming the cache memory 2020 is sorted at the time of the transfer of the cache line. Namely, in the example of this figure, the cache line is configured like (0, 1, 4, 5) (2, 3, 6, 7).

While the access from the RISC core 1010 becomes to have continuity, the memory access due to the line transfer becomes discontinuous, and thus an overhead occurs. This occurs only at the time of the transfer. However, the average overhead is negligible because the average overhead is obtained by multiplying the above-mentioned overhead by the rate of miss of the cache. If the present method is not used, the overhead occurs every cycle. Therefore, the machine cycle time is increased, and thus the performance is lowered as a whole. This discontinuity control is realized by the recombination of the tile-row address within the array-row in FIG. 7. However, if the recombination is made every time, the performance is lowered. It is, therefore, desirable that the discontinuous data looks like the continuous access 2022 on the cache memory 2020. This scheme will be explained hereinafter with reference to FIGS. 11 to 13.

Figure 11:
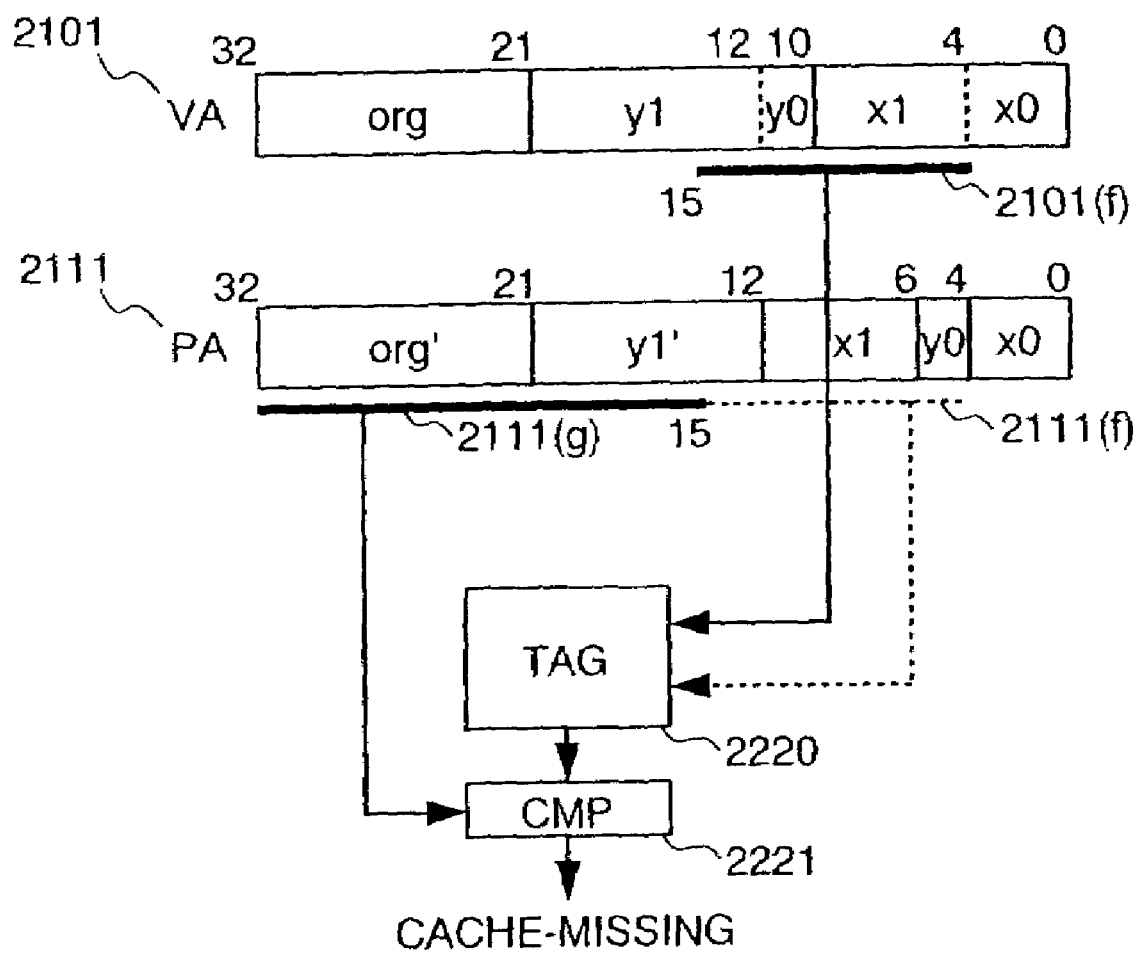
FIG. 11 is a functional diagram of address management of a cache memory.

FIG. 11 shows a miss determining unit of the cache memory. When the cache line is 16 bytes and the number of entries is 2048, the physical address 2111(*f*) is used as the address of a cache tag 2220, and the physical address 2111(*g*) is used as the higher order address input to the determining unit 2221. Because it is necessary to recombine the addresses to produce the physical address 2111(*f*), it is necessary to wait for the result of determination of the region. Therefore, the delay time is increased, and thus the performance is lowered.

In accordance with the present invention, the logical address 2101(*f*) is used instead of the physical address 2111(*f*). If the line size of the cache memory is smaller than the tile width, the physical address 2111(*f*) does not include the address x0 within the tile-row, as shown in FIG. 11. At this time, only the position of the entry in which the data is stored changes by using the logical address 2101(*f*) instead of the physical address 2111(*f*). Because this change is the same as that in the entry position of the logic draw cache memory, no problem results from the difference. If the line size of the cache memory is larger than the tile width, the physical address 2111(*f*) includes address x0 within the tile-row.

At this time, to use the logical address 2101(*f*) instead of the physical address 2111(*f*), namely, the effect of the replacement of data due to the tiling has an impact on not only the entry position of the cache memory, but also the data arrangement within the line. By rearrangement of the data within a line when the line transfer is performed at the time of a miss in the cache memory, it becomes possible to eliminate the overhead of the rearrangement by the line transfer overhead.

Figure 12:
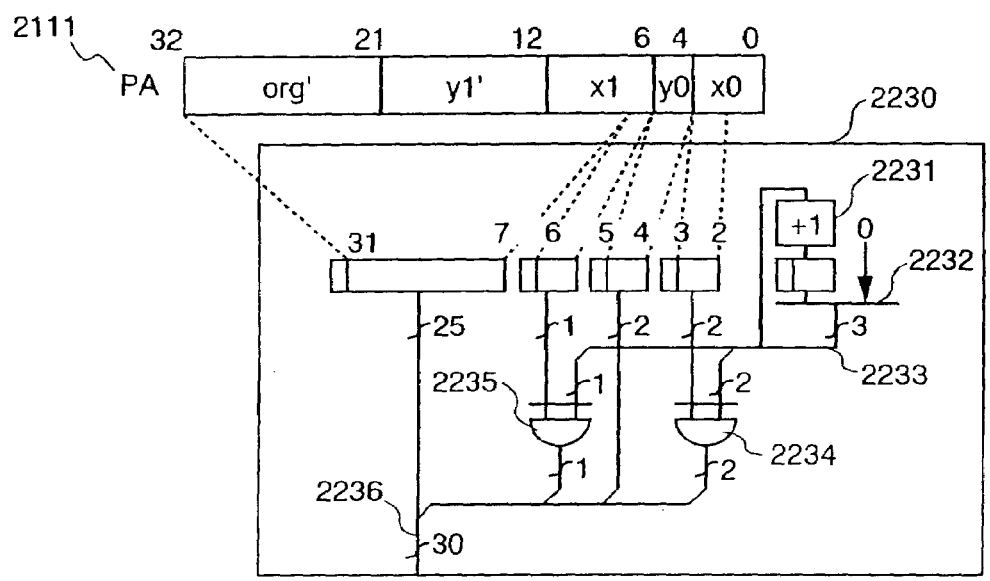
FIG. 12 is a functional diagram of address management of a cache memory.

FIG. 12 illustrates the control of the production of the memory address performed when a line transfer is carried out. The corresponding physical address PA2111 is obtained by address translation when the cache memory misses. It is assumed that the width of the tile is 16B, its size is 64B, the size of the cache line is 32B, and the unit of data transfer is 4B. Because the lower order 2 bits (1:0) represent an address within the unit of the data transfer, it is not required to designate the address. Because bits (3:2) of the physical address PA2111 represent an address within the tile row, the bits change according to a counter. Because these 4 words form 16B, half of the cache lines can be accessed. The bit (5:4) is a tile-row address. The array type access is unchangeable. The bit (31:6) is a tile address. The lowest order bit (6) changes according to the counter to changeover the tile to access the remaining half of the cache line.

Reference numeral 2230 designates hardware for producing the memory address at the time of line-transfer. An incrementer 2231 is a counter for the change in address and is 3 bits in width so as to transfer the cache line 32B eight times. At the time of starting the transfer, "0" is selected by a selector 2232, a variation signal 2233 is produced until "7", is obtained. The lower order 2 bits of the variation signal 2233 is used for changing the word address within the tile-row. More concretely, these bits are combined with the bit (3:2) of the physical address PA2111 using an exclusive "or" gate 2234. The higher order 1 bit of the variation signal 2233 is used for changing the tile address. More concretely, the bit is combined with the bit (6) of the physical address PA2111 using an exclusive "or" gate 2235. A memory address 2236 at the time of the line transfer is formed from the invariable component and the variable component obtained.

Figure 13:
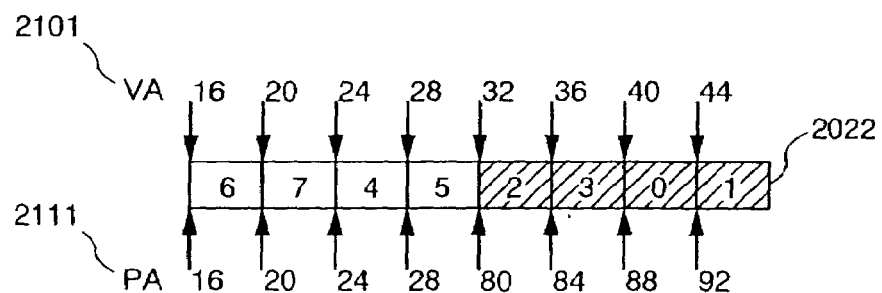
FIG. 13 is a diagram showing of address management of a cache memory.

FIG. 13 illustrates the order of production of the memory address at the time of the line transfer of a cache. As an example of a cache line 2022, 32B is considered, in which both the physical address and the logical address are started from an address 16. The row of the logical address VA2101 of the word included in the line is (16, 30, 24, 28, 32, 36, 40, 44), and the row of the logical address PA2111 is (16, 20, 24, 28, 80, 84, 88, 92). If 40 in VA2101 and 88 in PA2111 are the cache-missed words, the cache line is accessed in the order of (40, 44, 32, 36, 24, 28, 16, 20) in VA2101 and (88, 92, 80, 84, 24, 28, 16, 20) in PA2111.

Figure 14A:
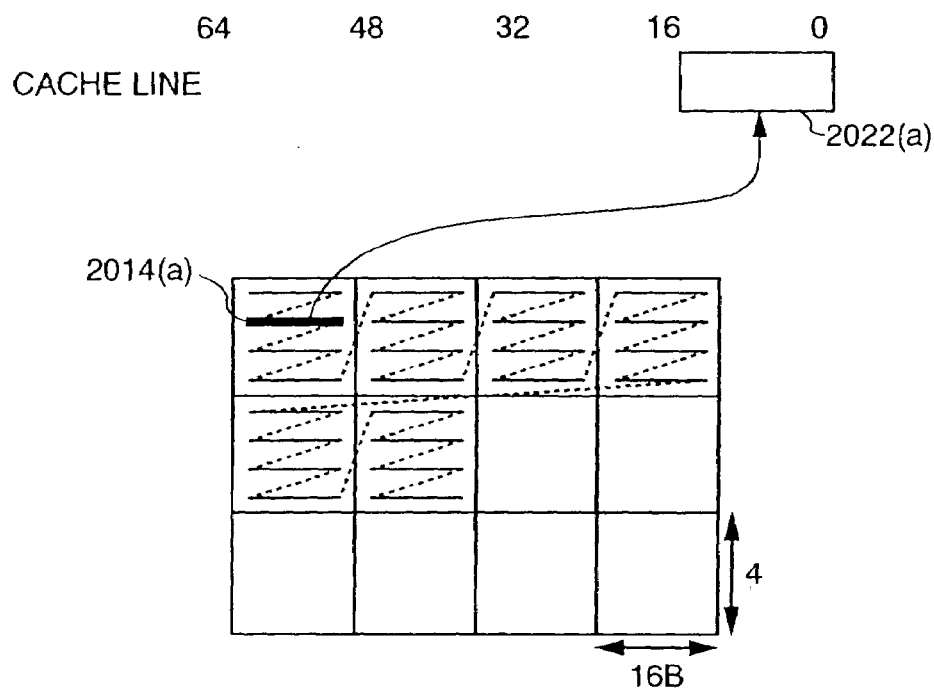
FIGS. 14A and 14B are diagrams which show a line-transfer method.

FIG. 14A shows the state of the line transfer in case the line size of the cache memory is smaller than the width of the tile. In such a case, as shown in FIG. 11, the date corresponding to the entry pointed to by the logical address is stored. Namely, data 2014(*a*) within the tile type arrangement 2010 is transferred to a line 2022(*a*) of the corresponding cache memory.

Figure 14B:
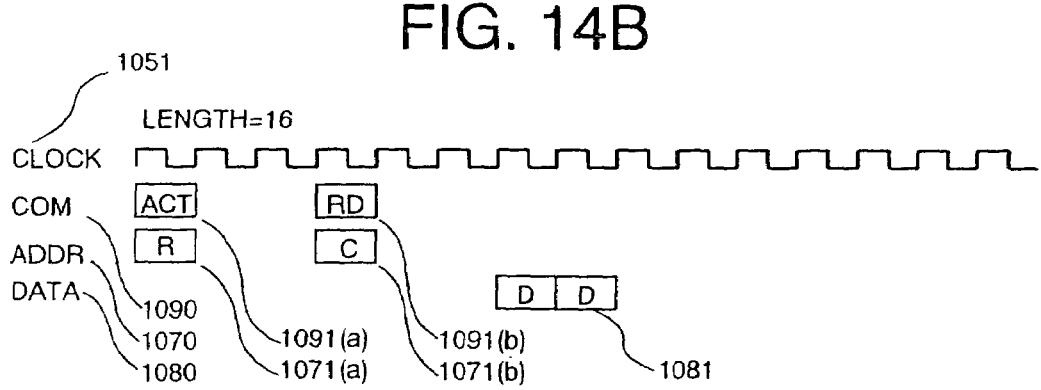

A time chart of the line transfer is shown in FIG. 14B. A synchronous type DRAM operates as a physical memory in synchronization with a clock 1051. At the time of a cache memory miss, a line transfer request is output from the bus controller 1030. Then, an address signal 1070 and a command signal 1090 to transfer data to a memory line buffer at the inside of the synchronous type DRAM are output at the timing of 1071(*a*) and 1091(*a*), respectively. Next, a start address and a command to read out data 1080 continuously are output at the timing of 1071(*b*) and 1091(*b*) after the lapse of 2 cycles, respectively. Data corresponding to these serial commands and addresses is transferred in 2 cycles, at the timing of 1081 after a further lapse of 2 cycles.

Figure 15A:
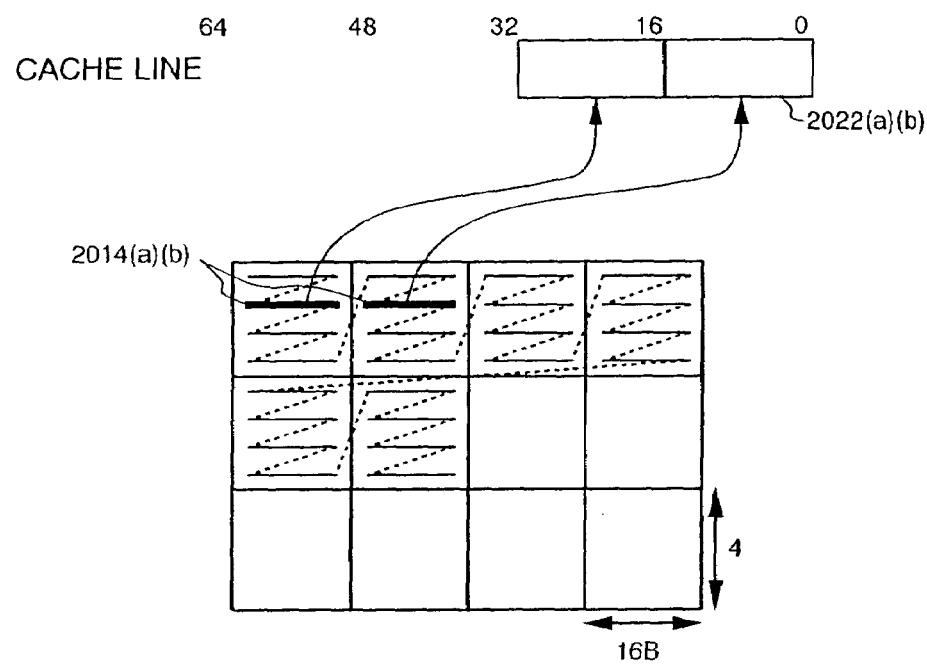
FIGS. 15A and 15B are diagrams which show a line-transfer method.

FIG. 15A shows the state of the line transfer in case the line size of the cache memory is twice as large as the width of the tile. In this case, corresponding data is stored from tiles adjacent to the entry designated by the logical address. Namely, data 2014(*a*) and (*b*) within the tile type arrangement 2010 are transferred to lines (*a*) and (*b*) of the corresponding cache memory 2022(*a*) (*b*).

Figure 15B:
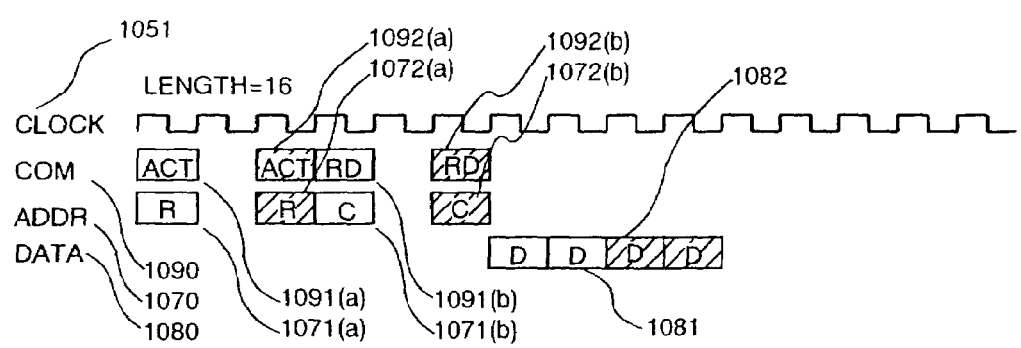

FIG. 15B shows a time chart of the line transfer. As seen from FIG. 15B, the same transfer as FIG. 14B is repeated twice. Namely, commands 1092(*a*) and (*b*), addresses 1072 (*a*) and (*b*) and data 1081 and 1082 are added to the previous transfer.

Figure 16A:
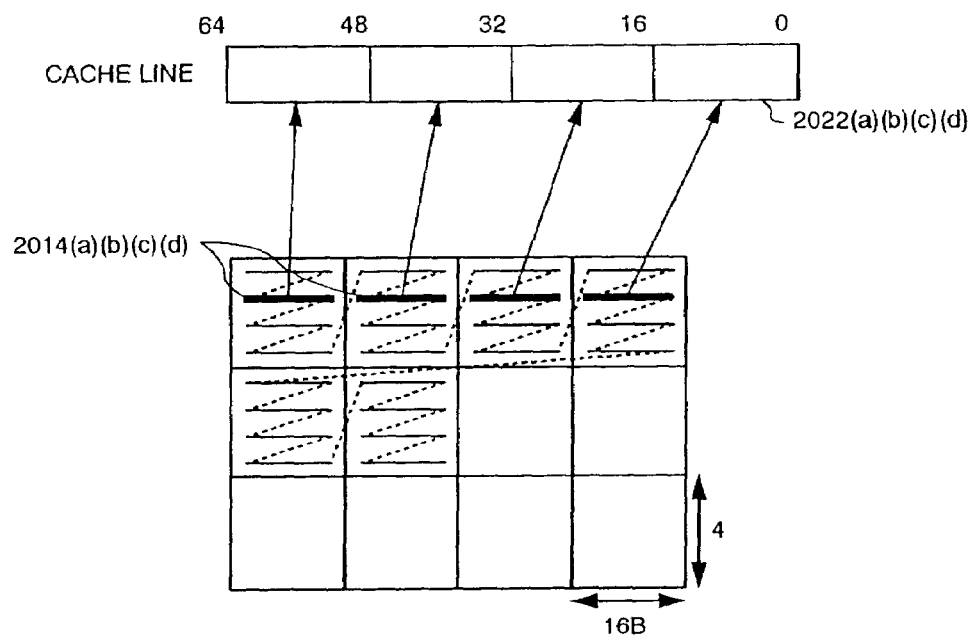
FIGS. 16A and 16B are diagrams which show a line-transfer method.

FIG. 16A shows the state of the line transfer in case the line size of the cache memory is four times as large as the width of the tile. In this case, corresponding data is stored from two tiles adjacent to the entry designated by the logical address. Namely, data 2014(*a*), (*b*), (*c*) and (*d*) within the tile type arrangement 2010 are transferred to lines 2022(*a*), (*b*), (*c*) and (*d*) of the corresponding cache memory.

Figure 16B:
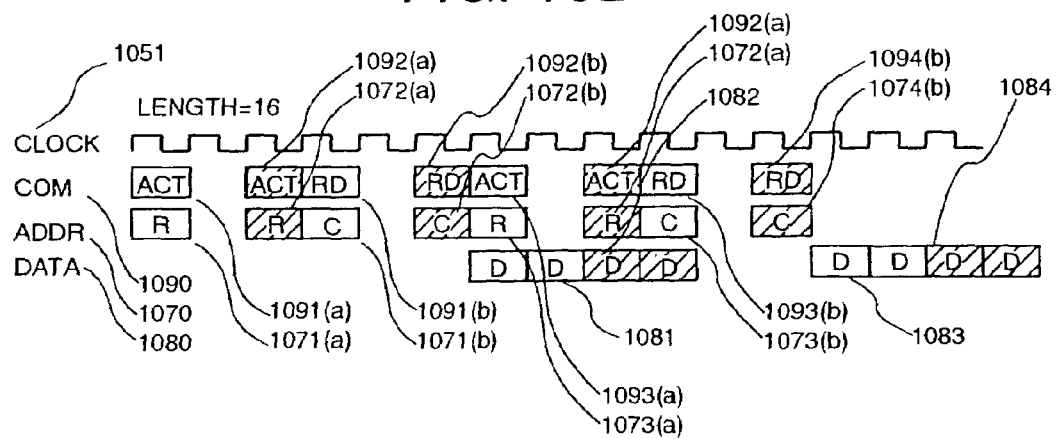

FIG. 16B shows a time chart of the line transfer. As seen from FIG. 16B, the same transfer as FIG. 15B is repeated twice. Namely, commands 1093(*a*) and (*b*), commands 1094(*a*) and (*b*), addresses 1073(*a*) and (*b*), data 1081 and 1082 and data 1083 and 1084 are added to the previous transfer.

Figure 17:
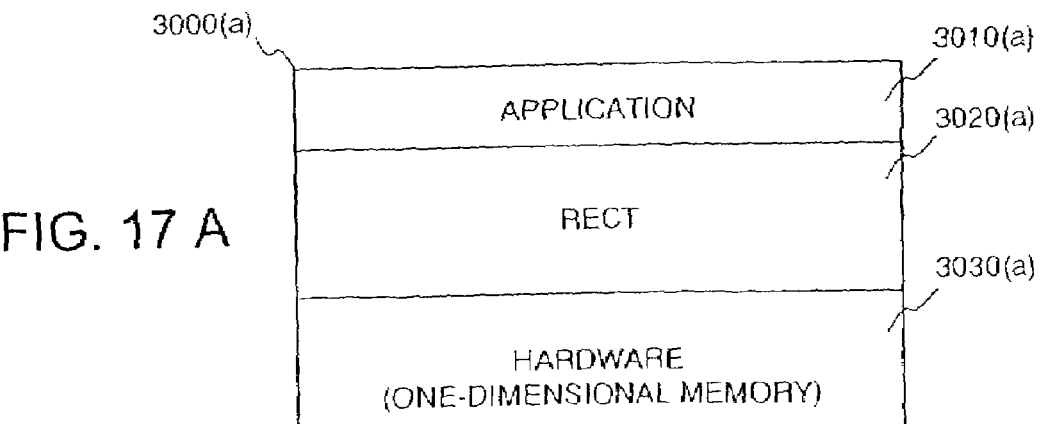
FIGS. 17A to 17C are diagrams of examples of a software system.
Figure 17:
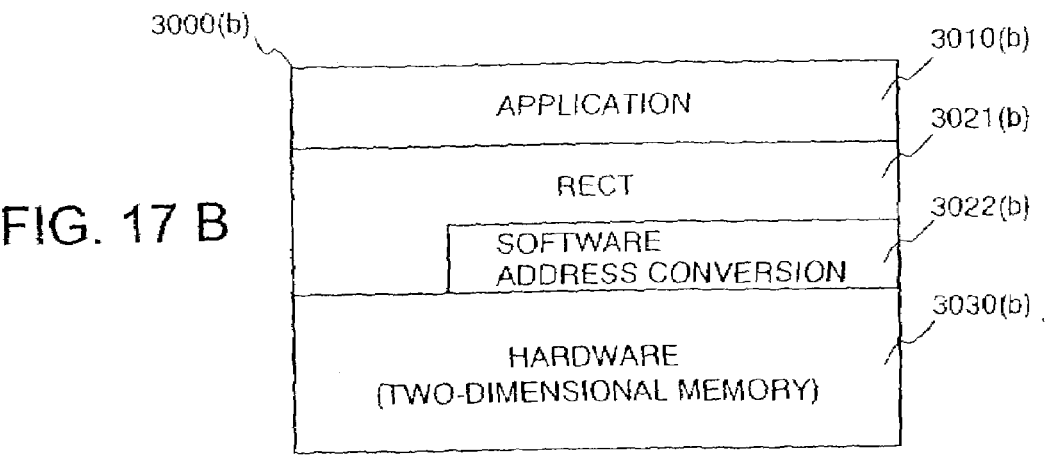
Figure 17:
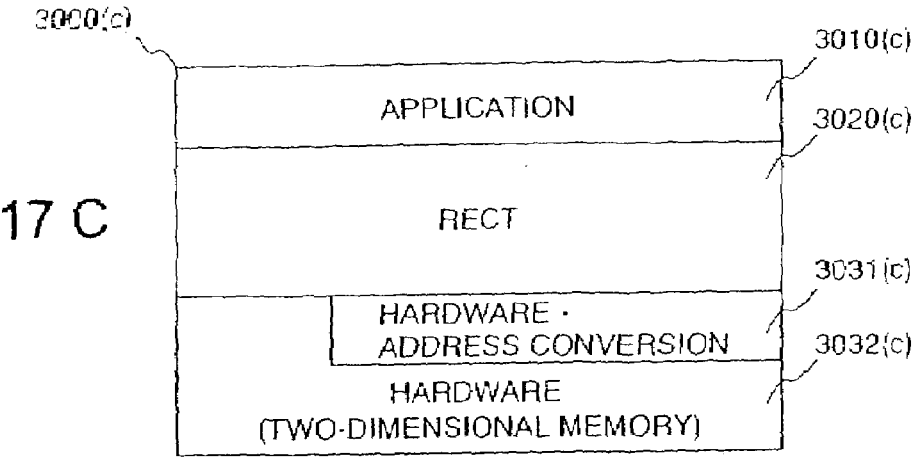

FIGS. 17A to 17C show the effect of the matching of the software in the case in which the present method is used. In FIG. 17A, reference numeral 3000(*a*) designates a conventional software system. The conventional software system comprises an application 3010(*a*) for referring to the picture region, a firmware function 3020(*a*) for accessing the picture region, called out from the application 3010(*a*), and a picture region 3030(*a*) arranged in the array type.

In a system 3000(*b*), as seen in FIG. 17B, the picture region 3030(*b*) of the conventional software system is arranged in the tile type to speed up the operation of the pixel generator 1020. While the application 3010(*b*) for referring to the picture region is not changed, an address converting part 3022(*b*) using software is added to the basic part 3021(*b*) of the firmware function for accessing the picture region called out from 3010(*b*). In this case, the arithmetic processing is increased, because a conversion using software is performed. Further, the performance is also deteriorated, because a miss in the cache memory occurs frequently.

In FIG. 17C, reference numeral 3000(*c*) designates a software system for performing address management according to the present method. Only the control part of the picture region is changed to a tile type picture region 3032(*c*), including the address converter 3031(*c*) using hardware. There is no change in the firmware function 3020(*c*) for accessing the picture region called out from the application 3010(*c*). Further, the performance is not deteriorated, because the overhead of the rearrangement of the tile type data is canceled by the line transfer of the cache memory.

Figure 18:
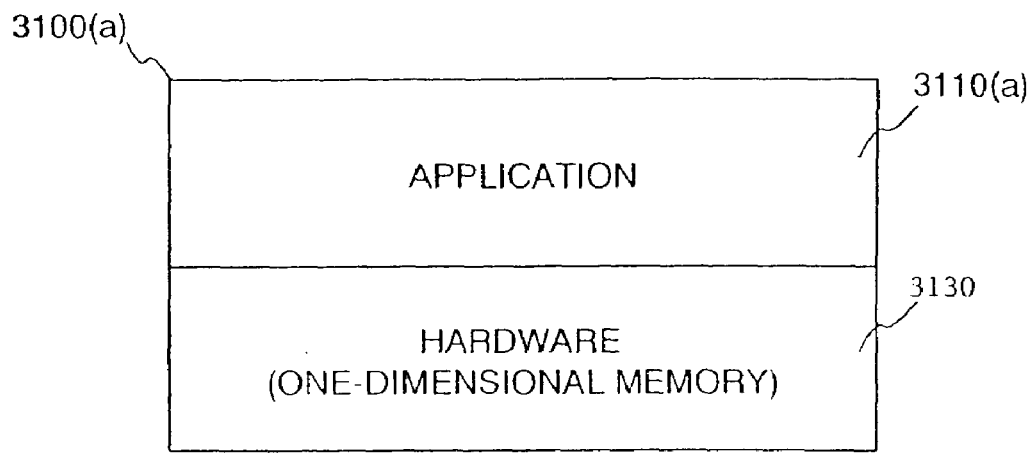
FIGS. 18A to 18C are diagrams of examples of a software system.
Figure 18:
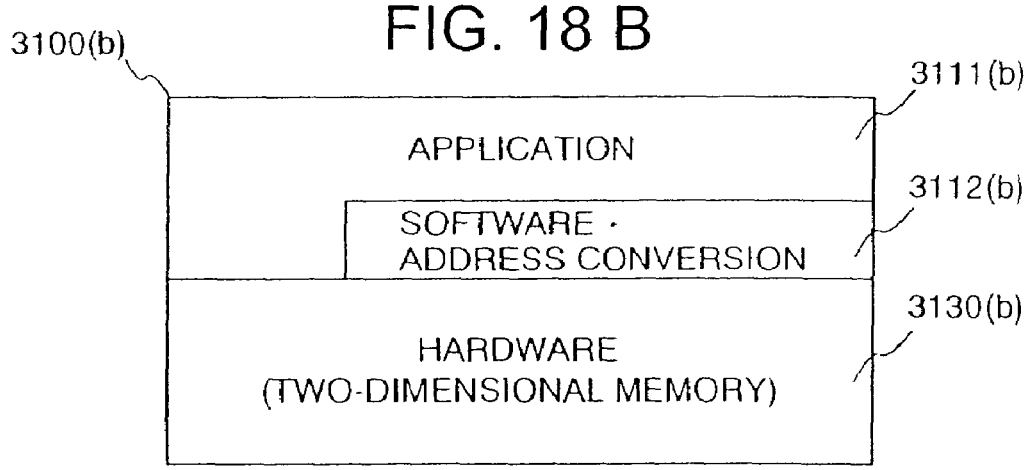
Figure 18:
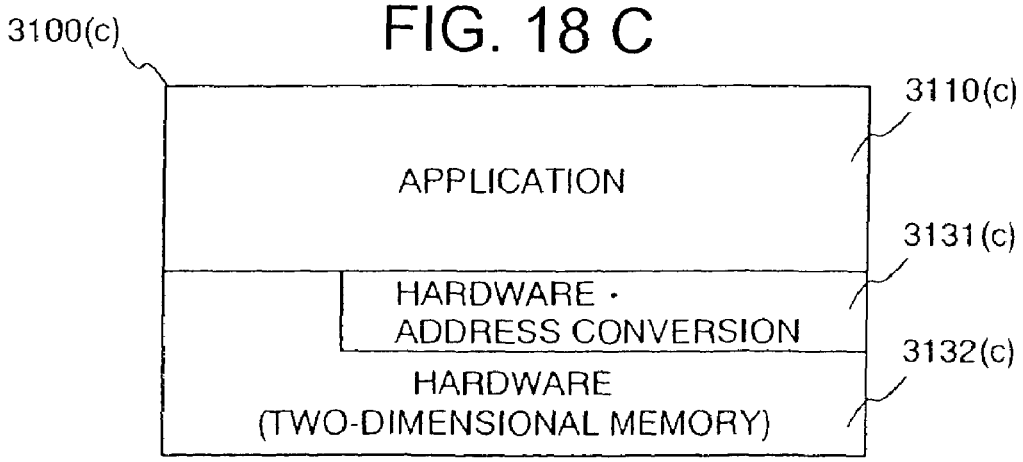

FIGS. 18A to 18C show another example of the effect of the matching of the software in the case in which the present method is used. In FIG. 18A, reference numeral 3100(*a*) designates a conventional software system. In this case, the firmware function 3020(*a*) for accessing the picture region, called out from the application 3010(*a*), is managed as an application 3110(*a*), in addition to an application 3010(*b*) for referring to the picture region.

In a system 3100(*b*), as seen in FIG. 18B, the picture region 3130(*b*) of the conventional software system is arranged in the tile type to speed up the operation of the pixel generator 1020. In this case, an address converter 3112(*b*) using software is added to the basic part 3111(*b*) of the application 3110(*b*) for referring to the picture region. It is necessary in this example to remake the application in a form dependent on the hardware. In this case, the arithmetic processing is increased, because a conversion using software is performed. Further, the performance is also deteriorated, because a miss in the cache memory occurs frequently.

In FIG. 18C, reference numeral 3100(*c*) designates a software system for performing address management according to the present method. Only the control part of the picture region is changed to a tile type picture region 3132(*c*) including the address converting part 3131(*c*) using hardware. There is no change in the application 3010(*c*). Further, the performance is not deteriorated, because the overhead of the rearrangement of the tile type data is canceled by the line transfer of the cache memory.

FIG. 19 shows the effect of the speed-up of the pixel generator 1020 obtained by using the tile type arrangement. Reference numeral 4000 of FIG. 19 shows the average sheet number of the tile including the figure when the size of the figure and the tile is varied. It is assumed that the size of the tile is 256 pixels and that of the pixel is 16 bits. Further, it is assumed that the size of the cache line of the pixel generator 1020 is 512B which wholly includes the above ones. For example, it is assumed that a figure made up of 64 pixels, 8 pixels by 8 pixels, is generated. The array type arrangement corresponds to a tile which is 1 pixel long and 256 pixels wide. The average tile number is 16.9. The starting latency of another tile access is added to 64, the number of the access of the pixels. The starting latency is 6 cycles as described in FIG. 14. If the required data occurs in order, the average cycle number is as follows:

$$64+16.9\times 6=165.6$$

It is assumed that 256 pixels, 16 pixels by 16 pixels, is provided as the tile type arrangement. The average tile number is 3.75. The starting latency of another tile access is added to 64, the number of the access of the pixels.

The result obtained by calculating the penalty of the access of another tile in the same way as the array type is as follows:

$$64+3.75\times 6=86.5$$

As compared with the result mentioned before, it is understood that the tile type arrangement is 1.9 times as fast as the array type arrangement. While an application to picture processing has been explained, it is possible to apply the same principles to a blocked matrix calculation to speed up processing, as another example in which two-dimensional neighboring data is handled. Recently, the technique of making blocks of the matrix reported in the association is as follows. A large matrix is cut out into blocks and the calculation is carried out for every block. As a result, the locality of the data is increased and the efficiency of the data buffer, such as the cache memory, is improved. However, there has been no disclosure of information concerning the arrangement of the physical memory and the speed-up of the physical memory access which occurs frequently when the matrix is large. The physical memory access can attribute to the speed-up of the access of the neighboring data by using the tile type arrangement. However, the extent of the matching to the physical arrangement is relatively small and the efficiency of the data buffer is relatively low, because the CPU performs an array type reference with respect to the logical address. Namely, even in the blocked programming, the region of the array type data is buffered. It becomes possible to suppress the buffering of the data outside of the block by the discontinuous address reference according to the present invention.

According to the above-mentioned data processing apparatus, it is possible to access the pixel data at high speed. It is also possible to process the pixel data briefly and at high speed in the neighborhood of the pixel data to be picture-processed. Further, it is possible to access the data arranged in the memory unit by using a different logical address. Namely, with respect to the different logical address managed by a plurality of processing units, it is possible to access the data of the common physical address with high efficiency.

As to the processing of the same data, it becomes possible to effect programming using different addressing for different hardware or a process (software), that is, by using the array type arrangement or the tile type arrangement. The pixel data arranged with the tile type address can be processed at a speed twice as fast as the processing speed of the pixel data arranged with the array type address.

A shading method and a shading apparatus according to the present invention will be explained hereinafter with reference to FIGS. 20 to 40.

Figure 20:
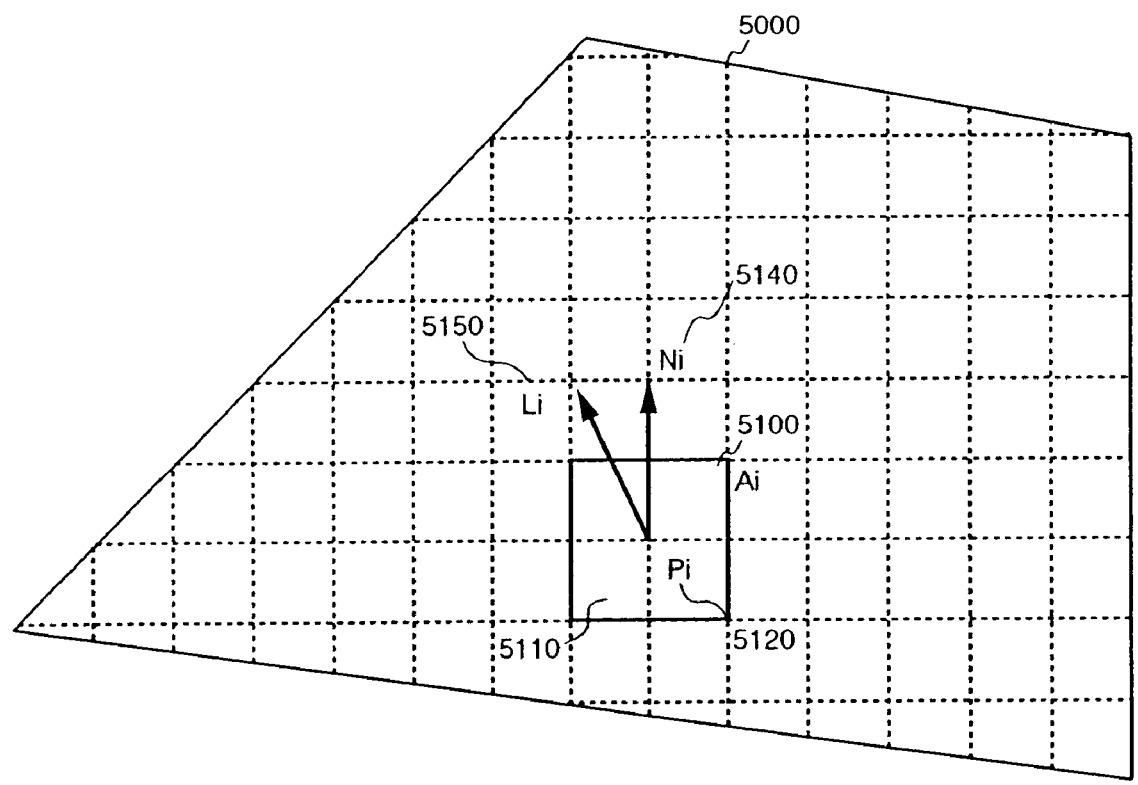
FIG. 20 is a diagram illustrating a method of calculating the luminance at a small region using a shading apparatus of the present invention.

FIG. 20 illustrates a method of calculating the luminance at a small region according to one embodiment of a shading method and a shading apparatus of the present invention. The processing object 5000 for the luminance calculating method includes a plurality of small regions 5100 which have at least one pixel 5110.

It is assumed that the luminous intensity of the light beam inside of the small region 5100 is uniform. However, because each of the pixels 5110 within the small region has a specified color, the actual color is different for every pixel, and the problem which arises due to any nonuniformity of the luminous intensity is negligible. In particular, if the small region 5100 is sufficiently small, there is no problem. The luminous intensity of the light beam within the small region 5100 is approximated to the luminous intensity at a typical point 5120 within the small region 5100. The position of the typical point is arbitrary. When the center point of the small region is set to the typical point, the precision of the approximation becomes highest.

In the calculation of the luminous intensity at the typical point 5120, geometrical vectors, such as the normal vector 5140 and the light beam vector 5150 at the typical point 5120 obtained by interpolation within the figure is used. Each of the geometrical vectors is obtained by linearly interpolating the geometrical vector at the vertex of the FIG. 5000 inside of the figure. Each of the geometrical vectors may be obtained by interpolating the geometrical vector at the vertex of the figure under rules predetermined for every figure inside of the figure.

Figure 21:
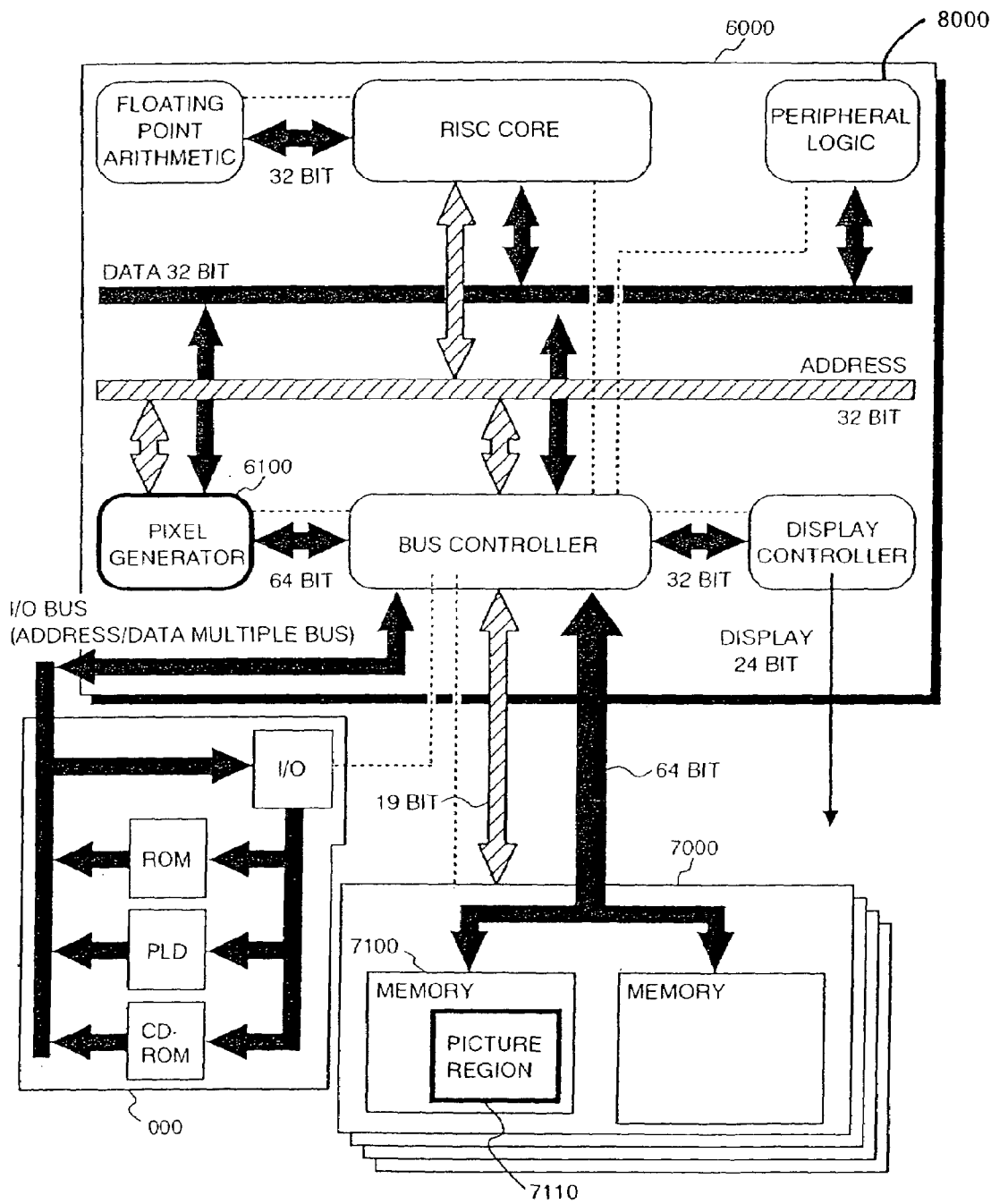
FIG. 21 is a functional block diagram showing an example of the system configuration of a media processor used in the shading apparatus of the present invention.

FIG. 21 is a block diagram showing an example of the system configuration of a media processor 600 used in the shading apparatus of the present invention.

The shading apparatus is realized as a portion of the media platform, which is the common base of the multi-media, under the basic concept of a one-chip processor and memory integration. The hardware of the media platform comprises a media processor 6000, in which a RISC core and a graphic core are integrated with each other, a integrated memory 7000 in which a main memory and a picture region are integrated with each other, and a peripheral logic 8000. The media platform system is realized as a common environment in which a media library is installed on the hardware.

The media processor 6000 has a pixel generator 6100 which is a part of the graphic core. The integrated memory 7000 includes a general purpose or a dedicated memory chip 7100, in which there is a picture region 7110. As the dedicated memory chip, a special memory chip for the purpose of the generation of a picture is known, which memory chip has a write-in function with comparing and determination and a read-out function with calculation. The pixel generator 6100 generates the pixels forming a figure according to a luminance calculating method of the present invention and writes the resultant picture data in the picture region 7110.

Figure 22:
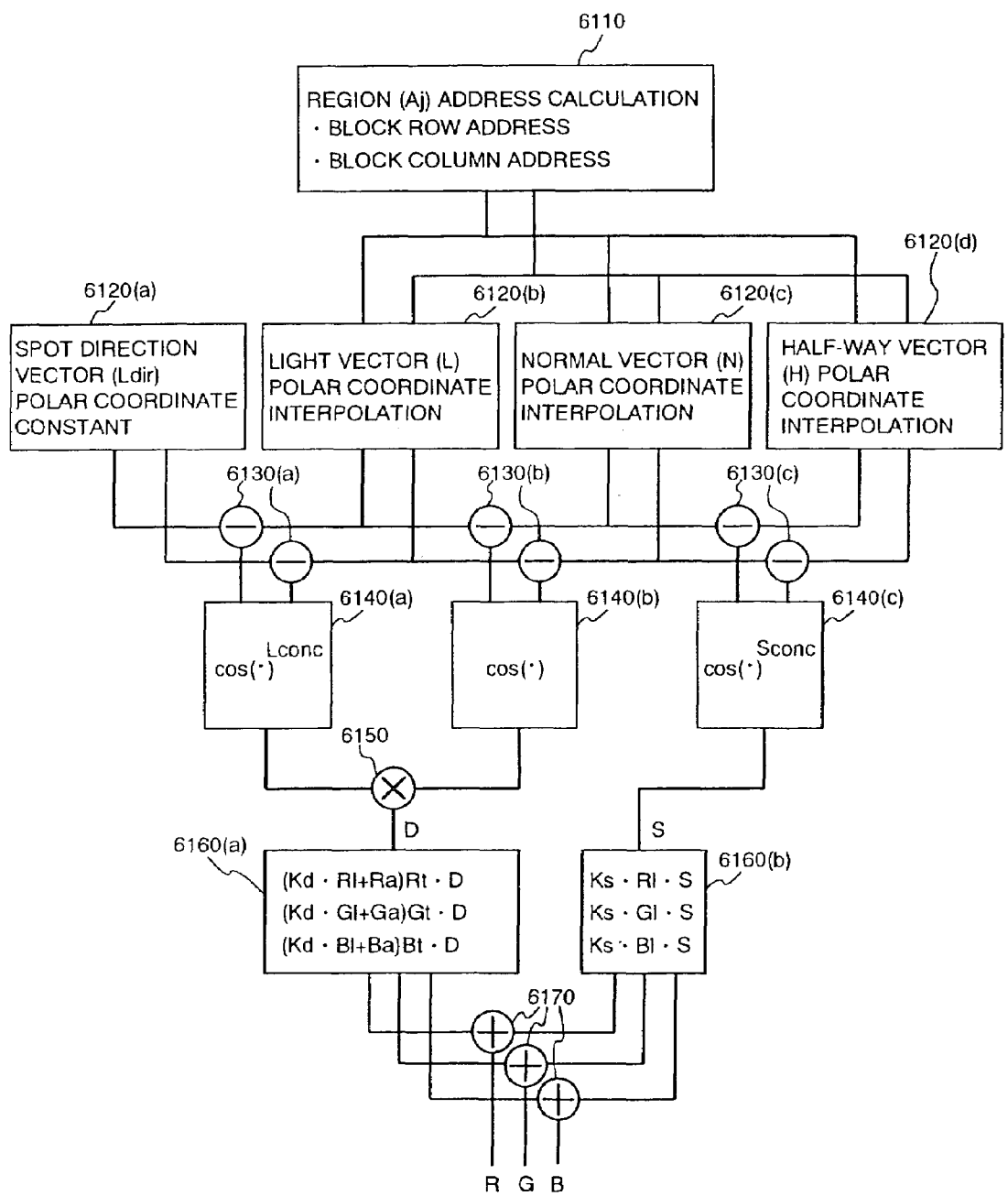
FIG. 22 is a block diagram showing an example of the configuration of a pixel generating unit of the media processor shown in FIG. 21.

FIG. 22 is a block diagram showing an example of the configuration of the pixel generator 6100 of the media processor 6000 shown in FIG. 21.

The address calculating unit 6110 for the small region 5100 determines the position of the small region 5100 to be processed as shown in FIG. 20. The position of the typical point 5120 within the small region 5100 is determined at the same time. If the position of the typical point 5120 is at the center of the small region 5100, the position of the small region corresponds directly to that of the typical point. Because the form of the small region is rectangular in actual use, the determination of the position represents a determination of the row address and the column address of the small region 5100.

The obtained row address and column address are input to a polar coordinate interpolator group 6120. The polar coordinate interpolator group 6120 generates the respective geometrical vectors at the typical points 5120, based on the row address and the column address of the small region 5100.

The polar coordinate interpolator 6120(a) outputs the direction vector of the spot light source. Because the characteristic of the light source is constant independently of the figures, the output is the direction vector itself provided when the property of the light source is determined. The vector is provided by a polar coordinate in which the Y-axis is the main axis. Namely, there are two kinds of components, a declination and an elevation. The magnitude of the vector is always "1". An advantage of such a display based on the polar coordinate is that a three-dimensional vector can be expressed only by two components, and it is not necessary to normalize, because the magnitude of the vector is predetermined. The display of the coordinate used in the following explanation is that due to this type of polar coordinate.

The polar coordinate interpolator 6120(b) performs the interpolation in the polar coordinate system of the light beam vector. It inputs the row and the column addresses of the small region 5100 and outputs two components of the corresponding light beam vector. Inside the polar coordinate interpolator 6120(b), there is provided a register for storing the interpolation parameters given for every figure.

In the case of linear interpolation, there are six parameters, including coefficients corresponding to the row addressee of each of the components, coefficients corresponding to the column addresses, and an offset value.

In case that the value at the immediately preceding small region 5100 is used, the difference value of the address from the preceding small region is input. Further, the interpolator 6120(b) has six parameters, including coefficients corresponding to the respective differences and the values of the vectors in the immediately preceding small regions. The interpolation involving a two-dimensional approximation has a coefficient of a secondary equation, and the transparent translation correction includes an interpolation of the depth information and its inverse number calculating means, in addition to the parameters for the linear interpolation.

The polar coordinate interpolator 6120(c) performs the interpolation in the polar coordinate system of the normal vector. The configuration of the hardware is the same as the polar coordinate interpolator 6120(b). With respect to the values of the offset and the interpolation parameters, the values for the normal parameters are used.

The polar coordinate interpolator 6120(d) performs the interpolation in the polar coordinate system of the halfway vector. The configuration of the hardware is the same as the polar coordinate interpolator 6120(b). With respect to the values of the offset and the interpolation parameters, the values for the halfway vectors are used. The halfway vector will be explained i n detail in the description of the luminance calculating equation of FIG. 34. The obtained polar coordinate components of each of the geometrical vectors is input to a between-vectors angle calculator group 6130. The between-vectors angle calculator group 6130 receives the polar coordinate components of two vectors and outputs its difference for every corresponding component. The between-vectors angle calculator 6130(a) calculates the angle between the light beam vector and the spot-direction vector. The between-vectors angle calculator 6130(b) calculates the angle between the light beam vector and the normal vector. The between-vectors angle calculator 6130 (*c*) calculates the angle between the normal vector and the halfway vector.

In accordance with the present invention, the value of the cosine of the angle between vectors is approximated by using a function of a cosine value for each of the angles between the vectors having two components obtained by the between-vectors angle calculator group 6130. While this approximation has such a characteristic that the error increases if both two vectors deviate from the z-axis, its effect is negligible because the attenuation factor is large in the figure display.

The cosine calculator group 6140 calculates the cosine of the angle between the vectors and the function using it, by using the angle between the vectors obtained by the between-vectors angle calculator group 6130. The cosine calculator 6140(*a*) calculates a coefficient in which the amount of attenuation is increased in accordance with the distance from the center of the spot light. This coefficient is expressed by the cosine to the nth power. The value of the nth power is a constant specified for every light source. The cosine calculator 6140(*b*) calculates the coefficient of luminous intensify corresponding to the angle of incidence to the figure of the light beam. The coefficient of luminous intensity is expressed at a value of the cosine. The cosine calculator 6140(*c*) calculates a coefficient S in which the amount of high light is attenuated as the line of sight departs from the center off the reflected light. The coefficient is expressed by the cosine to the nth power. The value of the nth power is a constant specified for every figure.

The adder 6150 multiplies the coefficient of luminous intensity by the coefficient of attenuation of the spot and calculates the component D of the diffused light of the luminance.

The luminance calculator group 6160 calculates the luminance by using an output of the adder 6150 and the attribution of the light source and the figure. The luminance calculator 6160(*a*) calculates the luminance from the diffused component. The luminance calculator 6160(*b*) calculates the luminance from the component of the mirror light.

The adder group 6170 adds the output of the luminance calculator group 6160 and obtains the final color of a pixel.

FIG. 23 is a view illustrating the process of pixel generation and the configuration of the small region in the luminance calculating method according to the present invention in which one light source is used. Because the number of calculations of the light source per one pixel 5110 is less than one, the size of the small region is one pixel. Namely, with respect to the small region 5100 or pixel 5110, the luminance calculation 5160 with respect to the light source 0, a light source of the light source number 0. The amount of calculation per one pixel corresponds to a one time luminance calculation.

FIG. 24 is a view illustrating the process of pixel generation and the configuration of the small region in the luminance calculating method according to the present invention in which two light sources are used 5160 and 5170. In order to decrease the number of calculations of the light source per one pixel to be equal to or less than one, the size of the small region 5100 must be equal to or more than 2 pixels. If the small region 5100 is equal to or more than 2 pixels, it is necessary to determine the form. Because the order of the generation of pixels is basically in a horizontal direction, it is desirable to disposed 2 pixels continuously in a horizontal direction to the small region 5100.

As to 2 pixels, the luminance is calculated one time per one light source. However, the luminance calculation of each of the light sources 5160 and 5170 can not be performed at the same time in order to decrease the amount of hardware. In a system in which a pixel is generated after the luminance calculation for all the light sources has been completed, a fluctuation due to the number of the light sources occurs, in addition to a longer latency and a deterioration of the performance. Therefore, the control becomes complicated. Accordingly, the present invention uses an improved method in which the processing of the luminance calculation and the processing of the generation of pixels are performed in a pipe-line process.

In this method, small regions deviated from each other by one pixel are defined for every light source. The luminance calculation is performed before the first generation of a pixel of the small region. Further, in the luminance calculation with respect to another light source, a value which has already been calculated is used. In FIG. 24, reference numeral 5100(0) designates the small region corresponding to the light source 5160 and 5100(1) the small region corresponding to the light source 5170. The luminance of a first pixel calculated at the small region or the luminance of a pixel to the left side of 5100(0), is obtained by calculating the luminance corresponding to the light source 5160 and adding it to the luminance due to the light source 5170, which has already been calculated with respect to a pixel to the left side by one pixel and the pixel in question. The luminance of a pixel to the right side of 5100(0) or a pixel to the left side of 5100(1) is obtained by adding the previously obtained luminance corresponding to the light source 5160 to the newly calculated luminance corresponding to the light source 5170. In such a way, the calculation per one pixel becomes a one time luminance calculation.

FIGS. 25 to 28B show examples in which four light sources are used. In this case, the small region is formed by 4 pixels.

Figure 25:
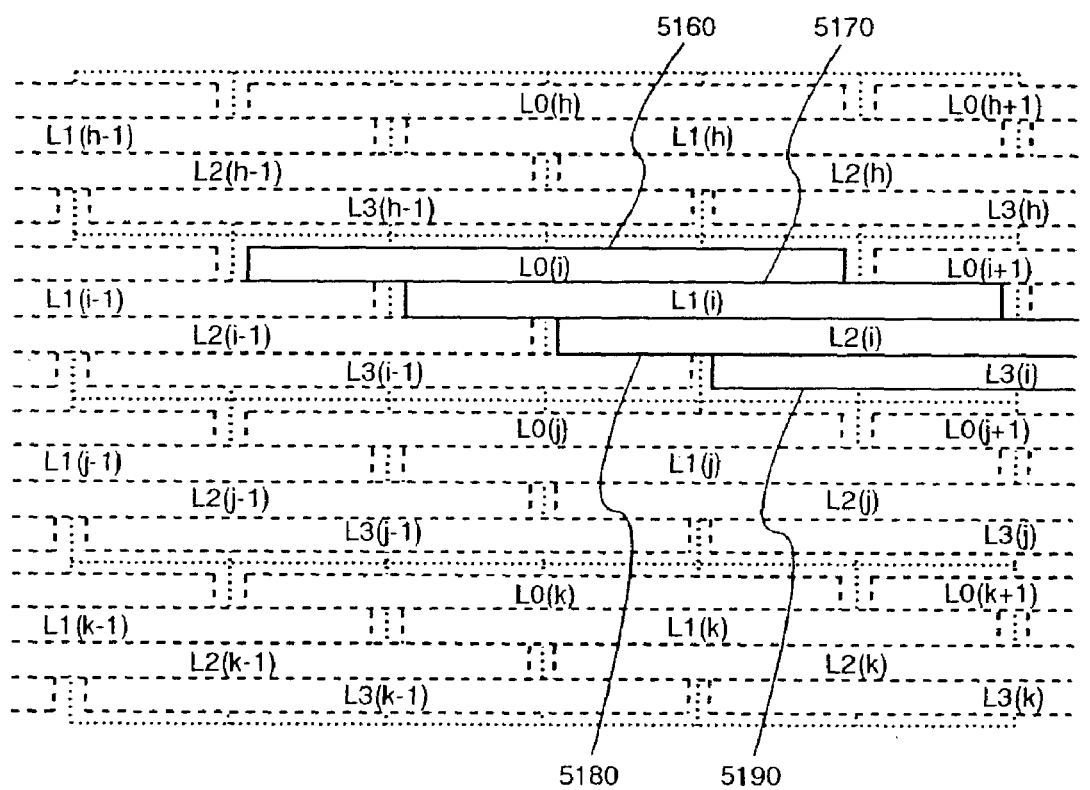
FIG. 25 is a diagram illustrating a procedure for pixel generation and the configuration of the small region in a luminance calculating method in which four light sources are used.

FIG. 25 is a view illustrating the process of pixel generation and the configuration of the small region in the luminance calculating method according to the present invention in which four light sources are used 5160, 5170, 5180 and 5190. In FIG. 25, the form of the small region is longer in a horizontal direction. The operation of this case is an extension of the method of FIG. 24.

Figure 26A:
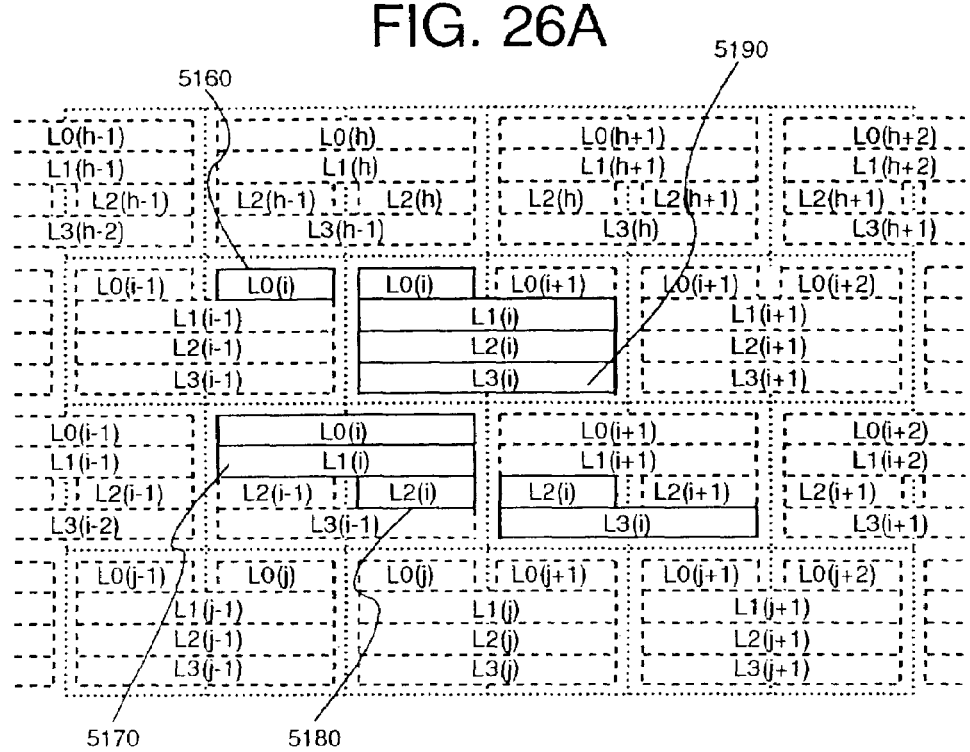
FIGS. 26A and 26B are diagrams illustrating a procedure for pixel generation and the configuration of the small region in a luminance calculating method in which four light sources are used.
Figure 26B:
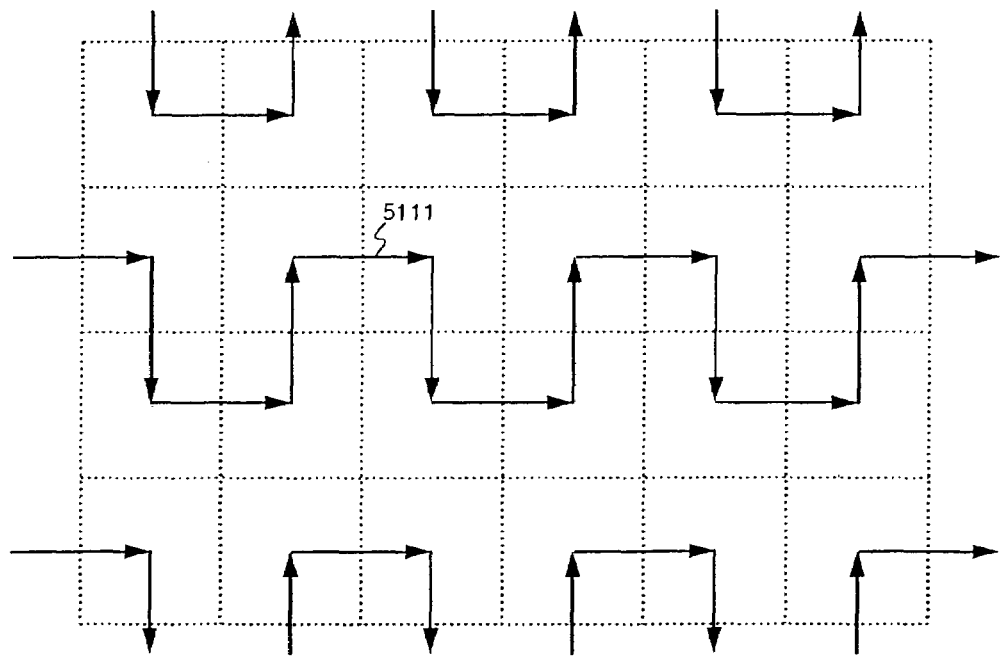

FIGS. 26A and 26B are views illustrating another process of pixel generation and the configuration of the small region in the luminance calculating method according to the present invention in which four light sources are used 5160, 5170, 5180 and 5190. In FIG. 26A, the form of the small region is a square. It is different from the method of FIG. 25 in that the order of the generation of pixels is two-dimensional. FIG. 26B shows the order 5111 of the generation of the two-dimensional pixels. According to this order, a zigzag path is taken so that the pixels may be positioned in a two-dimensional neighborhood.

Figure 27A:
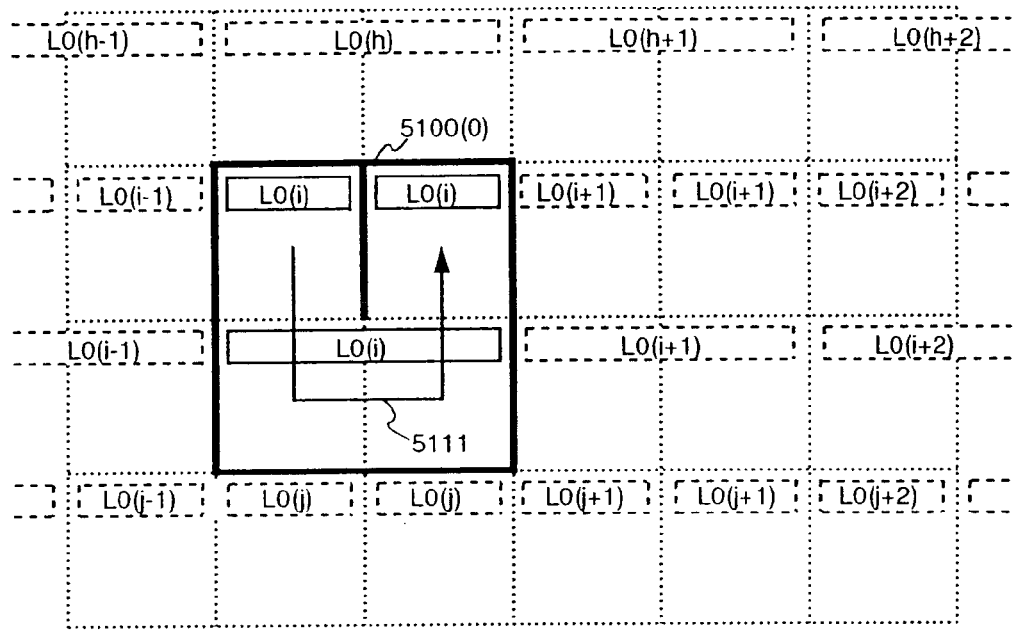
FIGS. 27A and 27B are diagrams illustrating a procedure for pixel generation and the configuration of the small region in a luminance calculating method in which four light sources are used.
Figure 27B:
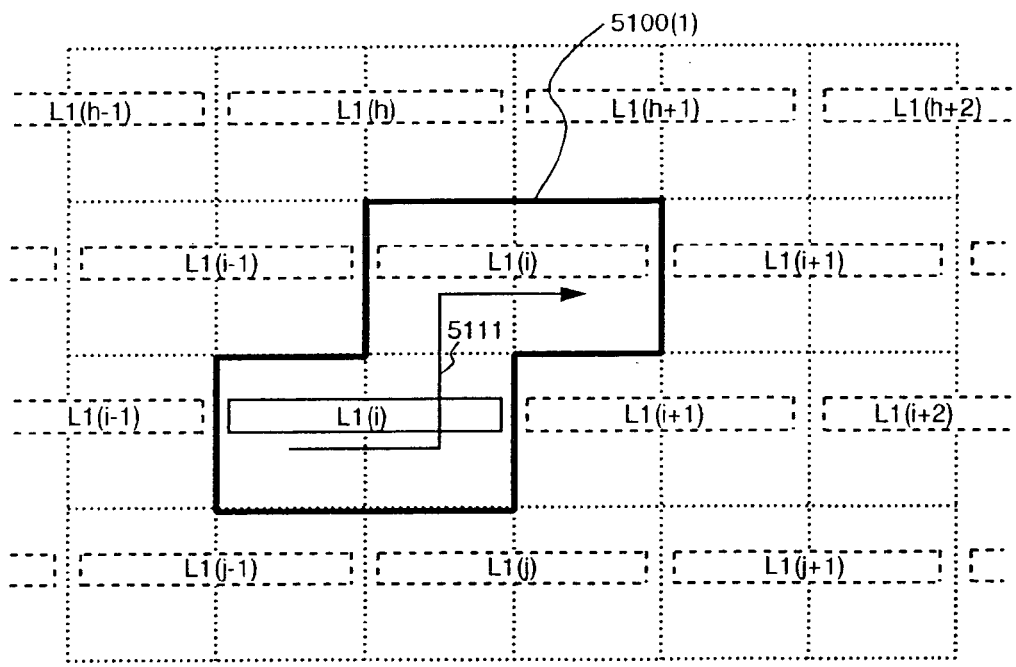

FIGS. 27A and 27B are views illustrating a further process of the pixel generation and the configuration of the small region in the luminance calculating method according to the present invention in which four light sources are used. FIG. 27A shows only the procedure for the light source 0 taken out of the procedure of the luminance calculation of FIG. 26A. The portion surrounded by a thick line is the small region 5100(0). A path 5111 is taken according to the order of the generation of pixels shown in FIG. 26B. Namely, the path is a top left—bottom left—bottom right—top right.

FIG. 27B shows only the procedure for the light source 1 taken out of the procedure of the luminance calculation of FIG. 26A. The portion surrounded by a thick line is the small region 5100(1). A path 5111 is taken according to the order of the generation of pixels shown in FIG. 26B. This departs from the small region of FIG. 27A by one pixel in the zigzag path. Namely, the path is a bottom left—bottom right—top left—top right.

Figure 28A:
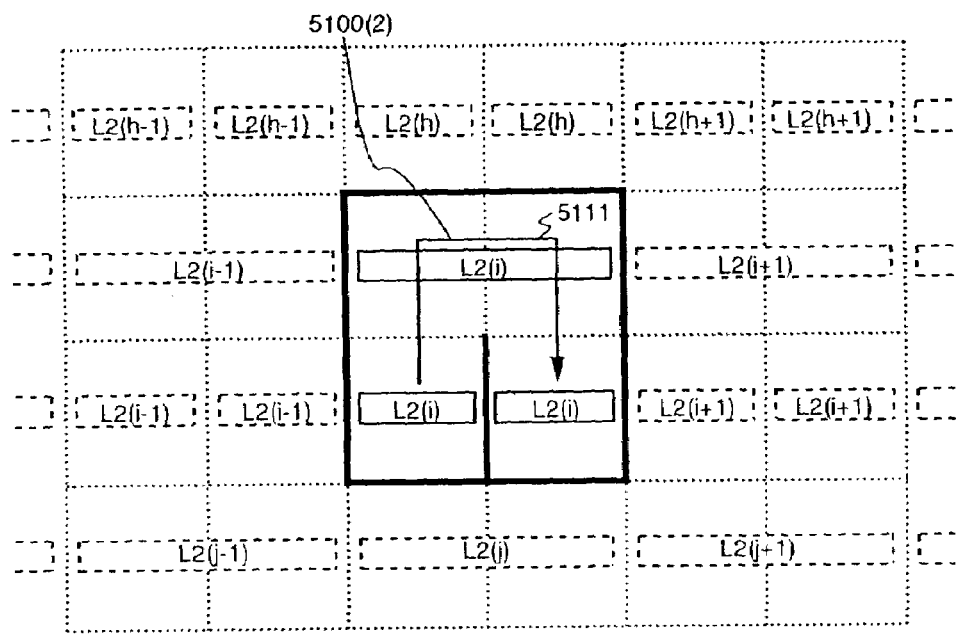
FIGS. 28A and 28B are diagrams illustrating a procedure for pixel generation and the configuration of the small region in a luminance calculating method in which four light sources are used.
Figure 28B:
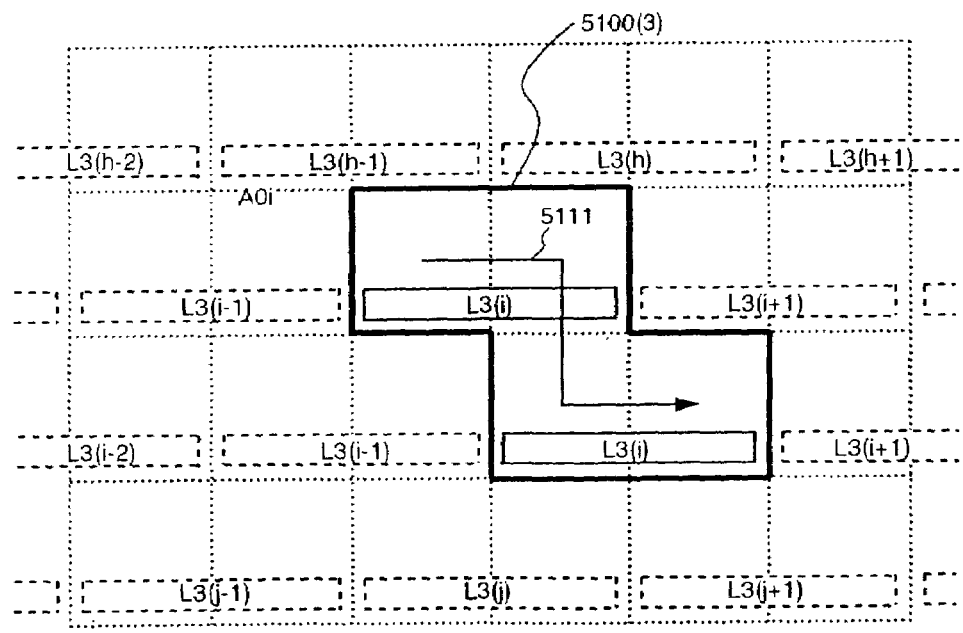

FIGS. 28A and 28B are views illustrating a still further process of the pixel generation and the configuration of the small region in the luminance calculating method according to the present invention in which four light sources are used. FIG. 28A shows only the procedure for the light source 2 taken out of the procedure of the luminance calculation of FIG. 26A. The portion surrounded by a thick line is the small region 5100(2). A path 5111 is taken according to the order of the generation of pixels shown in FIG. 26B. This departs from the small region of FIG. 27B by one pixel in the zigzag path. Namely, the path is a bottom left—top left—top right—bottom right. FIG. 28B shows only the procedure for the light source 3 taken out of the procedure of the luminance calculation of FIG. 26A. The portion surrounded by a thick line is the small region 5100(3). A path 5111 is taken according to the order of the generation of pixels shown in FIG. 26B. This departs from the small region of FIG. 28A by one pixel in the zigzag path. Namely, the path is a top left—top right—bottom left—bottom right.

Figure 29A:
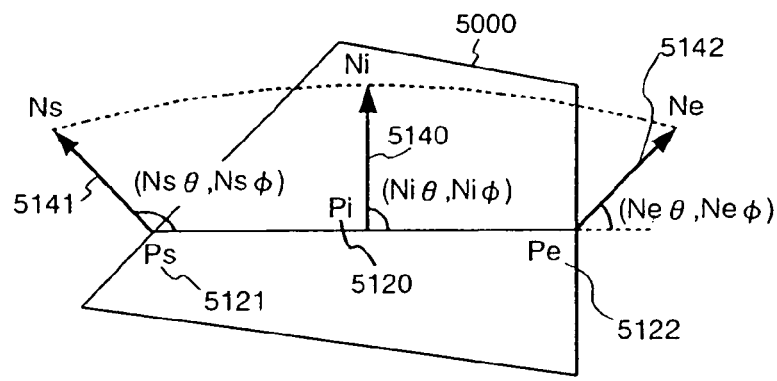
FIGS. 29A to 29C are diagrams illustrating a polar coordinate interpolating method according to the present invention.
Figure 29B:
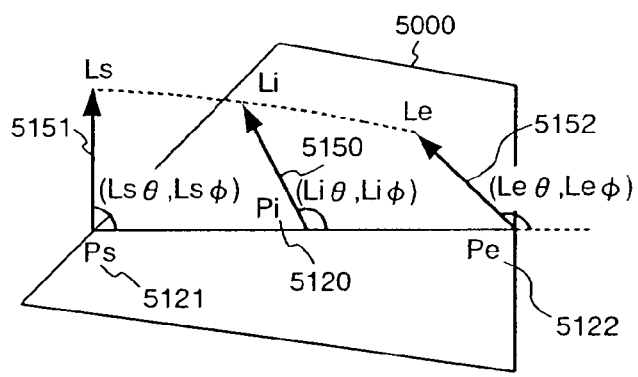
Figure 29C:
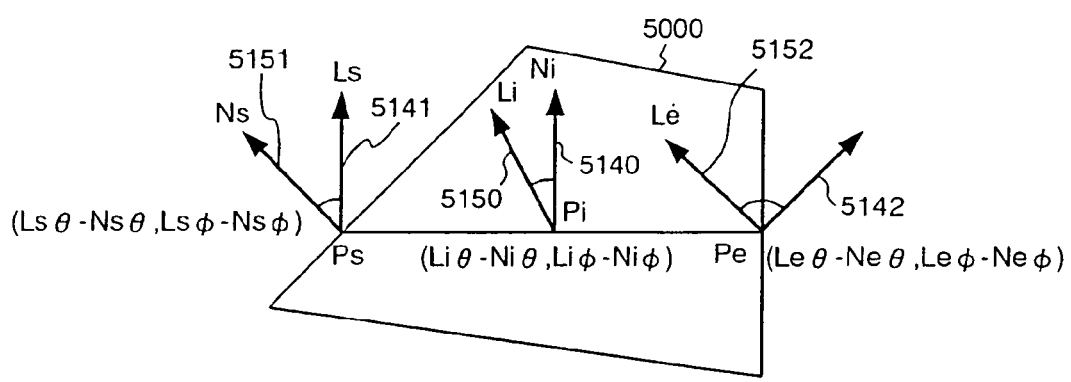

FIGS. 29A to 29C are views illustrating a polar coordinate interpolating method according to the present invention.

FIG. 29A shows an example in which the normal vector expressed by the polar coordinate system is interpolated. The normal vector 5140 at the typical point 5120 of the small region 5000 of the figure is obtained by interpolating normal vectors 5141 and 5142 at both ends of the figure via points 5121 and 5122, respectively. The normal vectors 5141 and 5142 themselves are obtained by interpolating the normal vector with reference to the vertex of the figure. The interpolating method is the same as that described before.

FIG. 29B shows an example in which the light beam vector 5150 expressed by the polar coordinate system as in the case of the normal vector is obtained by interpolating the vectors 5151 and 5152.

FIG. 29C shows a method of calculating the luminous intensity from two vectors obtained by the interpolation of every small region 5100 of the figure. With regard to the angle between vectors, the value at the typical point 5120 is smaller than that at 5121 or 5122, and thus it is possible to produce a highlight in the figure.

Figure 30:
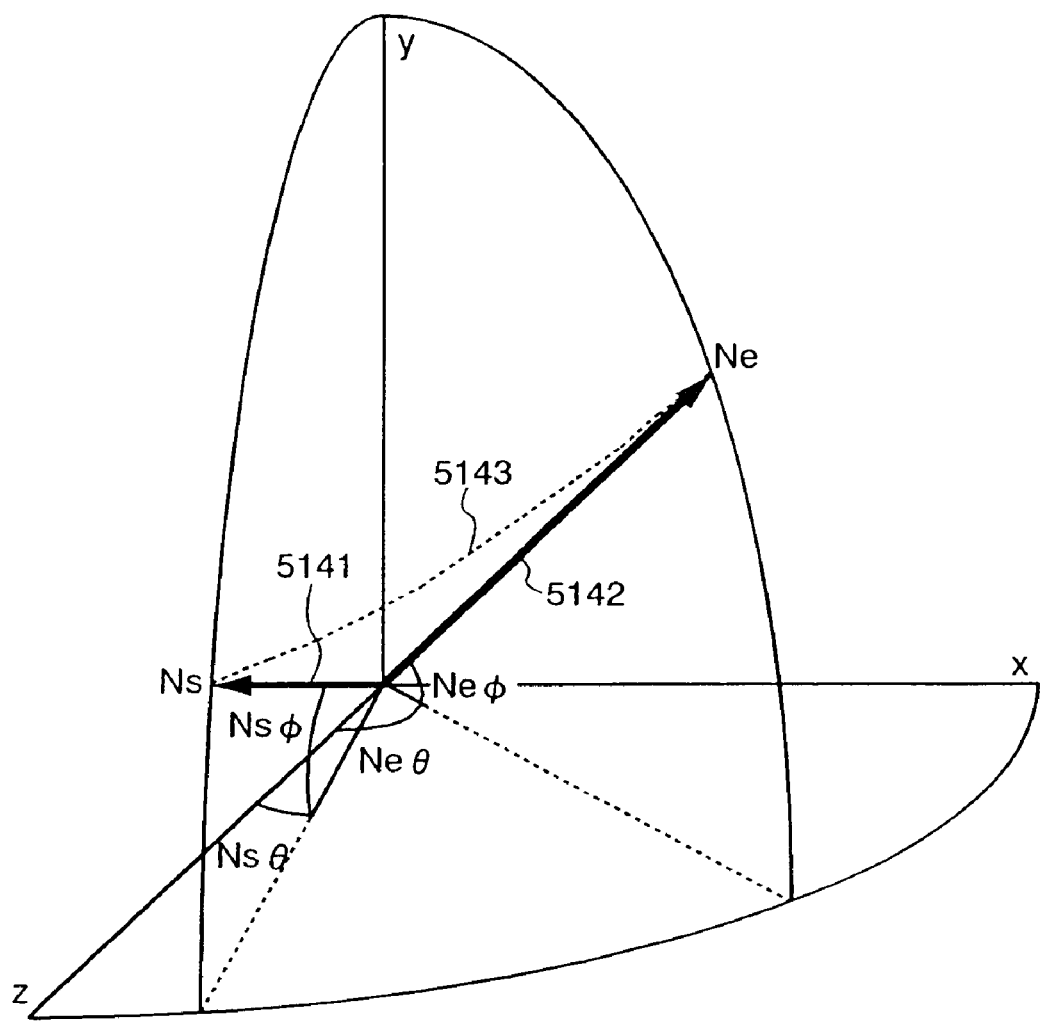
FIG. 30 is a diagram illustrating a vector locus in the polar coordinate interpolation processing according to the present invention.

FIG. 30 is a view illustrating a vector locus in the polar coordinate interpolation process according to the present invention. Namely, FIG. 30 shows a path 5143 in the case where polar coordinate interpolation is performed. Because the interpolation is performed by two components of the polar coordinate, the path does not take a large circular course. However, because the large circular course itself is one of the approximations, the polar coordinate interpolation is sufficiently effective to express a spot light and a high light.

FIGS. 31A to 31C, FIGS. 32A to 32C and FIGS. 33A to 33C are views showing the result of simulation of the vector locus in the polar coordinate interpolation.

Figure 31A:
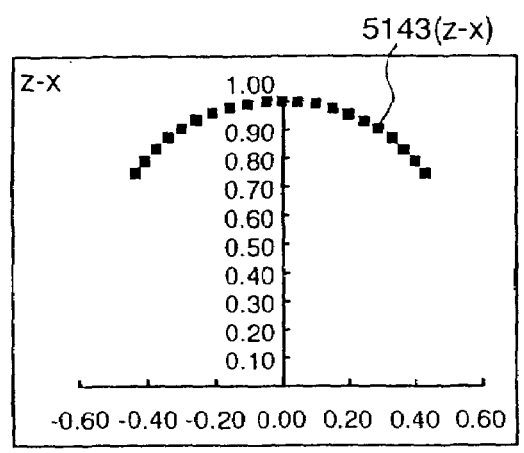
FIGS. 31A to 31C are diagrams showing the result of simulation of the vector locus in a polar coordinate interpolation process according to the present invention.
Figure 31B:
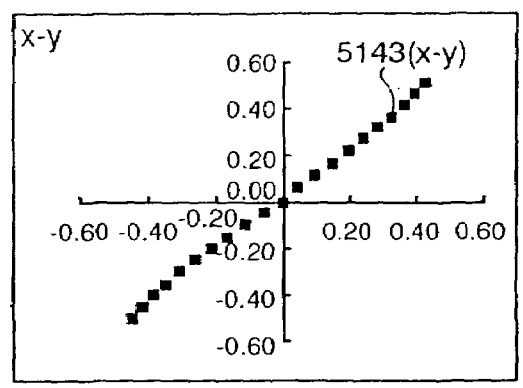
Figure 31C:
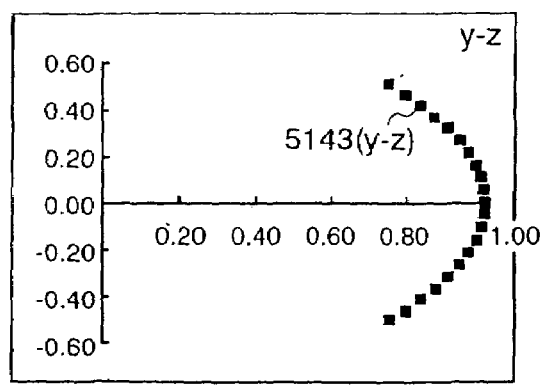
Figure 32A:
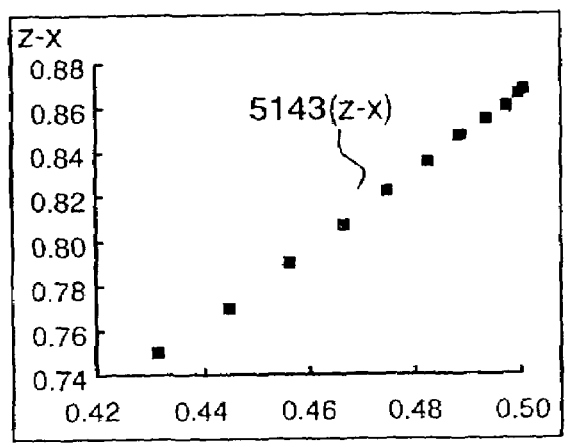
FIGS. 32A to 32C are diagrams showing the result of simulation of the vector locus in a polar coordinate interpolation process according to the present invention.
Figure 32B:
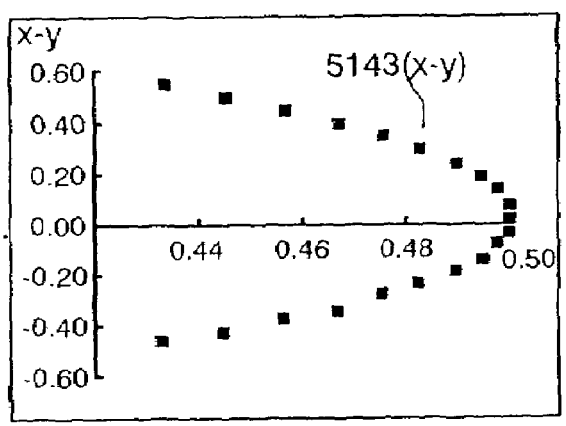
Figure 32C:
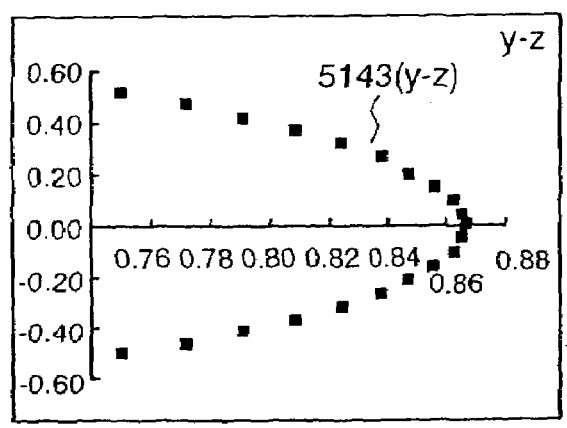
Figure 33A:
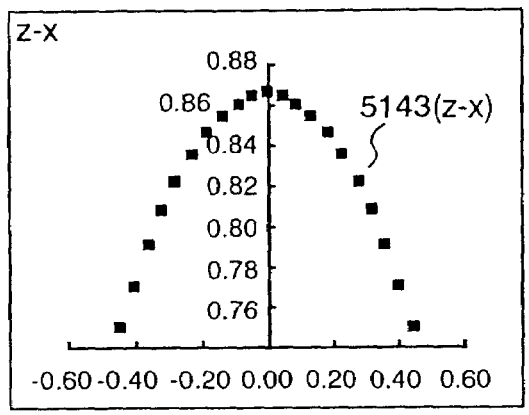
FIGS. 33A to 33C are diagrams showing the result of simulation of the vector locus in a polar coordinate interpolation process according to the present invention.
Figure 33B:
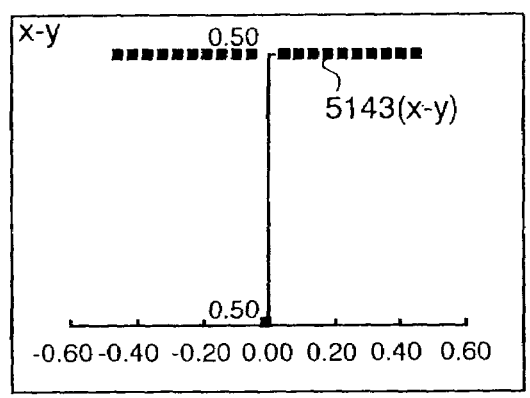
Figure 33C:
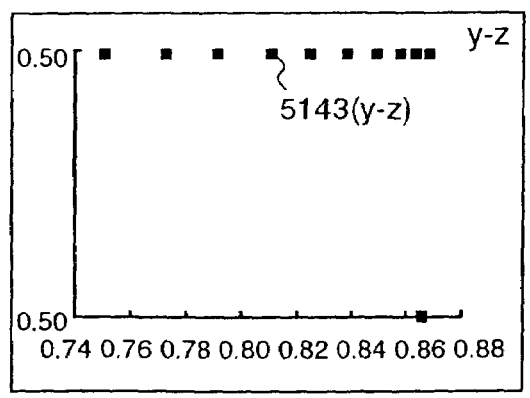

FIGS. 31A to 31C shows the result of the interpolation between ($\pi/4$, $-\pi/4$) and ($\pi/4$, $\pi/4$), FIGS. 32A to 32C shows the result of the interpolation between ($\pi/4$, $-\pi/4$) and ($\pi/4$, $\pi/4$) and FIGS. 33A to 33C shows the result of the interpolation between ($-\pi/4$, $\pi/4$) and ($\pi/4$, $\pi/4$).

Figure 34:
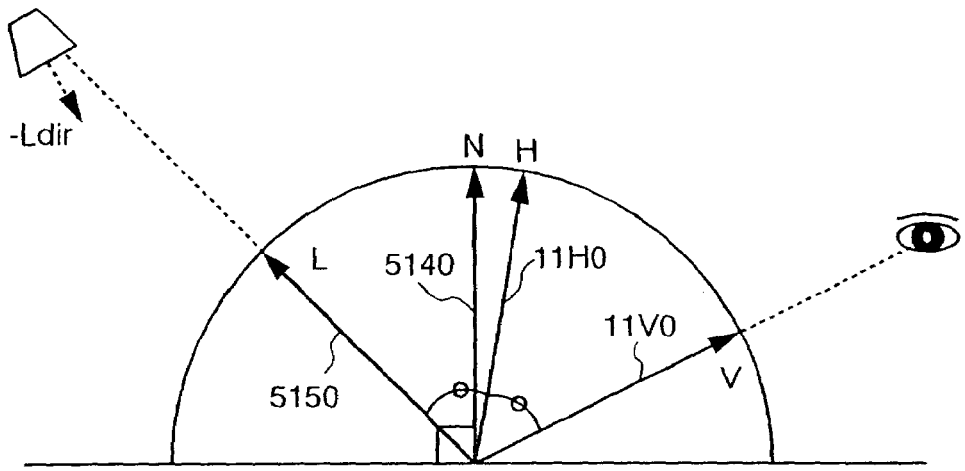
FIG. 34 is a diagram illustrating a calculating formula and a summary of the luminance calculation according to the present invention.

FIG. 34 is a view illustrating a calculating formula and a summary of the luminance calculation according to the present invention. The luminance I of each of the pixels is expressed by the sum total of a peripheral reflecting component Iai, a diffusion reflecting component Idi and a mirror reflecting component Isi. The peripheral reflecting component Ia is expressed by the product of the peripheral reflecting coefficient Ka, the color Oc of the object, and the color Lc of the light source. The diffusion reflecting component Id is expressed by the product of the diffusion reflecting coefficient Ka, the color Oc of the object, the inner product of the normal vector N and the light source direction vector L, the inner product of the light source vector Ldir and the light source direction vector L to the power of Lconc, the color Lc of the light source, and the attenuation function Latt. The mirror reflecting component Is is expressed by the product of the mirror reflecting coefficient Ks, the color Sc of the mirror surface of the object, the inner product of the normal vector N and the halfway vector H to the power of Sconc, the inner product of the light source vector Ldir and the light source direction vector L to the power of Lconc, the color Lc of the light source, and the attenuation function Latt. Here, the color Oc of the object is the product of the luminous intensity against the figure, the texture color expressing the pattern on the surface of the figure, and the intensity of the light beam. The intensity of the light beam is obtained by adding the value obtained by multiplying the color of the light source by the coefficient to the value of the environment light component. The halfway vector 11H0 is a vector dividing in half the angle between the sight line vector 11V0 and the light source directional vector 5150. The smaller the angle between the halfway vector 11H0 and the normal vector is, the larger the high light becomes.

Figure 35:
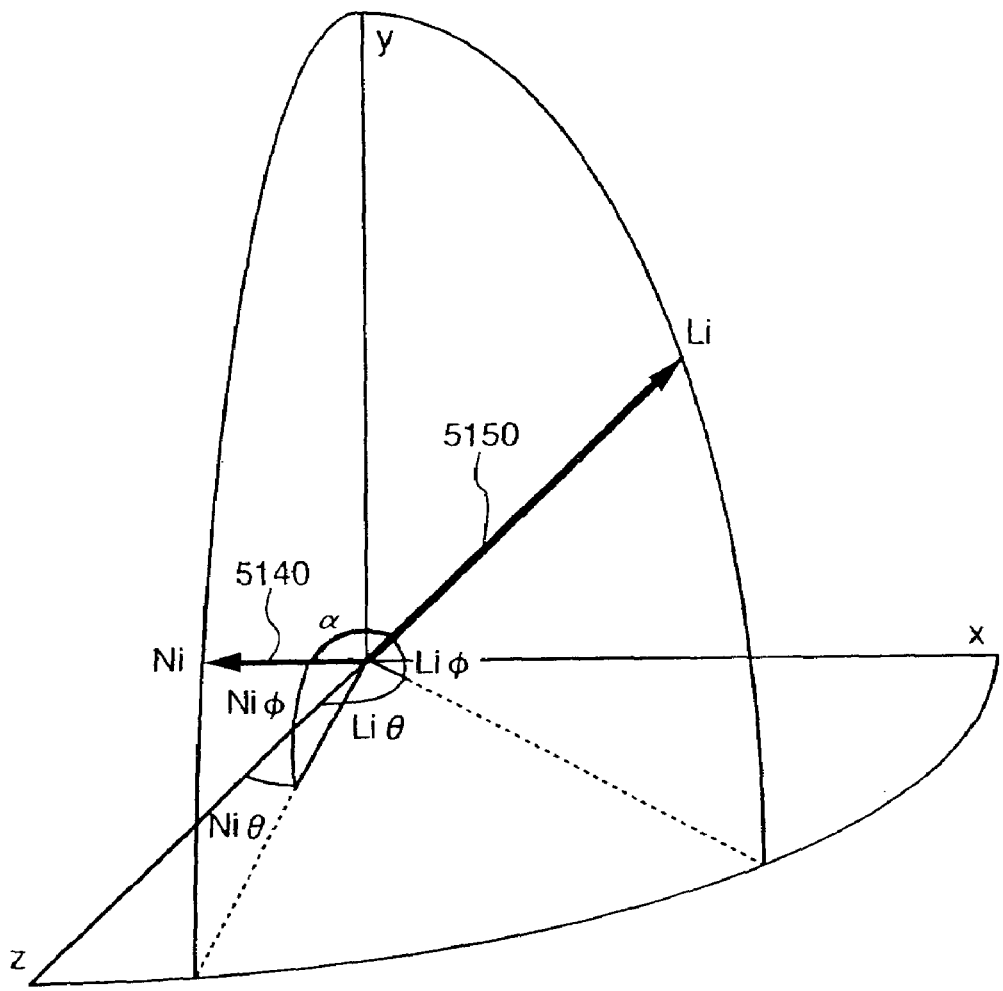
FIG. 35 is a diagram illustrating a calculating formula and a summary of a cosine approximation calculation between vectors according to the present invention.

FIG. 35 is a view illustrating a calculating formula and a summary of a cosine approximation calculation between vectors according to the present invention. The approximation is performed by using the product of the cosine of the difference for every component of the angle of the polar coordinate. The error of the approximating calculation is substantially negligible. The approximating calculation is suitable to an interleaving method for the purpose of reducing the amount of hardware.

Figure 36:
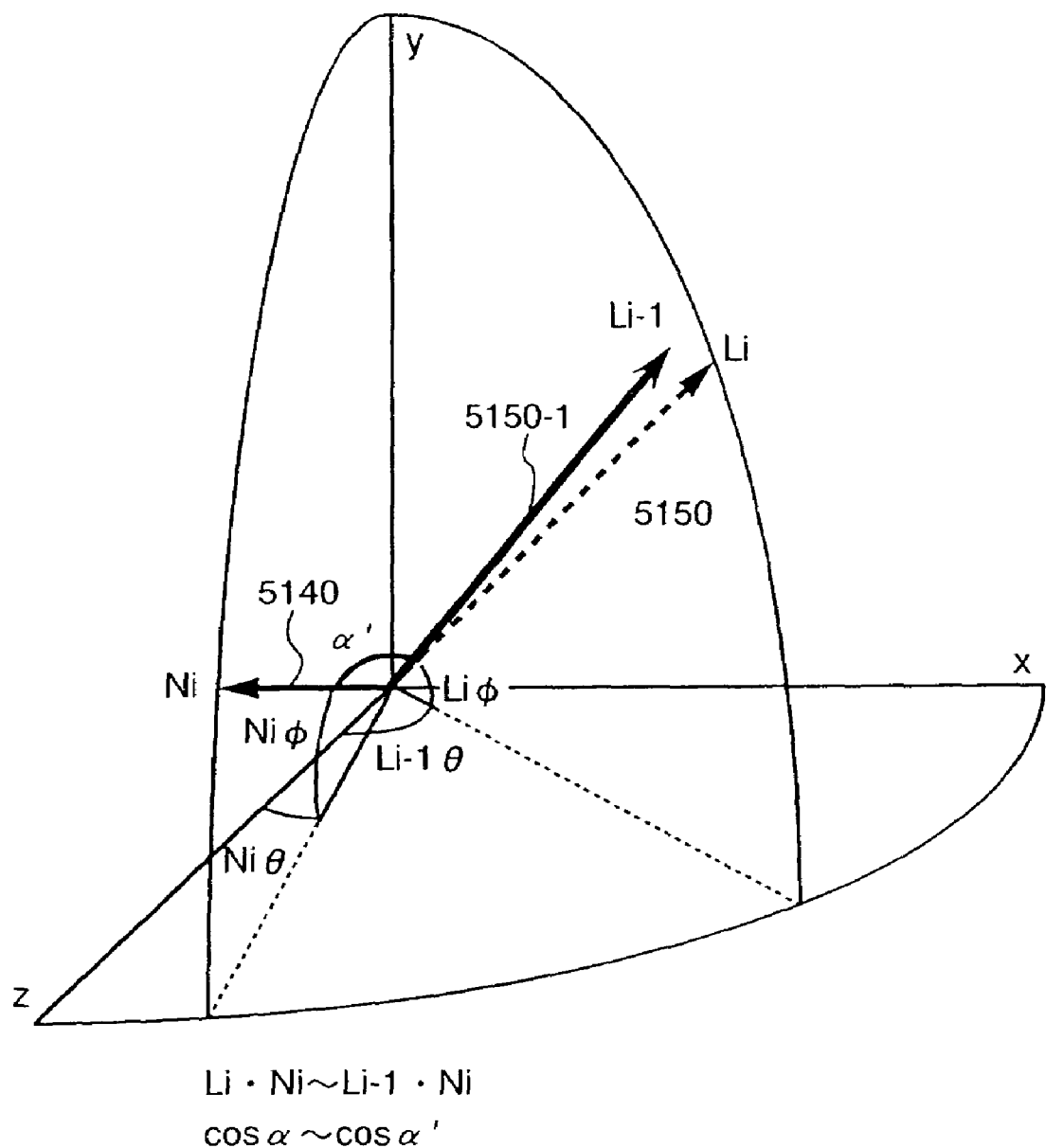
FIG. 36 is a diagram illustrating an interleaving method using the component of the polar coordinate interpolation in order to decrease the amount of hardware.

FIG. 36 is a view illustrating an interleaving method using a component of the polar coordinate interpolation process according to the present invention in which it is possible to decrease the amount of hardware. Originally, the vector 5150 obtained by the interpolation should be used. However, if a value 5150-1 of the immediately preceding small region is used only for either one of the components of the polar coordinate, it is possible to carry out at one time a cosine calculation that the calculation of each of the angle components is originally required, namely, twice the calculation is normally required.

Figure 37:
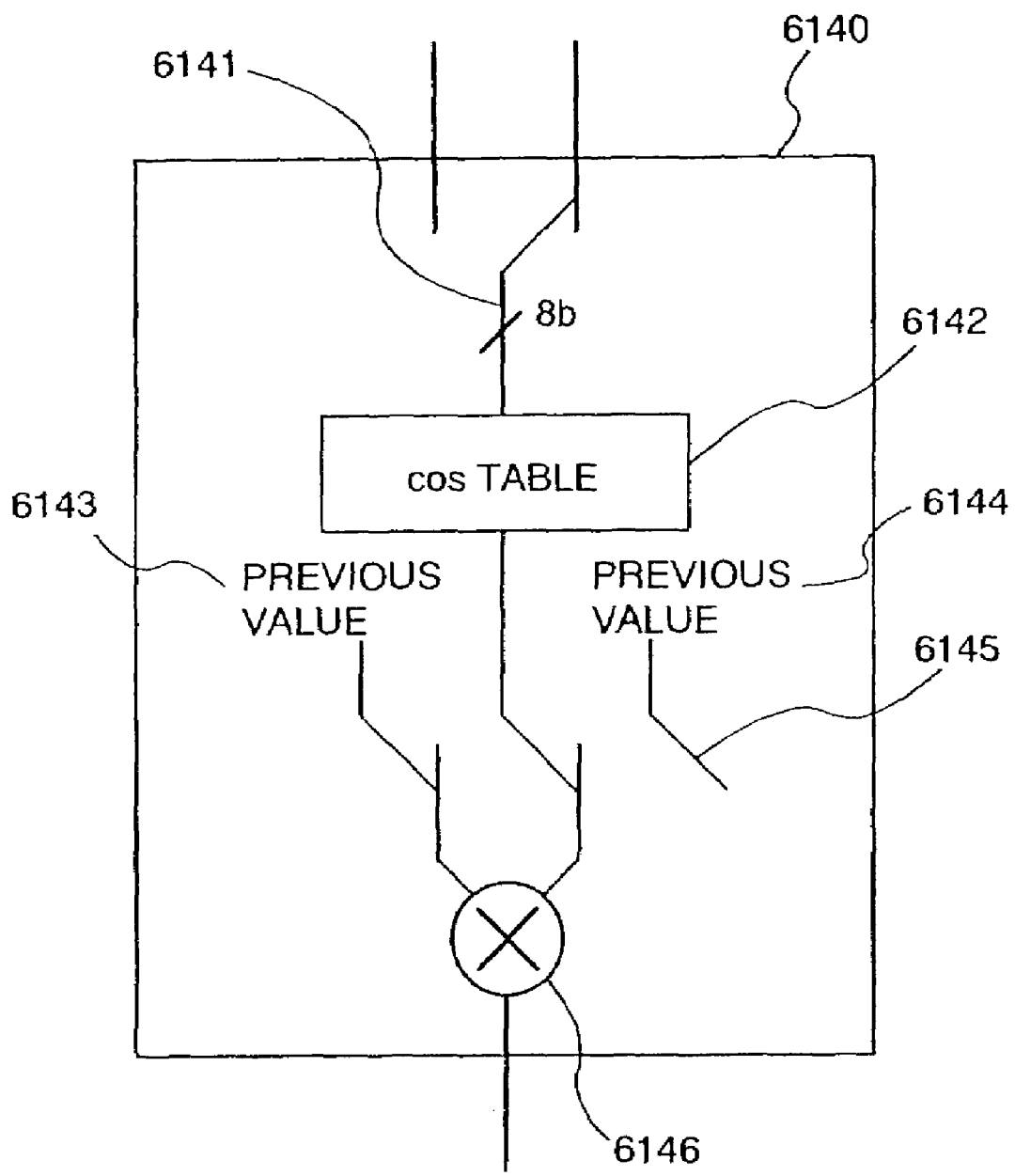
FIG. 37 is a diagram illustrating an interleaving method using the component of the polar coordinate interpolation according to the present invention.

FIG. 37 is a view illustrating an interleaving method using the component of the polar coordinate interpolation according to the present invention. Namely, FIG. 37 shows the configuration of the cosine calculating means 6140 to implement the interleaving method. Because the cosine value to be renewed is one of the polar coordinate components, inputs are changed over by a switch 6141. The cosine value corresponding to the selected component is obtained by referring to a cosine table 6142 in accordance with the input value. A non-elected or the other cosine value is storing in the previous value stored register 5243 or 6144 and is selected according to the switching state of the change-over switch 6145. These two cosine values are multiplied by a multiplier 6146, and thus the approximated value of the cosine of the angle between two vectors is obtained.

FIGS. 38A to 38C are views illustrating examples of a table for the cosine approximation calculation according to the present invention. Reference numerals 6142(*a*), 6142(*b*), and 6142(*c*) each designate a table for cosine calculation. Each table stores data corresponding to a particular purpose and are different from one another.

Figure 39A:
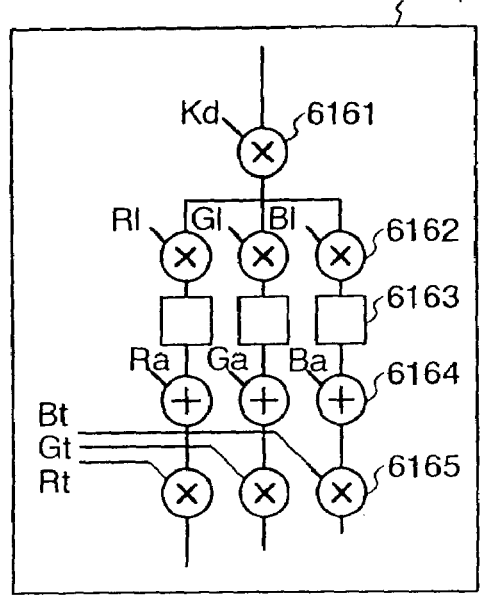
FIGS. 39A and 39B are schematic diagrams illustrating an example of the configuration of the luminance calculating unit according to the present invention.
Figure 39B:
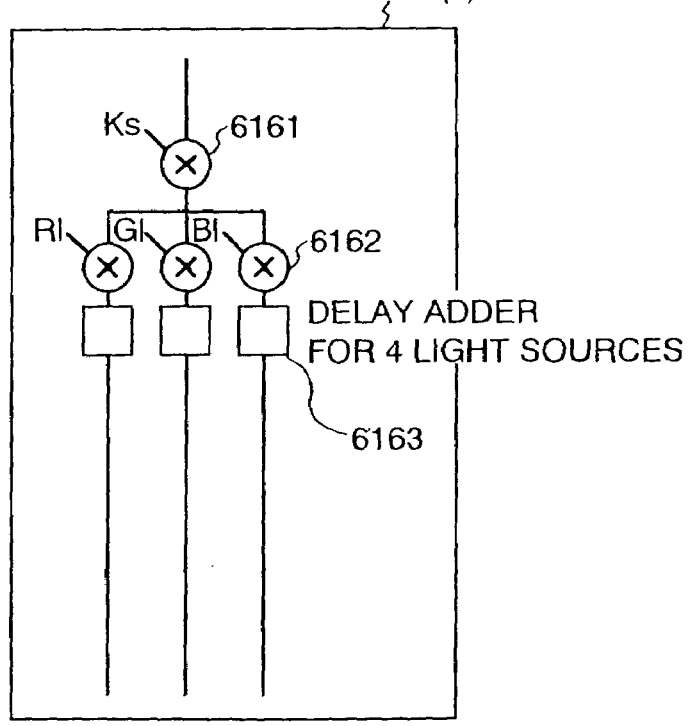

FIGS. 39A and 39B are views illustrating examples of the configuration of the luminance calculating unit 6160 according to the present invention. The luminance calculating unit 6160(*a*) is provided with a coefficient multiplier 6161, a light beam color multiplier 6162, a delay adder 6163 for the calculation of the pixels within the small region, an adder 6164 and a multiplier 6165 for multiplying by the texture color. The adders 6164 and multipliers 6165 are omitted in luminance calculating unit 6160(*b*).

Figure 40:
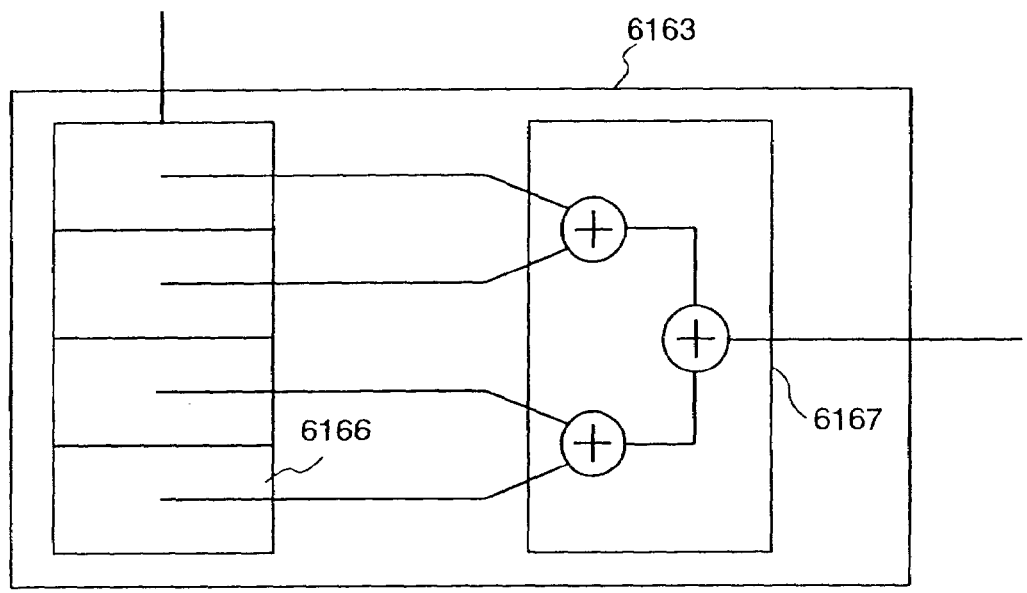
FIG. 40 is a schematic circuit diagram illustrating an adder for adding the luminance of every light source at the small region of the shading apparatus according to the present invention.

FIG. 40 is a view illustrating the delay adder 6163 for adding the luminance of every light source at the small region of the shading apparatus according to the present invention. If there are a plurality of light sources, it is necessary to provide a delay adder 6163 in a number which corresponds to that of the light sources. The delay adder 6163 has a First-In First-Out (FIFO) buffer 6166 and can refer to the luminance value determined four times back. The adder 6167 adds these luminance values and outputs approximated luminance values for 4 light sources at the small region.

Figure 41:
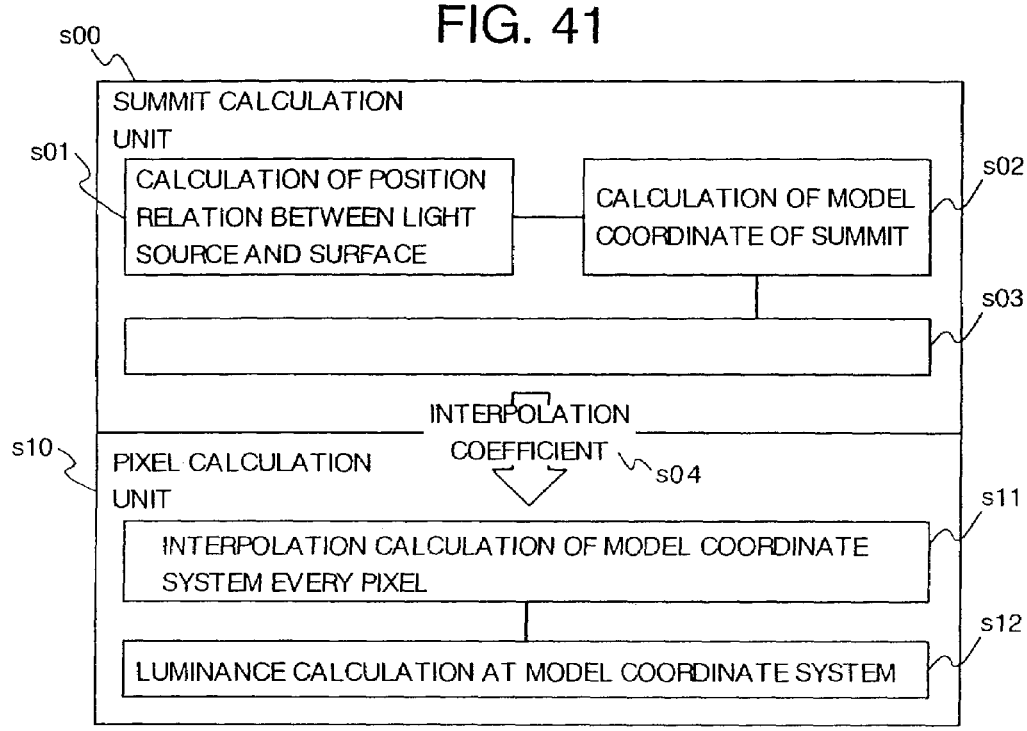
FIG. 41 is a flow chart showing the processing procedure of a method of calculating the luminance at a small region of the shading apparatus according to the present invention.

FIG. 41 is a flow chart showing the processing steps of the method of calculating the luminance at the small region of a shading apparatus according to the present invention. Generally, the shading apparatus for a drawing apparatus comprises two units, a vertex or summit calculation unit s00 and a pixel calculation unit s10. The vertex calculation unit s00 calculates various kinds of parameters at the vertex of the surfaces which form a three-dimensional figure. Among the parameters handled in the vertex calculation unit s00, the parameters pertinent to the present invention are mainly the value of the normal vector N, the value of the light beam vector Ldir, and so on. The pixel calculation unit s10 calculates the luminance at each point within the surface. In the actual system, the vertex calculation unit s00 in which the processing is performed for every surface is mainly suitable for processing using software, and the pixel calculation unit s10 in which the processing is performed for every point is mainly suitable for the processing performed by hardware. Of course, each processing may be performed by either software and the hardware.

The present invention aims at a high-speed processing of the pixel calculation unit s10 and a decrease of the hardware. In the vertex calculation unit s00 of the present invention, a corresponding relationship between the surface forming the three-dimensional figure and the surface in the normalized model coordinate system, and the interface data to the pixel calculation unit s10, is formed. Therefore, the calculation of an in-surface interpolation coefficient s03 is performed after the calculation s01 of the positional relationship between the light source and the surface, and the calculation s02 of the coordinate value in the model coordinate system of the vertex. The pixel calculation unit s10, which receives the interface data, performs the calculation s11 of the actual interpolation and obtains various parameters in the model coordinate system corresponding to the points within the surface. On the basis of these parameters, the luminance calculation s12 is performed and shaded.

Figure 42:
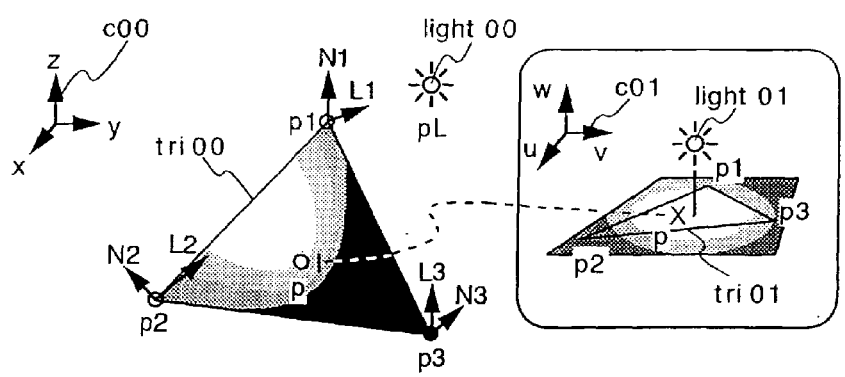
FIG. 42 is a diagram illustrating the concept of a normalized model coordinate system used in the present invention.

FIG. 42 is a view illustrating the concept of a normalized model coordinate system. Namely, FIG. 42 illustrates the physical image of the translation from actual space to a normalized model coordinate system. The actual space is defined on the normal rectangular coordinates c00. It is assumed that the figure tri00 in the actual space and is illuminated by the light source light 00. The normal vector N1, N2 and N3 are defined at the vertex p1, p2 and p3 of the figure tri00, respectively. The vectors L1, L2 and L3 expressing the direction of the light source are respectively calculated. The normalized model coordinate c01 has an origin corresponding to the foot of a perpendicular drawn from the light00 to the figure tri00. In the normalized model coordinate c01, the translation is being performed so that the light01 corresponding to the light00 may form a unit vector along one axis. If the one axis is set as w, and the two remaining axes having a co-surface relationship with the figure are set to u and v, each vertex of tri00 is copied to the corresponding coordinate value and the figure tri00 in the normalized model coordinate system is formed. The vector at the vertex of tri01 matches up to the unit vector of the w-axis, and the light beam vector matches up to the vector looking over the light01.

Figure 43A:
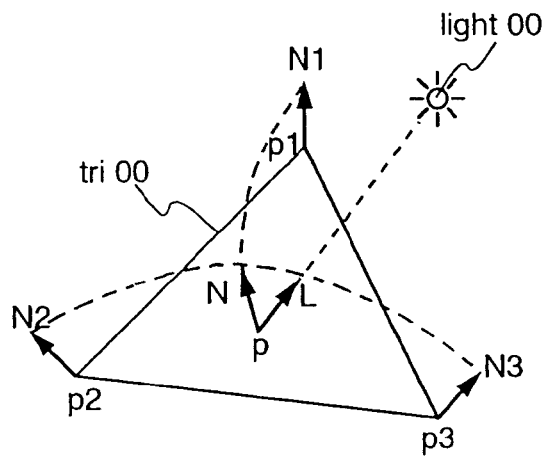
FIGS. 43A to 43C are diagrams showing a comparison between the luminance calculating method of the present invention and that of the prior art.
Figure 43B:
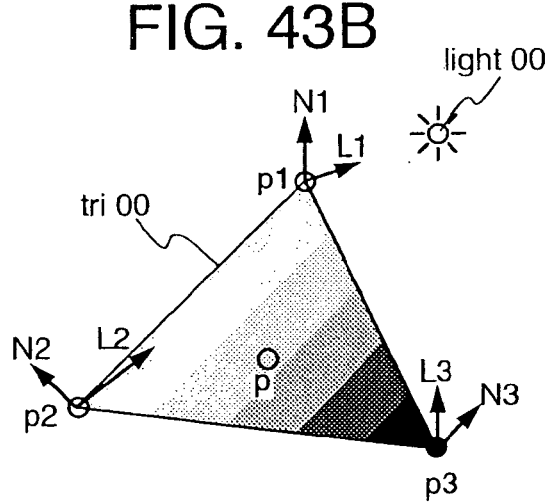
Figure 43C:
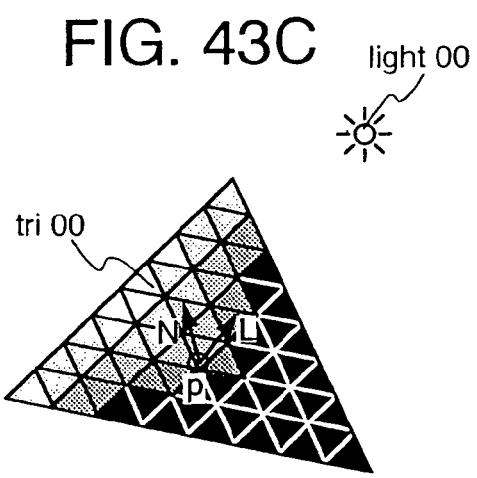

FIG. 43A to 43C are views showing the comparison of the luminance calculating method of the present invention with the prior art. FIG. 43A is an illustration of the Phong Shading in the prior art. It becomes possible to obtain a spot light, a high light and smooth shading by calculating the normal line and the direction of the light beam at each point. The normal vector N at a point P within the figure tri00 is obtained by the interpolation from N1, N2 and N3. The vector L of the light is re-calculated from the positional relationship to the light00. Because the coordinate system c00 is in actual space, the positional 10 relationship between the light00 and the figure tri00 is arbitrary. It is, therefore, necessary to carry out a floating point calculation or to otherwise satisfy the arbitrariness.

FIG. 43B is an illustration of Gouraud shading. In this method, after the luminance at the vertex of the figure is calculated by the vertex calculation unit, the luminance is interpolated within the surface. Because the luminance is just linearly interpolated, it is impossible to express a spot light and a high light within the surface, and the smoothness of the shading is relatively low. In this method, the amount of the calculation in the pixel calculating unit is relatively small. Therefore, many system use this method. However, in order to obtain the same power of expression as Phong shading, it is necessary to divide the figure as shown in FIG. 43C, and thus to increase the number of points or the number of vertexes of the luminance calculation. However, it is essential to divide the figure into more than three figures number. Therefore, it is not suitable for display a figure in real time.

FIG. 44 is a view illustrating a calculating formula and a summary of the luminance calculation according to the present invention.

The luminance of a certain pixel is obtained by the sum total of the pixels for every light source as expressed in equation (1). As has been already described with respect to FIG. 34, the luminance of each light source is expressed by the peripheral reflecting component Ia, the diffusion reflecting component Id and the mirror reflecting component Is. The peripheral reflecting component Ia is determined only by the attribution value Ka of the object, the color Oc of the object, and the color Lc of the light source as expressed in equation (1a).

The diffusion light component Id and the reflecting light component Is are obtained by the equations (1b) to (1c). Here, Kd and Ks are attribution values of the object, Sc is a reflection color, and Latt is an attenuation term according to the distance from the light source. Further, N is a normal vector, L is a light source vector, v is a view point vector and R is a reflection vector. Ldir is a direction vector when the light source is a spot light. As the inner product of N and L becomes large, the pixel becomes clear, because the light beam is irradiated to the front surface. As the inner product of V and R becomes larger, the reflecting light beam increases. Further, as the inner product of L and Ldir becomes large, it becomes close to the center of the spot light and becomes clean In order to make the range of the high light sharp, the power of Sconc is multiplied by the inner product of V and R, and in order to make the range of the spot light sharp, the power of Lconc is multiplied by the inner product of L and Ldir. In accordance with the present invention, the calculation of these inner products necessary to form every pixel is made simple.

Figure 45:
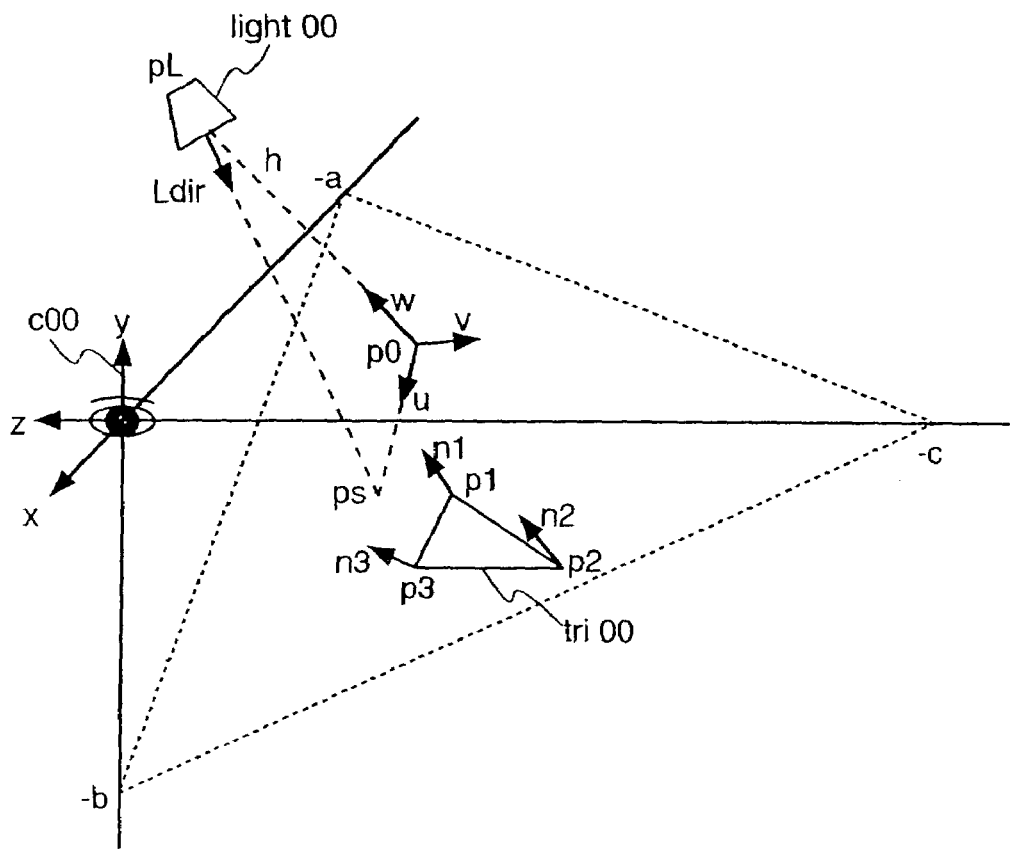
FIG. 45 is a diagram showing the relationship between positions of various kinds of vectors in actual space.
Figure 46:
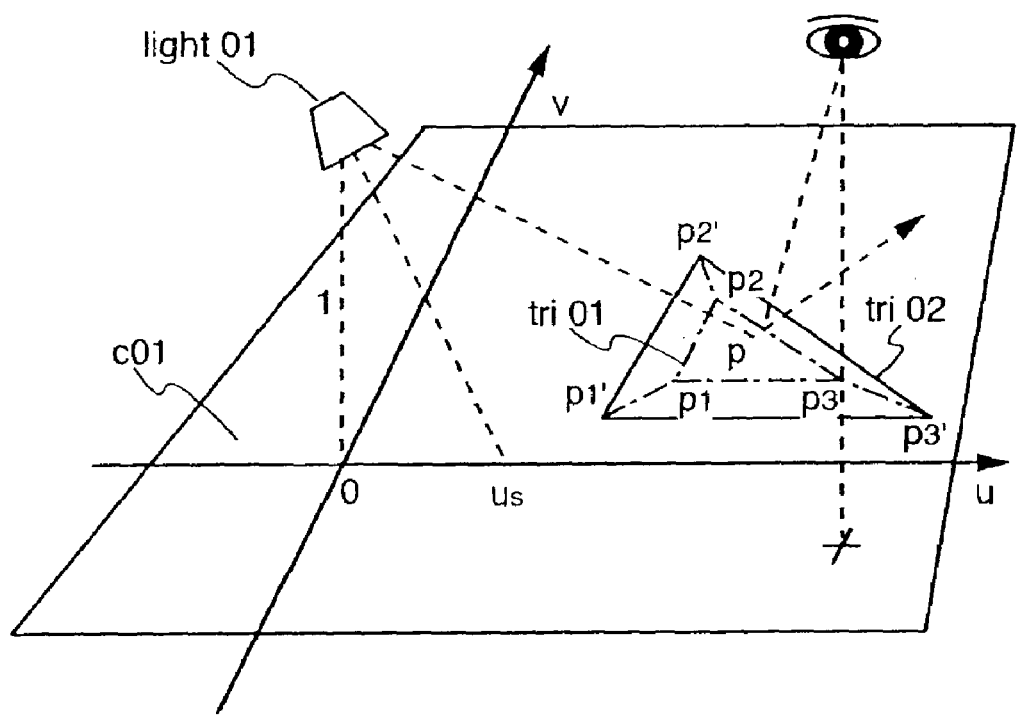
FIG. 46 is a diagram showing the relationship between positions of various kinds of vectors in a normalized model coordinate system.

FIG. 45 is a view showing the relationship between positions of various kinds of vectors in actual space. Further, FIG. 46 is a view showing the relationship between positions of various kinds of vectors in the normalized model coordinate system used in the present invention. Referring to FIGS. 45 and 46, the procedure for copying a figure in actual space to the normalized model coordinate system will be explained.

The equation representing a surface in actual space is expressed by the equation (2a) of FIG. 45. The coefficient of the equation of the surface including figure tri00 is obtained by equation (2c) via equation (2b), by substituting each vertex for the surface equation. Further, the distance between the light source and the flat surface is obtained by equation (2). The coefficient of the surface equation is also the normal vector of the surface. The vector w corresponding to the w-axis of the normalized model coordinate system is obtained. With regard to the two remaining axes u, v on the surface, the direction along the spot directional vector is set to u, and the direction perpendicular to u is set to v. The position of the point p on the surface seen from the foot p0 of the perpendicular line drawn from the light source to the flat surface is obtained by calculating the inner product of u, v and the vector from the light source pL to p. Because in the normalized model coordinate system the distance between the surface and the light source is normalized to 1, the positional relationship is divided by h. The position of the view point is also converted in a similar way. Namely, the distance along the w-axis is equal to the quotient obtained by dividing the distance in actual space by h. The positional relationship on the surface is obtained by calculating the inner product of u, v and the vector from the light source to the view point 000. The translated figure is as shown in FIG. 46. Because the figure is on the surface (u, v), the necessary coordinate value can be obtained just from the two-axes coordinates. The point at which the center directional line of the spot light intersects the surface is translated to a point (us, 0) on the u-axis in a similar way.

FIG. 47 is a view illustrating a method of correcting the gradient of the normal vector. Namely, this figure shows a method of correcting the translated vertex by using the gradient of the normal vector. The vertexes p1, p2, p3 are corrected to become p1', p2', p3', respectively. This correction is obtained by moving the point so that the normal line may be oriented in the w-direction, maintaining the positional relationship between the vector looking at the light source and the normal vector. In the place for the moving, a virtual light source is set in the upper direction of the previous point and the correction is made using the virtual light source. This operation is performed to set the moving amount to 0 if the normal line originally is oriented in the w-direction. Further, the moving amount is positive and mutually related to the distance from the true light source. Therefore, the height of the position of the virtual light source is set to a distance proportional to the distance between the origin and the previous point. At this time, the moving amount dp is obtained by equations (3a) to (3c) of FIG. 47. By linearly correlating the normal-corrected vertex p1', p2', p3' to the vertex p1, p2, p3 in actual space, it is possible to cause the luminance calculation result for every pixel in the normalized model coordinate system to correspond to a point in actual space.

Figure 48:
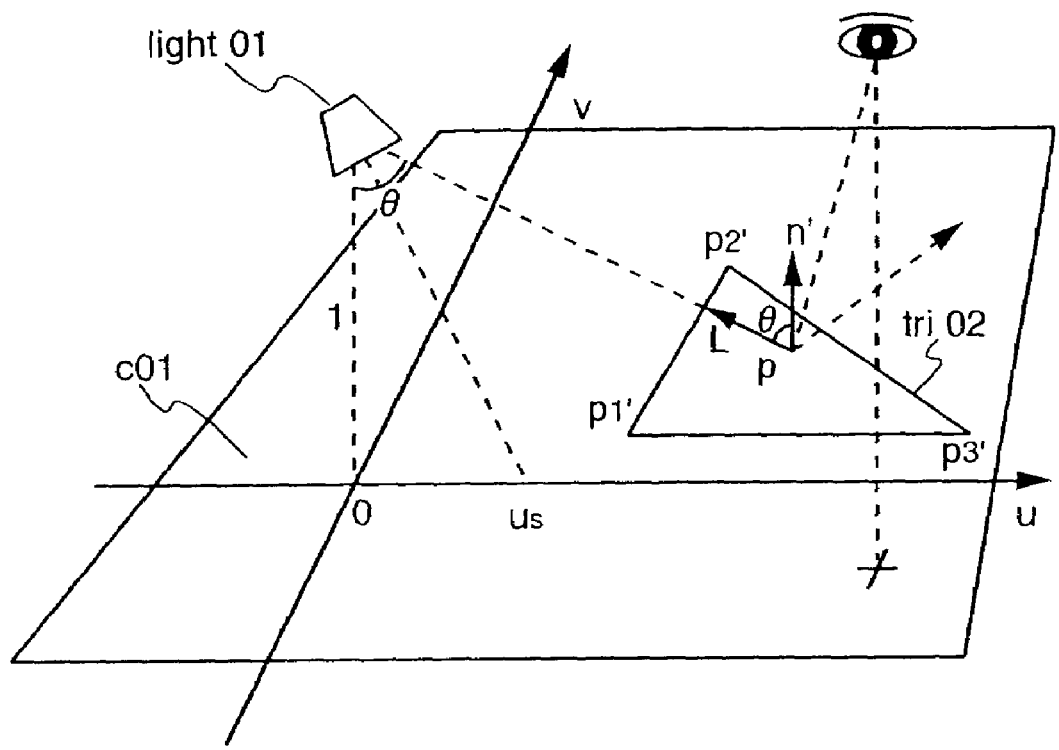
FIG. 48 is a diagram showing a procedure for calculating the attenuation term of the diffusion component in a normalized model coordinate system.

FIG. 48 is a view showing the calculation procedure of the attenuation term of the diffusion component in the normalized model coordinate system of the present invention. The attenuation term for the diffusion component is proportional to the cosine of the angle θ between the light source direction vector L and the normal vector n'. Because the normal vector n' matches up to the w-axis, as a result of the previous correction, the w component of the light source direction vector L is the value to be obtained. This value is expressed by equation (4) of FIG. 48.

FIG. 49 is a view showing the calculation procedure of the attenuation term corresponding to a spot direction in the normalized model coordinate system of the present invention. The attenuation term corresponding to the spot direction is proportional to the cosine of the angle β between the light source direction vector L and the inverse spot direction vector (Ldir) to the nth power. The value of the cosine of the angle β varies for every pixel. How to calculate the value will be explained hereinafter with reference to equations (5) and (5a) to (5c). In these equations, u0 corresponds to the point us of FIG. 49. Further, A range (f, a, b) is the function which sends back its value only when f is within the section [a, b], otherwise, it sends back 0. L is a vector looking at the light source from the point, and (-Ldir) is a vector looking at the light source from the point us. Therefore, these cosine values are calculated simply.

Figure 50:
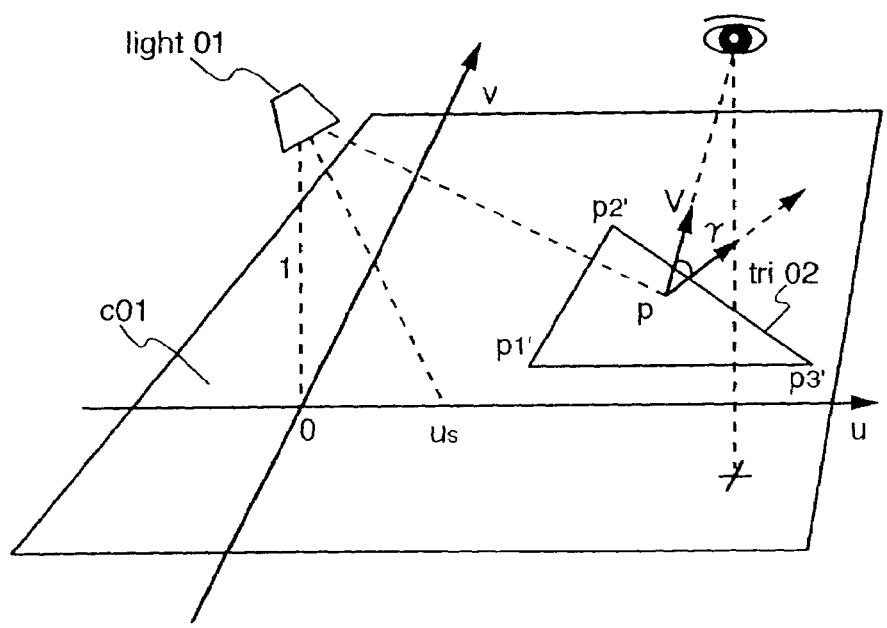
FIG. 50 is a diagram showing a procedure for calculating the attenuation term of a component of reflected light in a normalized model coordinate system.

FIG. 50 is a view showing the calculation procedure of the attenuation term of the component of reflected light in the normalized model coordinate system of the present invention. The attenuation term of the reflected light component is proportional to the cosine of the angle γ between the reflected light direction vector R and the view point direction vector (V) to the nth power. The value of the cosine of the angle γ varies for every pixel. How to calculate the value will be explained hereinafter with reference to equation (6) of FIG. 50. In this equation, V is a vector looking at the view point from the point and is translated as a coordinate corresponding to the origin at the translation to the normalized model coordinate system. Further, R is a vector looking at the light source, in which the sign of the (u, v) component is inverted. Therefore, these cosine values are calculated simply.

Figure 51:
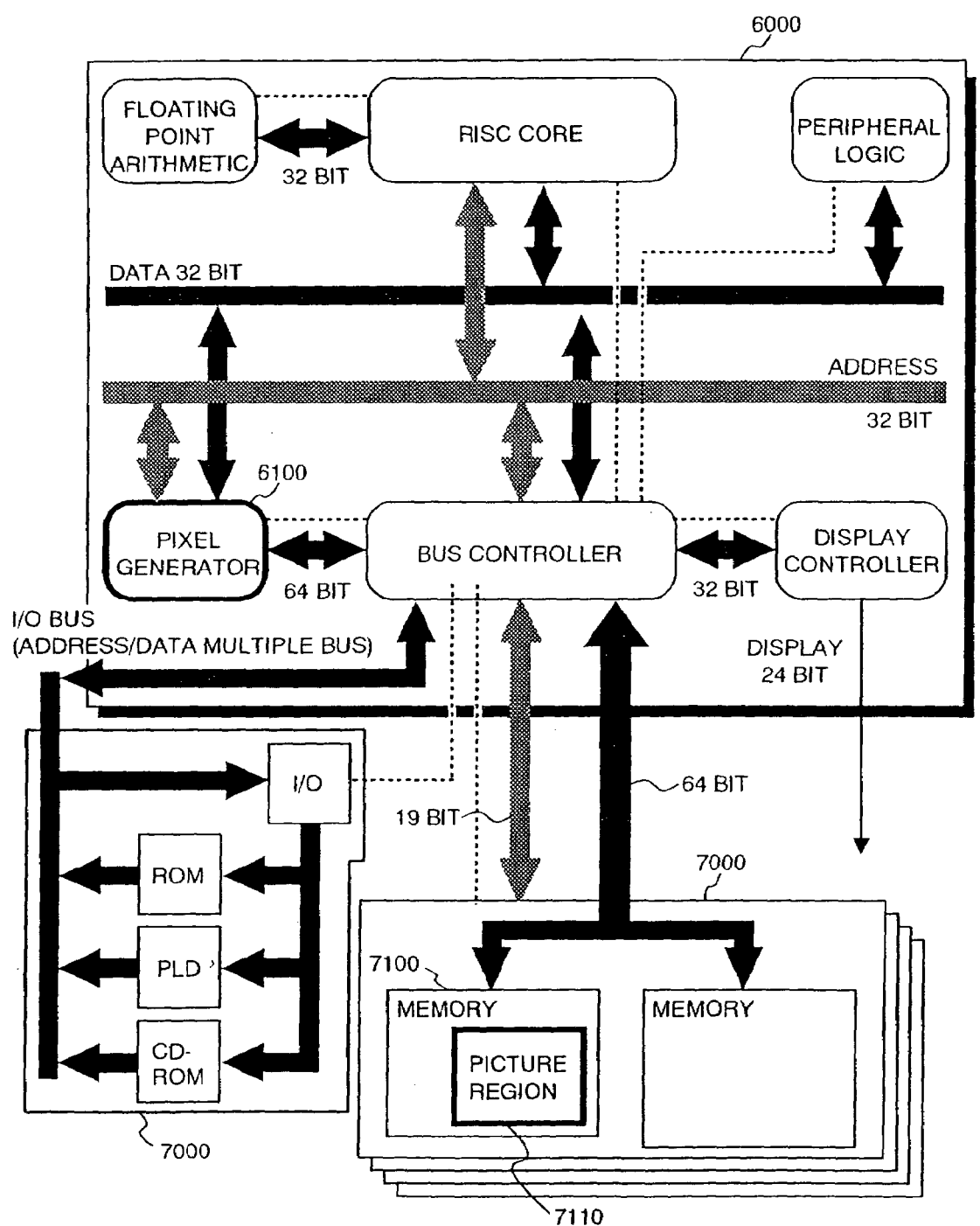
FIG. 51 is a block diagram showing an example of the system configuration of a media processor used in the shading apparatus of the present invention.

FIG. 51 is a block diagram showing an example of the system configuration of a media processor used in the shading apparatus of the present invention.

The shading apparatus is realized as a portion of the media platform, which is a common base of the multi-media, under the basic concept of a one-chip processor and memory integration. The hardware of the media platform comprises a media processor 6000 in which a RISC core and a graphic core are integrated with each other, an integrated memory 7000 in which the main memory and the picture region are integrated with each other, and a peripheral logic 8000. The media platform system is realized as a common environment in which a media library is installed on the hardware.

The media processor 6000 has a pixel generating unit 6100 which is a part of the graphic core. The integrated memory 7000 includes a general purpose or a dedicated memory chip 7100, in which there is a picture region 3110.

As the dedicated memory chip, a special memory chip for the purpose of the generation of a picture is known, which chip has a write-in function with comparing andy determination features and a read-out function with calculation. The pixel generator 6100 generates a pixel forming a figure according to the luminance calculating method of the present invention and writes the resultant picture data in a picture region 7110.

Figure 52:
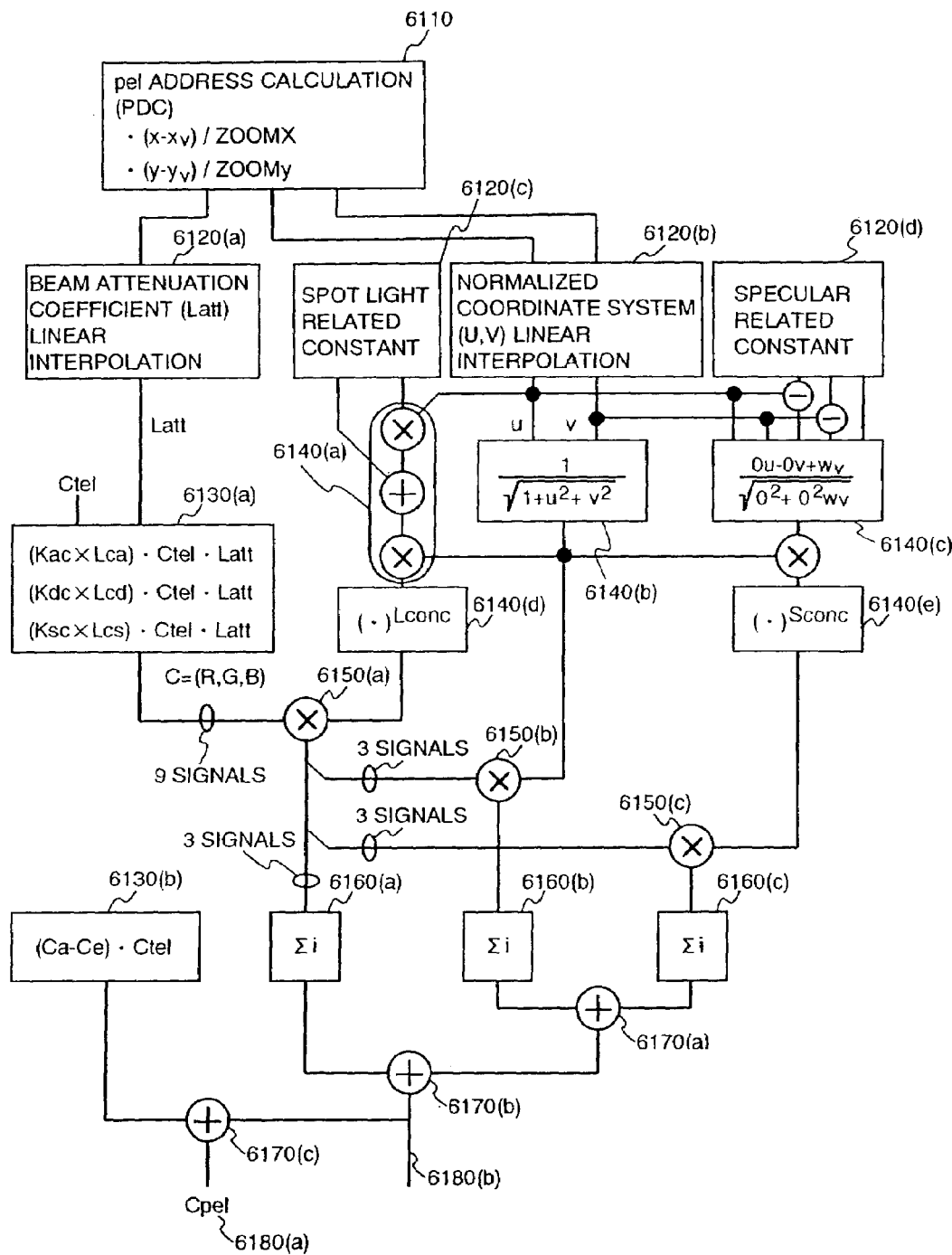
FIG. 52 is a schematic diagram showing an example of the configuration of the pixel generating unit of FIG. 32.

FIG. 52 is a block diagram showing an example of the configuration of the pixel generator 6100.

The address calculating unit 6110 for a small region determines the position of the small region to be processed. The position of the typical point at the small region is determined at the same time. If the position of the typical point is at the center of the small region, the position of the small region corresponds directly to that of the typical point. Because the form of the small region is rectangular in actual use, the determination of the position involves the determination of the row address and the column address of the small region. The small region is formed from at least one pixel.

The obtained row address and column address are input to interpolation coefficient/in-surface constant generator group 6120(*a*) to 6120(*d*). The interpolation coefficient/in-surface constant generator group 6120(*a*) to 6120(*d*) generates the coordinates of the normalized model coordinate system at the typical points by interpolation, based on the row address and the column address of the small region.

The generator 6120(*a*) interpolates the attenuation term Latt corresponding to the distance from the light source in the surface. The generator 6120(*b*) interpolates the value of the coordinate in the corresponding normalized model coordinate system. The generator 6120(*c*) outputs constants pertinent to the spot light source and the generator 6120(*d*) outputs constants pertinent to the reflected light component. By using those values of interpolation and the constants, the luminance value is calculated according to the previous equations (1), (4), (5) and (6).

An arithmetic unit 6130(*a*) calculates the spot attenuation term, based on the equation (5). An arithmetic unit 6130(*b*) calculates the attenuation term due to the diffusion component, based on the equation (4). An arithmetic unit 6130(*c*) calculates the attenuation term due to the reflected light component, teased on the equation (6). Arithmetic units 6140(*a*), (*b*), (*c*) etc. calculate the luminance using those values.

FIGS. 53A to 53C show examples of the format of the drawing commands, including the command format used to start the luminance calculating unit positioned after the arithmetic unit 6130(*a*). One word consists of 32 bits. In the first 6 words, the information as to the shape of the drawing figure (a triangle) is stored. In the subsequent 2 words, the interpolation coefficient of the depth information is stored. In the further subsequent 4 words, the information of the interpolation coefficient to the texture coordinate is stored. The further subsequent words indicate parameters pertinent to the luminance, which consist of 7 words per light source.

A first portion of the first word among the shape information is a command ID. The command ID gives the information relevant to the drawing of a figure, whether or not the top side is horizontal, the number of the light source, etc. The following portion is a y-coordinate where the drawing is started. The second word includes the information of the vertical size of the figure. Here, h1 indicates the height from the starting point to the next vertex, and h2 indicates the height from the next vertex to the final vertex. According to the shape of the figure, these values may be zero. The words after the third word give information as to the inclination of the side. There is a case where the value does not exist according to h1, h2. It is determined by using the command ID or h1, h2.

The depth interpolation information and the texture coordinate interpolation information, respectively, consist of a coefficient relevant to x, y and z, and an index part. An arithmetic operation with the values of x, y and z is carried out, and the value after the interpolation is obtained. The index part has one value common to the values of x, y and z in order to maintain the precision to the actual space. With regard to the depth information, a method of interpolating the inverse number of the depth is provided for the convenience of a later perspective translation.

The information relevant to the luminance calculation will be explained. The first word is an interpolation parameter for the attenuation term component depending on the distance. Because the luminance value is approximately 8 bits in the final stage, each of the coefficients consists of 8 bits. The method of interpolation is as in the case of the interpolation of the texture or the depth. The subsequent 4 words indicate interpolation information of the normalized model coordinate. The calculation method is as in the case of calculation of the texture or the depth. The final 2 words indicate a constant of each of the figures, which is necessary to calculate the luminance. The value common to a plurality of figures is set by another command. Among two words, a first two bytes is a constant necessary to calculate the attenuation term due to the spot light expressed in the equation (5). The three remaining parameters, each consisting of two bytes, indicate a constant necessary to calculate the component of the reflected light expressed in the equation (6).

Figure 54:
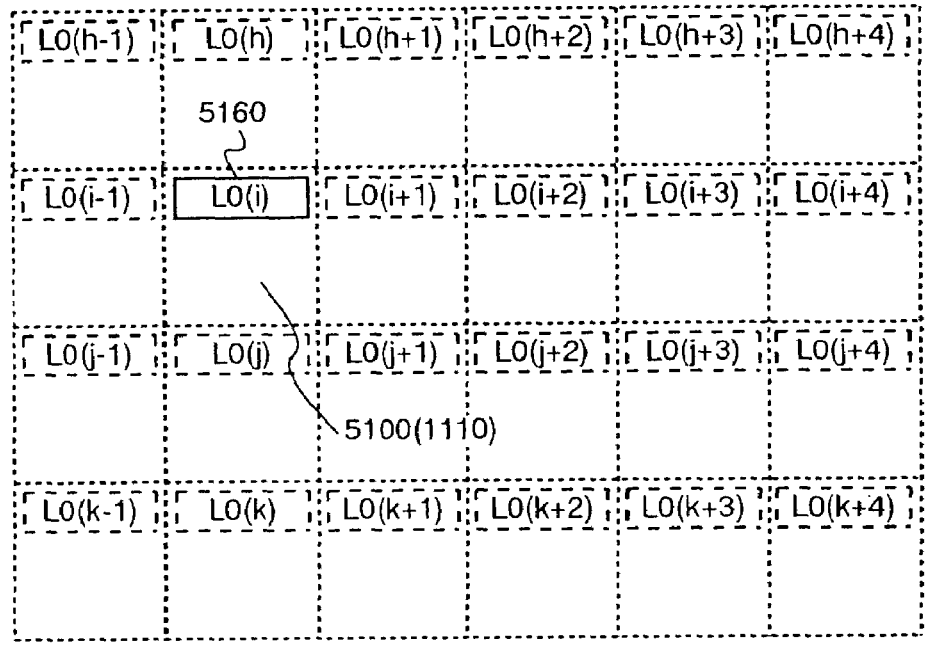
FIG. 54 is a diagram illustrating a procedure for pixel generation and the configuration of a small region in which one light source is used.

FIG. 54 is a view illustrating the procedure for pixel generation and the configuration of the small region in which one light source is used. Because the number of calculations of the light source per one pixel 5110 is less than one, the size of the small region is one pixel. Namely, against the small region 5100 or pixel 5110, the luminance calculation 5160 is effected with respect to the light source 0, alight source of the light source number 0. The amount of calculation per one pixel corresponds to a one time luminance calculation.

Figure 55:
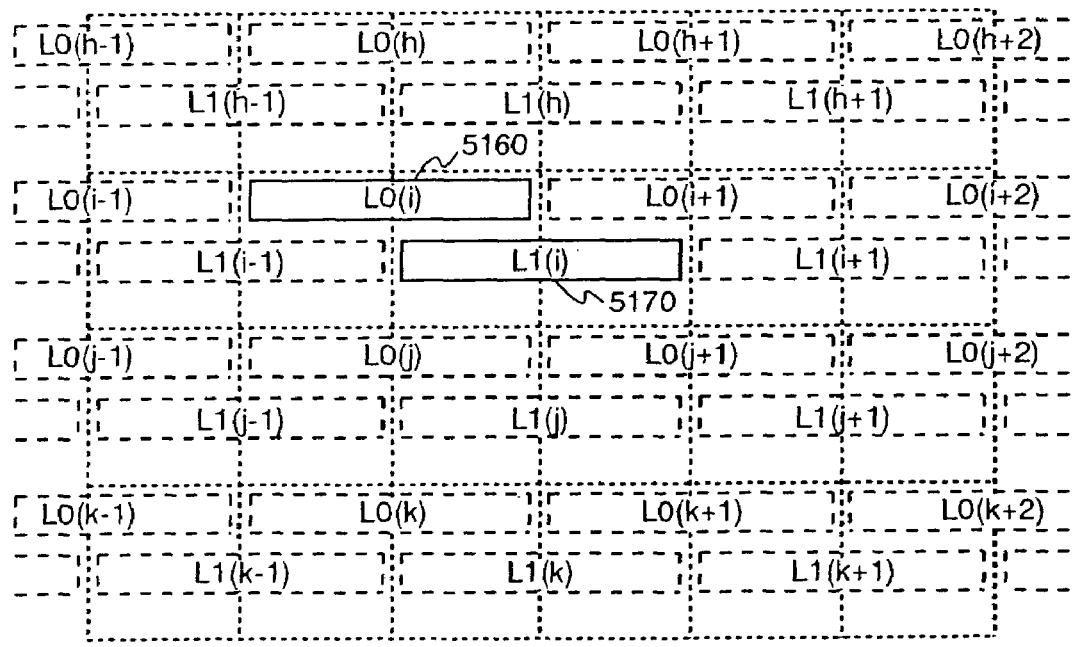
FIG. 55 is a diagram illustrating a procedure for pixel generation and the configuration of a small region in which two light sources are used.

FIG. 55 is a view illustrating the procedure of the pixel generation and the configuration of the small region in which two light sources are used. In order to decrease the number of calculations of the light source per one pixel so as to be equal to or less than one, the size of the small region 5100 must be equal to or more than 2 pixels. If the small region 5100 is equal to or more than 2 pixels, it is necessary to determine the form. Because the order of the generation of pixels is basically in a horizontal direction, it is desirable to set 2 pixels continuously in a horizontal direction to the small region 5100.

As to 2 pixels, the luminance is calculated one time per one light source. However, the luminance calculation of each of the light sources can not be performed at the same time in an effort to decrease the amount of hardware. In a system in which the pixel is generated after the luminance calculation against all the light sources is completed, a fluctuation due to the number of the light sources occurs, in addition to a longer latency and a deterioration of the performance. Therefore, the control becomes complicated. Accordingly, the present invention uses an improved method in which the processing of the luminance calculation and the processing of the generation of pixels are performed in a pipe-line process.

In this method, the small region deviated from each other by one pixel is defined for every light source. The luminance calculation is performed before the first generation of a pixel of the small region. Further, in the luminance calculation with respect to another light source, a value which has already been calculated is used. In FIG. 24, reference numeral 5100(0) designates the small region corresponding to the light source 0 and 5100(1) designates the small region corresponding to the light source 1. The luminance of a first pixel calculated at the small region or the luminance of a pixel in the left side of 5100(0) is obtained by calculating the luminance corresponding to the light source 0 and adding it to the luminance due to the light source 1 which has already been calculated with respect to a pixel to the left side by one pixel and the pixel in question. The luminance of a pixel to the right side of 5100(0) or a pixel in the left side of 5100(1) is obtained by adding the previously obtained luminance corresponding to the light source 0 to the newly calculated luminance corresponding to the light source 1. In such a way, the calculation per one pixel becomes a one time luminance calculation.

Figure 56:
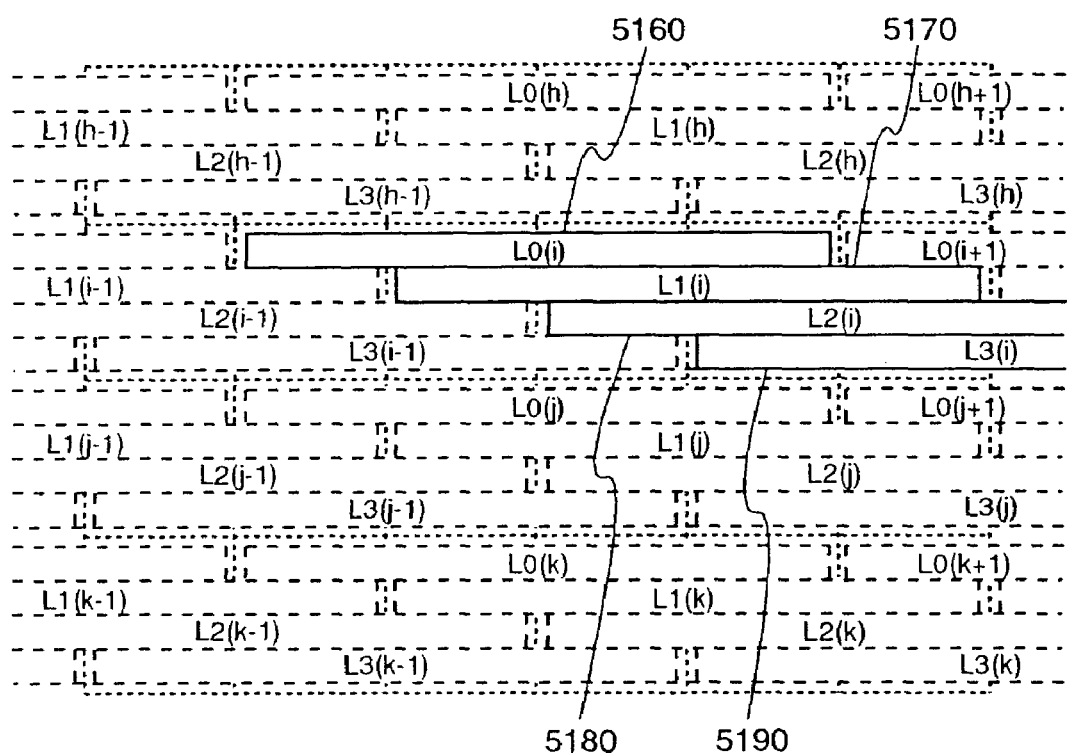
FIG. 56 is a diagram illustrating a procedure for pixel generation and the configuration of a small region in which four light sources are used.
Figure 57A:
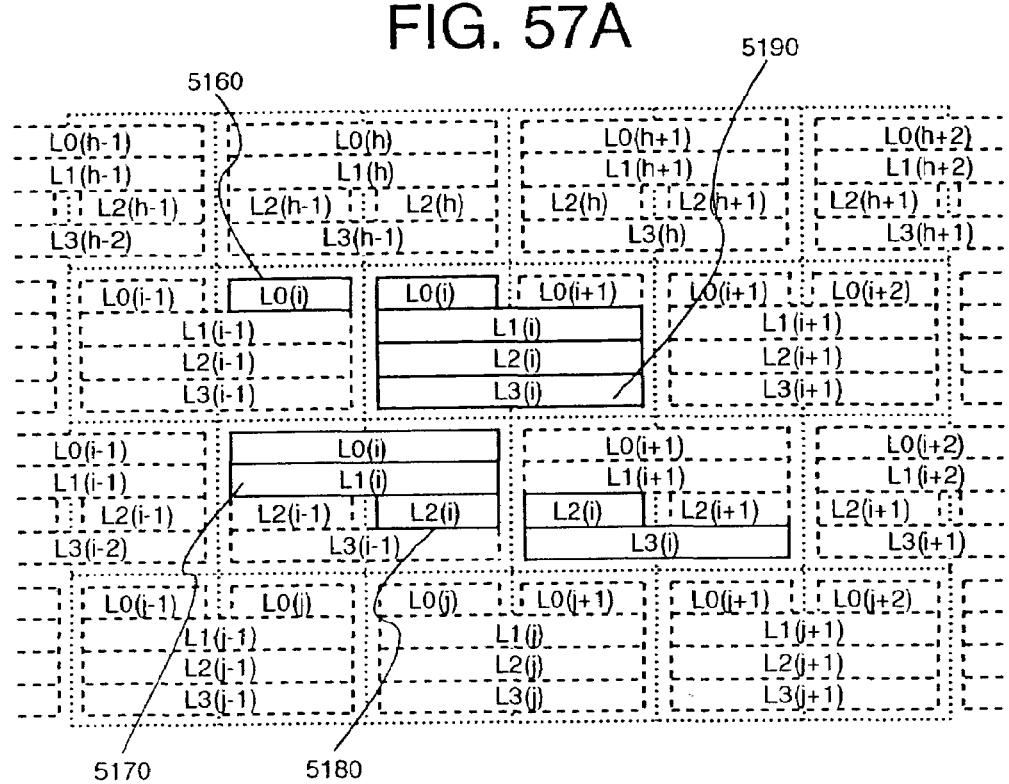
FIGS. 57A and 57B are diagrams illustrating a procedure for pixel generation and the configuration of a small region in which four light sources are used.
Figure 57B:
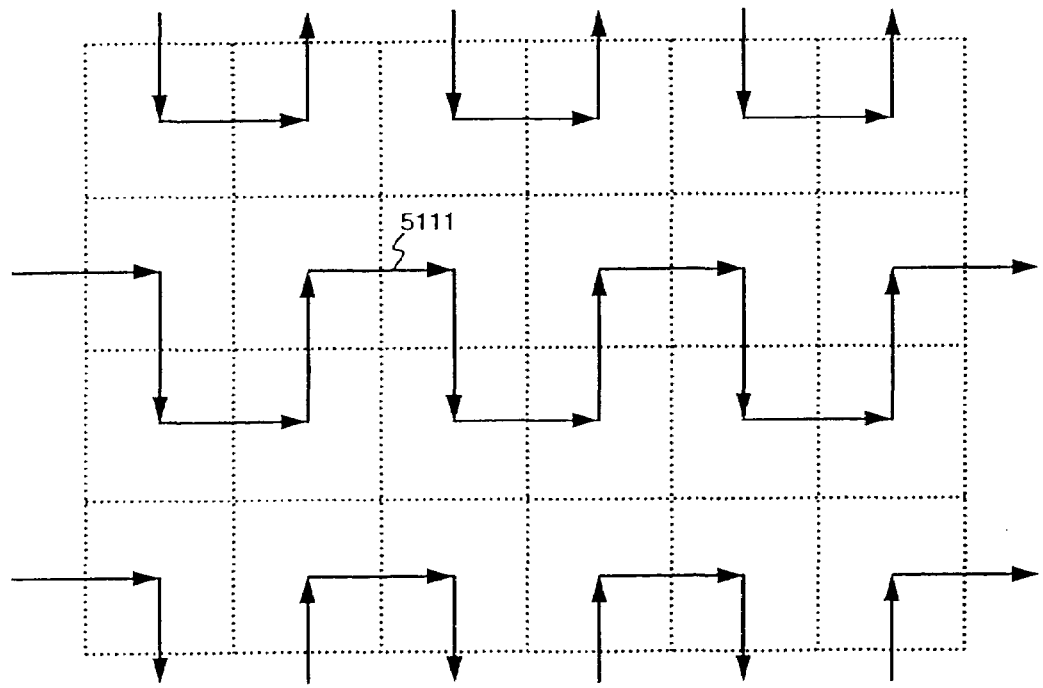

FIG. 56 is a view illustrating the procedure of pixel generation and the configuration of the small region in which four light sources are used. In this ease, the small region consists of four pixels. Since FIG. 56 shows the ease where the small region is elongated laterally, it can be considered in the same manner as that of the system of FIG. 55. FIGS. 57A and 57B are views illustrating the procedure of pixel generation and the configuration of the small region in which four light sources are used. In FIG. 57A, the pixels generated in sequential order are arranged two-dimensionally. FIG. 57B shows two-dimensionally arranged pixels generated in sequential order as represented by arrow 5111. Namely, the pixels generated in the order shown are arranged along a zigzag path so that sequentially generated pixels are located adjacent to each other.

Figure 58A:
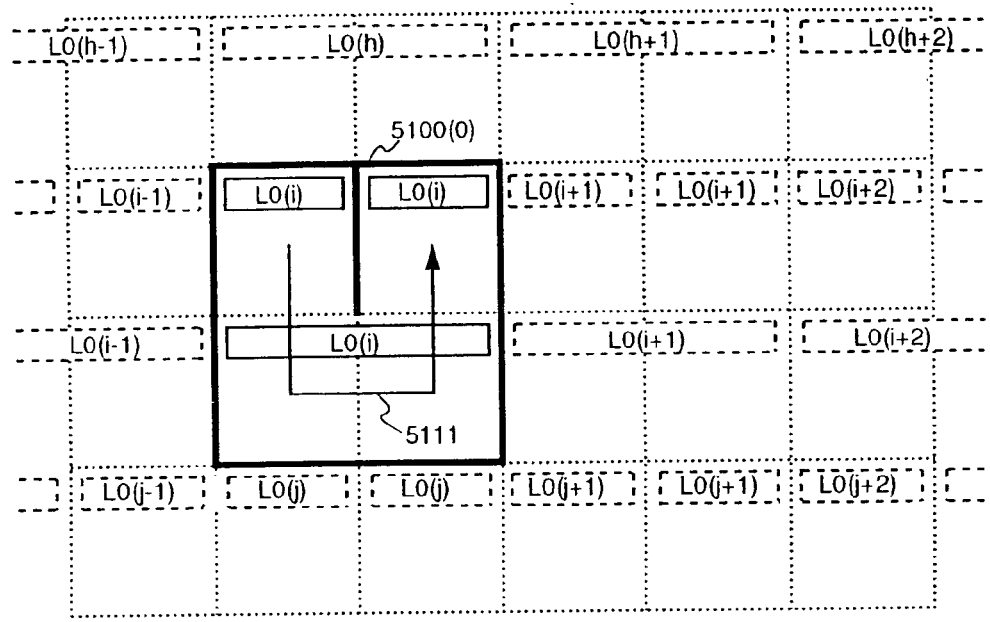
FIGS. 58A and 58B are diagrams illustrating a procedure for pixel generation and the configuration of a small region in which four light sources are used.
Figure 58B:
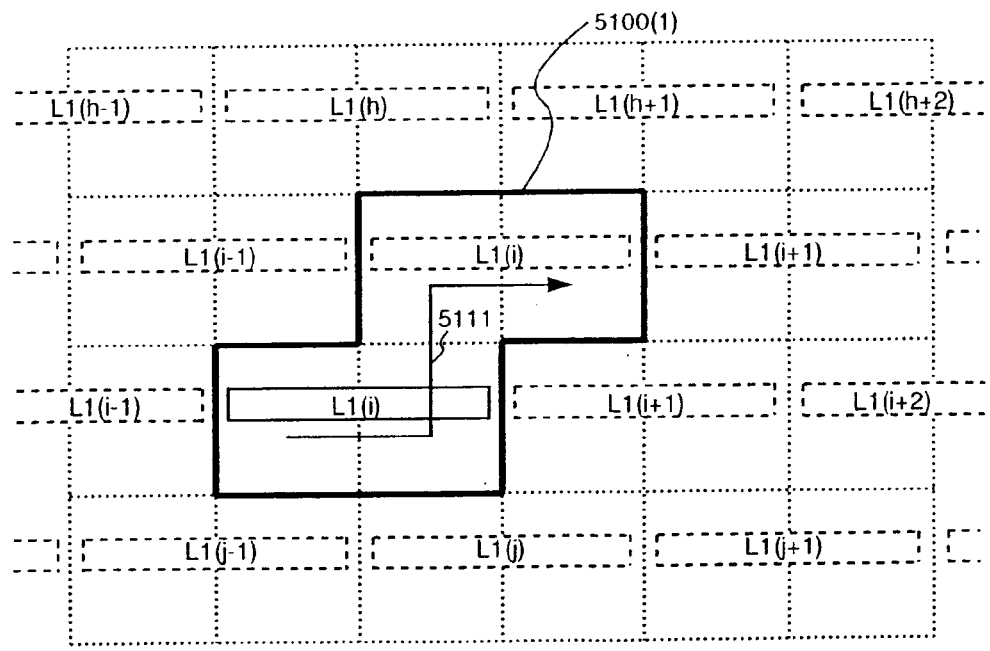

FIGS. 58A and 58B are views illustrating the procedure of pixel generation and the configuration of the small region in which four light sources are used. FIG. 58A is an extract of the portion relating to a light source 0 in an explanatory illustration of the sequential order of the luminance calculation in FIG. 57A. The small region 5100(0) is illustrated as a portion surrounded by a thick line. According to the sequential order of generation of the pixels, the pixels in the smell region 5100(0) are generated in the sequential order as represented by arrow 5111. Namely, the order of generation of pixels in the small region is top left—bottom left—bottom right—top right.

FIG. 58B is an extract of the portion relating to a light source 1 in an explanatory illustration of the sequential order of the luminance calculation in FIG. 57A. The small region 5100(1) is a portion surrounded by a thick line. The pixels in the small region 5100(1) are generated in a sequential order as represented by arrow 5111. The small region 5100(1) is shifted from the small region 5100(0) shown in FIG. 58A by one pixel. Therefore, the scanning of the pixels is performed in the sequential order of bottom left—bottom right—top left—top right.

Figure 59A:
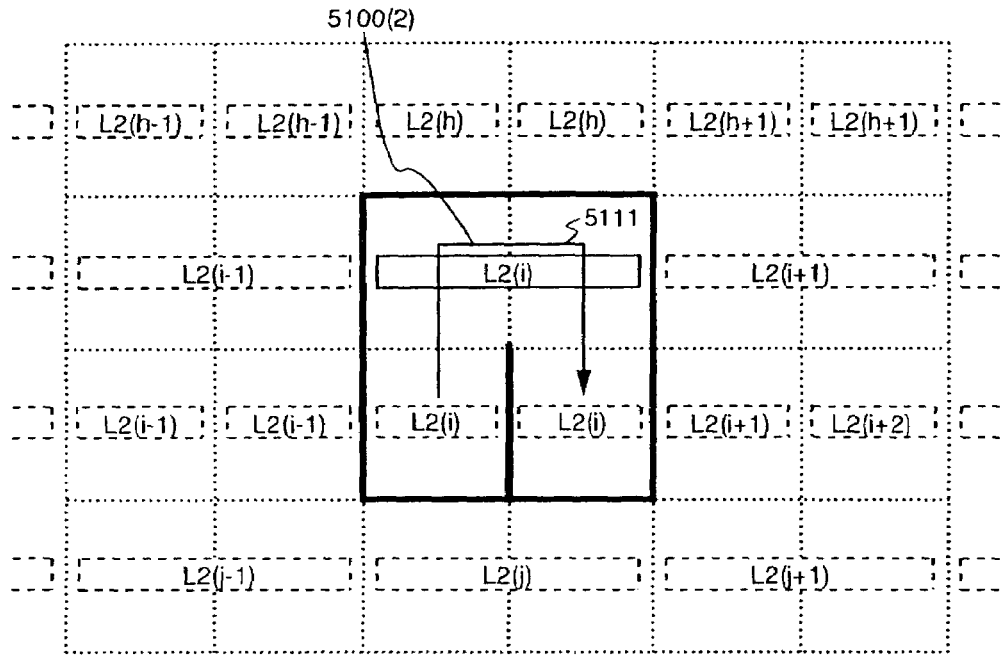
FIGS. 59A and 59B are diagrams illustrating a procedure for pixel generation and the configuration of a small region in which four light sources are used.
Figure 59B:
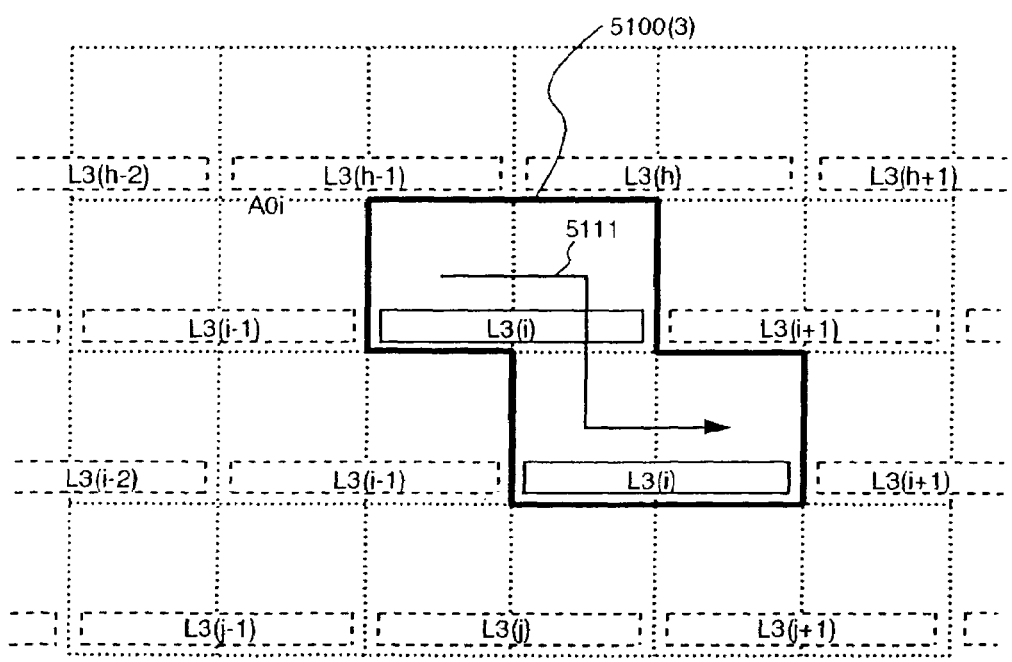

FIGS. 59A and 59B are views illustrating the procedure of pixel generation and the configuration of the small region in which four light sources are used.

FIG. 59A is an extract of the portion relating to a light source 2 in an explanatory illustration of the sequential order of the luminance calculation in FIG. 57A. The small region 5100(2) is a portion surrounded by a thick line. The pixels in the small region 5100(2) are generated in a sequential order as represented by arrow 5111 according to the sequential order of generation of pixels as illustrated in FIG. 57B. The small region 5100(1) is shifted from the small region 5100(1) shown in FIG. 58B by one pixel. Therefore, scanning of the pixels is performed in the sequential order of bottom left—top left—top right—bottom right.

FIG. 59B is an extract of the portion relating to a light source 3 in an explanatory illustration of the sequential order of the luminance calculation in FIG. 57A. The small region 5100(3) is a portion surrounded by a thick line. The pixels in the small region 5100(3) are generated in a sequential order as represented by arrow 5111 according to the sequential order of generation of pixels as illustrated in FIG. 57B. The small region 5100(2) is shifted from the small region 5100(2) shown in FIG. 59A by one pixel. Therefore, scanning of the pixels is performed in the sequential order of top left—top right—bottom left—bottom right.

Figure 60A:
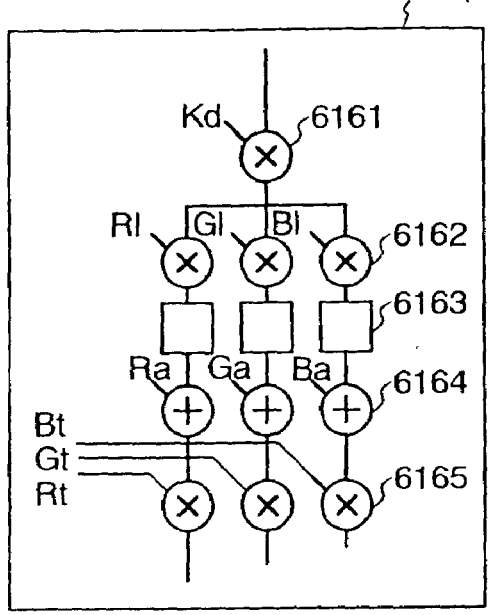
FIGS. 60A and 60B are schematic circuit diagrams showing examples of the configuration of a luminance calculating unit of the present invention.
Figure 60B:
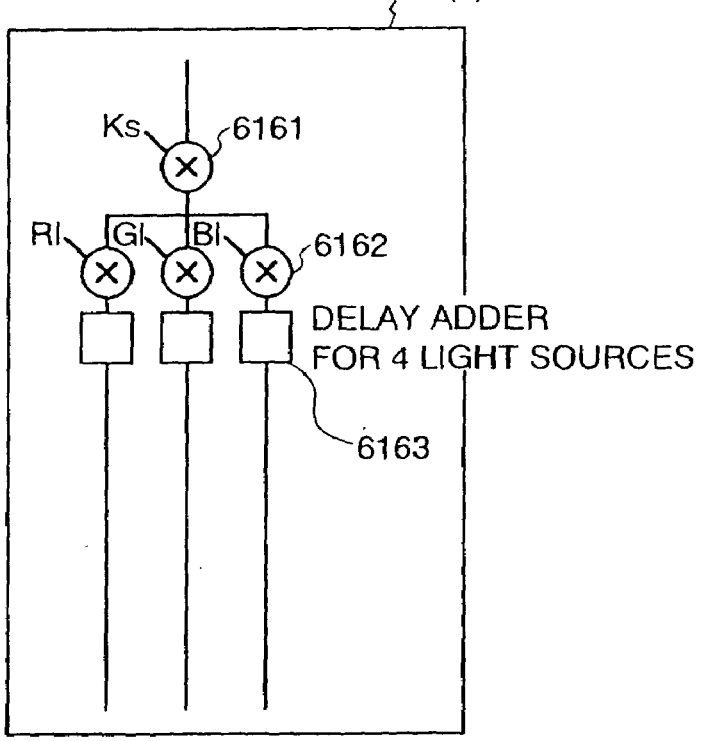

FIGS. 60A and 60B are block diagrams showing examples of the configuration of a luminance calculating unit 6160, which is constructed of a coefficient multiplier 6161, a light color multiplier 6162, and a delay adder 6163 for calculating pixel a within the small region, with the possible addition of adders 6164 and a multiplier 6165 for texture color.

Figure 61:
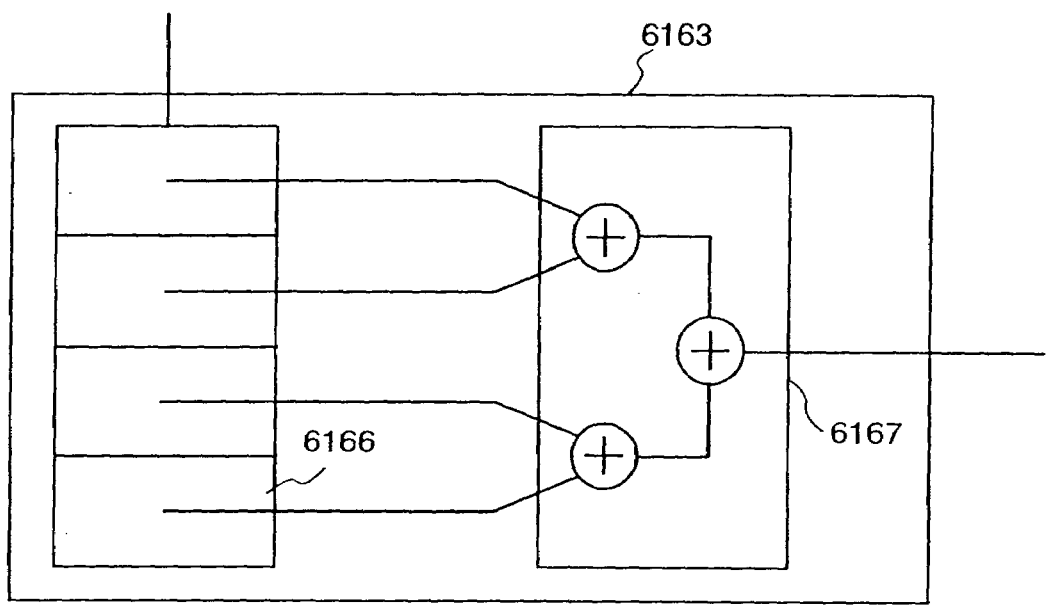
FIG. 61 is a schematic circuit diagram showing an example of the configuration of an adder for adding the luminance of every light source at a small region.

FIG. 61 is a view showing an example of the configuration of an adder 6163 for adding the luminance of every light source at the small region, which delay adder 6163 includes a first-in first-out (FIFO) buffer 6166 therein and can retroactively make reference to luminance values obtained in up to four preceding cycles. The adder 6167 outputs an approximated luminance value of four light sources in the small region by adding these luminance values. FIG. 62 is a view illustrating the specified algorithm of a shadow region of the embodiment 2. Consideration is given for the case where a figure tri10 forming a shadow is disposed between a figure tri00 and a light source light00. A portion on the figure tri00 to form a shadow region is determined by the following algorithm. Figures stri10 and stri11 forming a volume to be the shadow are defined. A portion where the volume and the figure tri00 intersect can be the shadow region. A method of identifying the portion will be discussed with reference to FIG. 43B. The region where a shadow appears is a point across the figures stri10 and stri11 an odd number of times as viewed toward the point on tri00 from an eye point 0. The appearance from the eye point is indicated by the figure as drawn. Therefore, it is required to plot how many times the figures stri10, stri11 and so forth are passed across, as mask information. Therefore, a plot command for plotting on a mask information plane is prepared. This command is indicative of plotting on the mask plane and has shape information and depth information.

Figure 63:
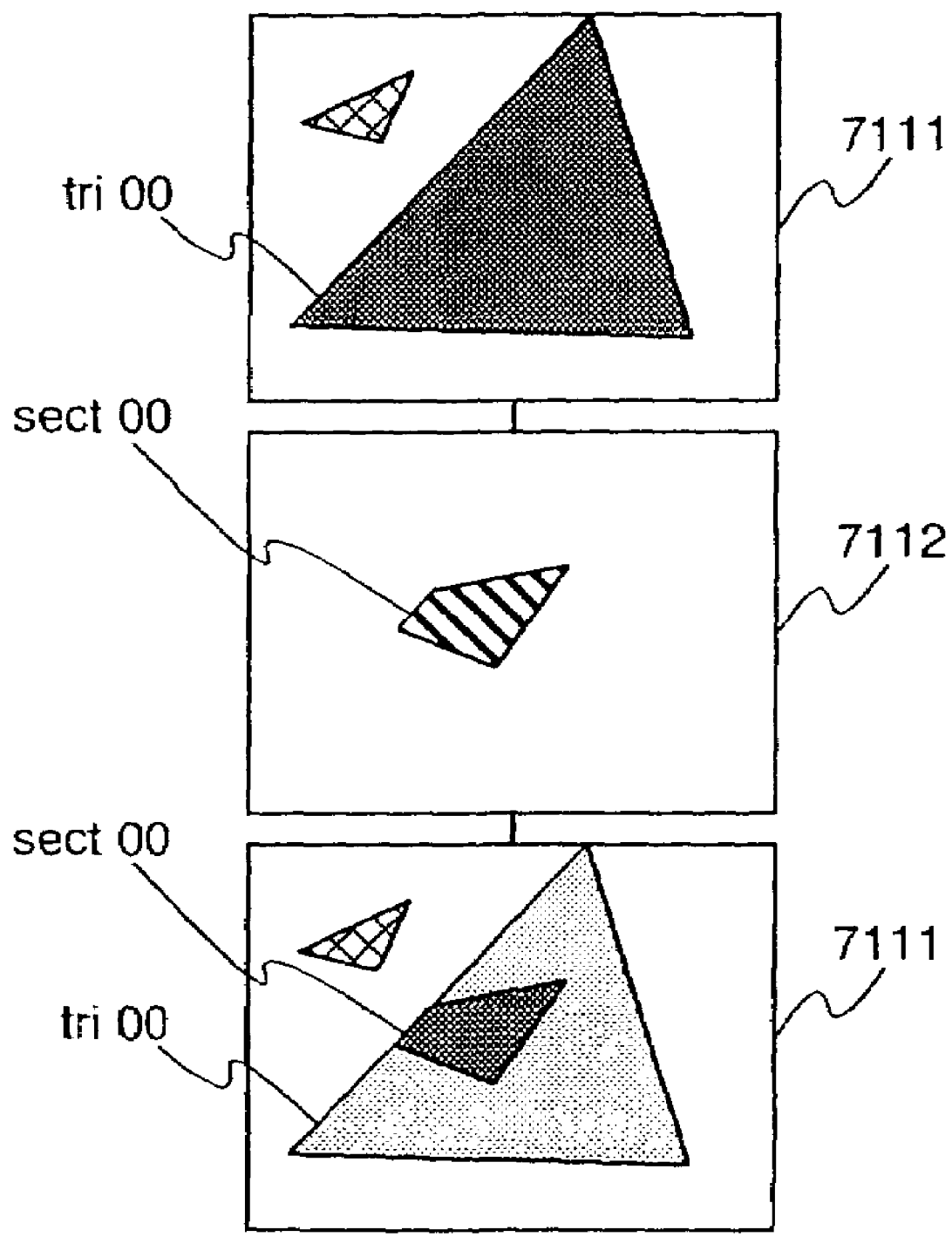
FIG. 63 is a illustrating a procedure for shading.

FIG. 63 is a view illustrating the procedure for shading. Initially, all figures are plotted. The value of the luminance at this time is stored in a plot memory region 7111. Next, by the foregoing algorithm, a mask indicative of a shadow region is formed on a memory region 7112. Finally, a process is performed to make this region form a shadow.

Figure 64:
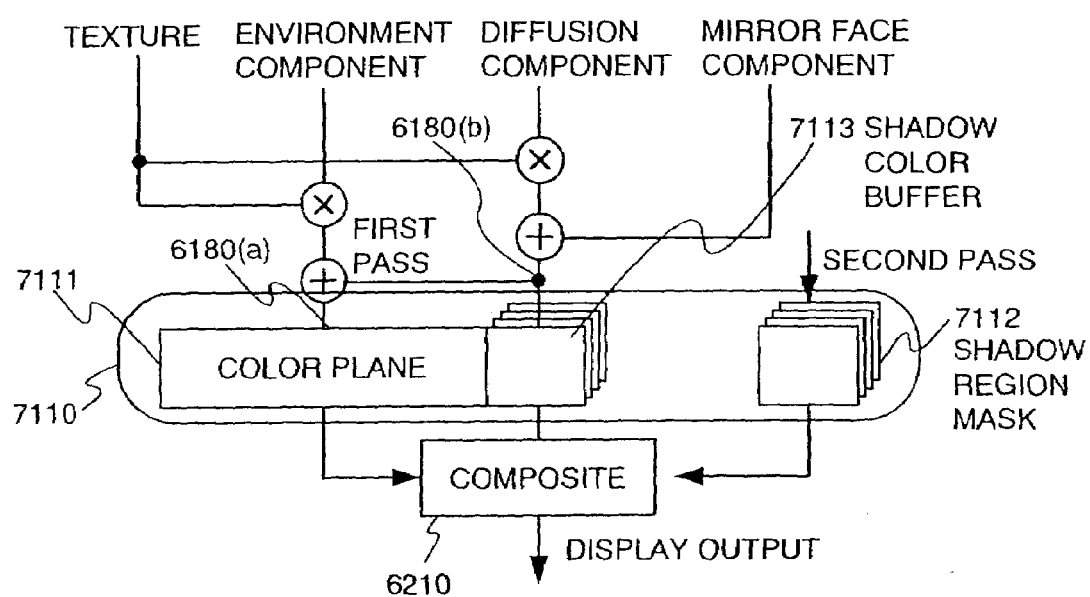
FIG. 64 is a schematic diagram showing an example of an apparatus for performing the procedure of shading of FIG. 44.

FIG. 64 is a view showing an example of the configuration of an apparatus for performing the shading procedure of FIG. 44.

In the calculation of the luminance per pixel in accordance with the present invention, respective components of luminance are calculated per pixel. In general, the components are an environmental light component 6180(a) and a light source light component 6180(b), and the sum of both components is stored in a plotting region 7111. The liquid source light component 6180(b) is stored in a shadow color buffer 7113 per light source. On the other hand, the shadow region is stored as shadow region mask information 7112 by the preceding algorithm. Upon display, according to mask information 7112, a shadow in which the luminance value in the shadow color buffer 7113 is subtracted from the plotting region 7111 is formed.

Figure 65A:
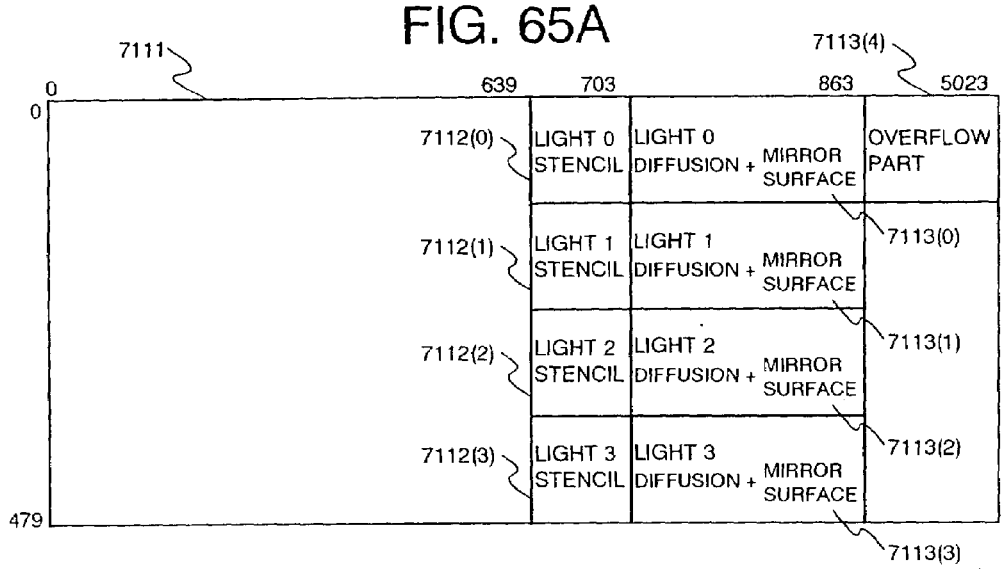
FIGS. 65A and 65B are diagrams showing an example of the assignment of memory regions for a shadow in the apparatus of FIG. 45.
Figure 65B:
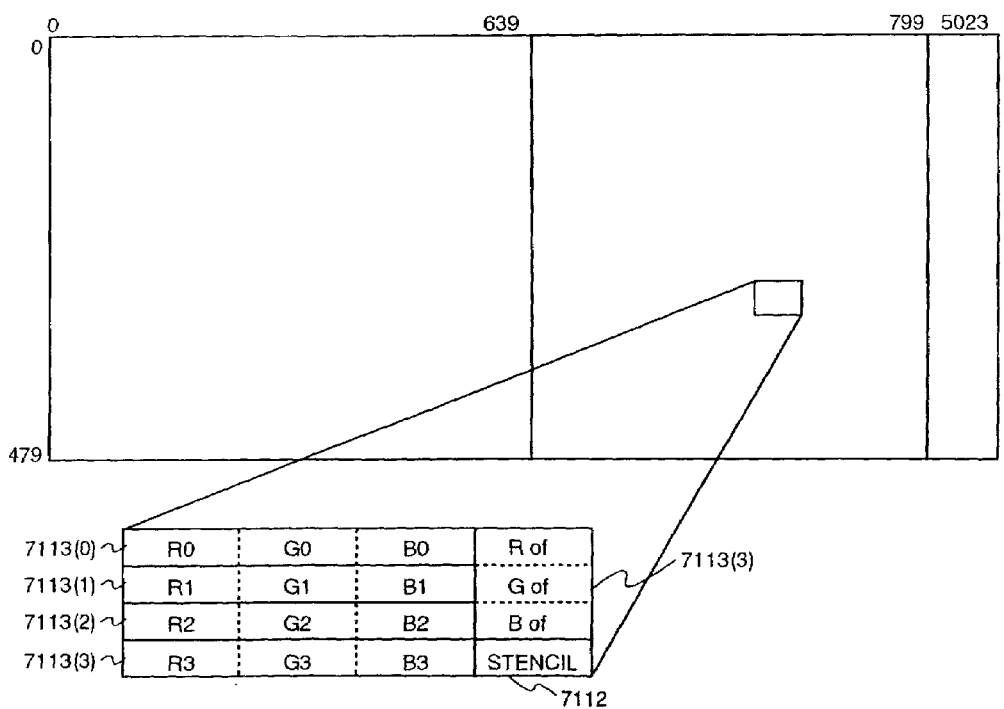

FIGS. 65A and 65B are views view showing an example of the assignment of memory regions for a shadow in the apparatus of FIG. 45. Shadow region mask information 7112(0) to 7112(3) and shadow color buffers 7113(0) to 7113(3) are set per light source. On the other hand, upon deriving the luminance of the plotting region, an overflow component is also stored in a shadow color buffer 7113(4). When the pixel causing overflow is indeed a shadow, the data is used as a correction term. It should be noted that when each information is provided per sixteen pixels, the memory capacity can be reduced. Since the luminance in the shadow region is low, it may not be visually perceptible even if the resolution is low. On the other hand, this information can be stored in a non-used region of the image memory, and thus can contribute to effective use of the memory. The form of the region is a plane system as (a) and packet system as (b).

Figure 66:
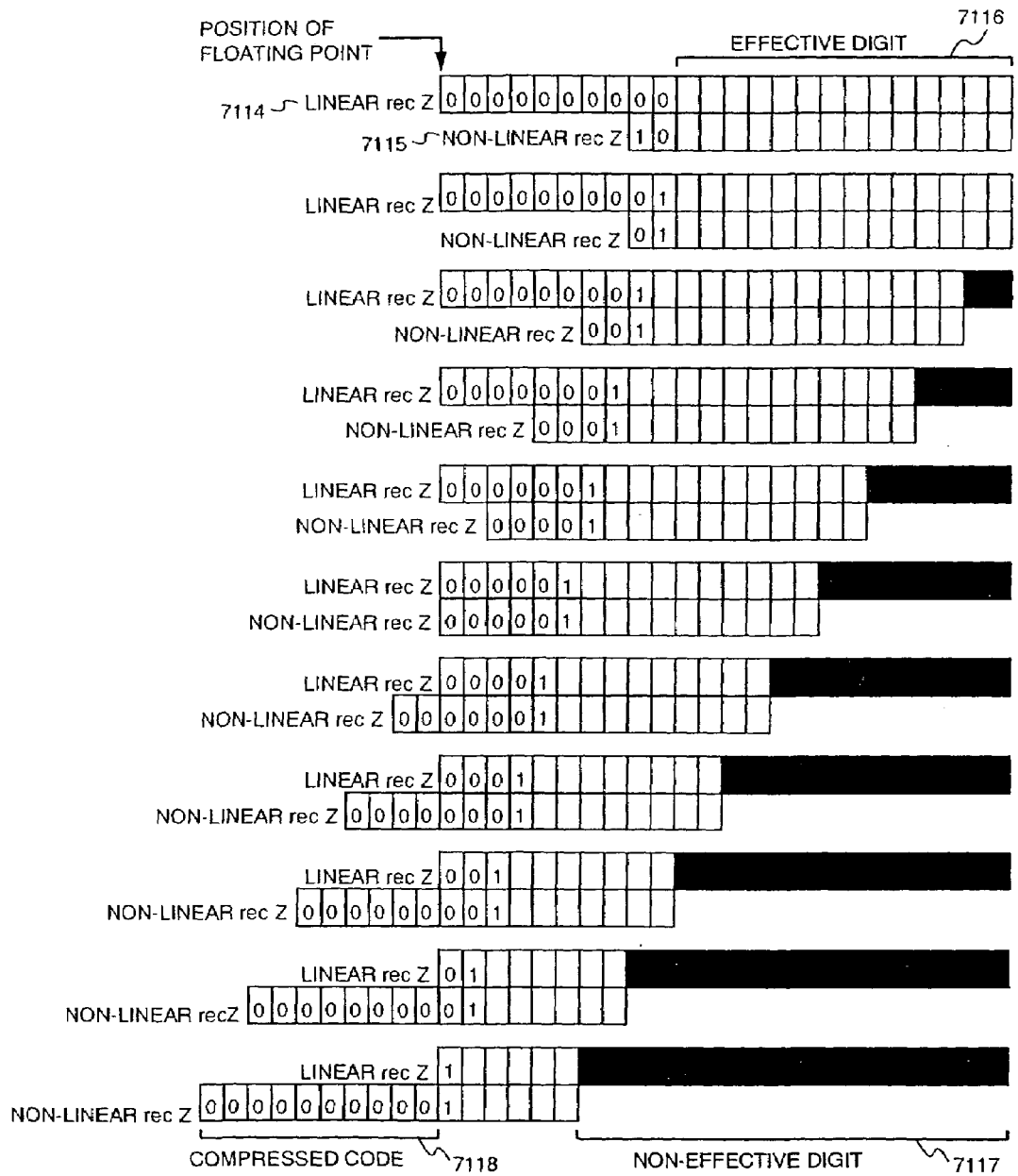
FIG. 66 is a diagram illustrating the non-linear depth format in the present invention.

FIG. 66 is a view illustrating the non-linear depth format in the present invention. The non-linear depth format shows a measure for reducing memory in relation to the storing of depth information. In general, the depth information represents a higher importance at a smaller depth, and the meaning of the difference of the distance becomes smaller at a greater depth. Accordingly, the required resolution becomes lower at a greater depth. The example of FIG. 66 shows a format in which non-effective digits 7117 are indicated by upper variable digit 7118, and effective digits 7116 become smaller at a greater depth. In this format, since a large/small relationship can be stored, comparison of depth can be executed in this format. In the present invention, the luminance per small region in the figure is calculated by providing a plurality of geometrical vector as parameters at respective vertexes, interpolating a plurality of geometrical vectors in the figure and by using a plurality of geometrical vectors generated by inter-operation.

In practice, an interpolation parameter is calculated by providing the parameters at respective vertexes of the figure for a interpolation in polar coordinate system, calculating interpolated parameters by linear interpolation of a polar coordinate value in the figure, or, in the alternative, by providing the parameters at respective vertexes of the figure for interpolation in a normalized model coordinate system and calculating interpolated parameters by linear interpolation of the normalized model coordinate value in the figure. Accordingly, the amount of calculation between parameters can be significantly reduced. Also, a shading device is provided, which can express a spot light, a high light and so forth at high speed and with high accuracy using a smaller amount of hardware and a smaller number of figures.

What is claimed is:

1. A memory accessing unit for use in a data processing system including a memory which stores first data for video signal processing allocated to a first address and stores second data allocated to a second address different from said first address, a first processor which generates an address for accessing said first data for video signal processing of said memory and a second processor which generates an address for accessing said second data of said memory, wherein said memory accessing unit is adapted to be coupled with said memory, said first processor and said second processor, wherein said memory accessing unit is adapted to control access from one of said first processor and said second processor, and wherein said memory accessing unit translates said first address generated from said first processor into said second address which corresponds to said second data when said first processor accesses said second data of said memory.

2. A memory accessing unit according to claim 1, wherein said memory accessing unit translates said second address generated from said second processor into said first address which corresponds to said first data when said second processor accesses said first data of said memory.

* * * * *